United States Patent
Kuwabara et al.

(10) Patent No.: US 10,659,860 B2
(45) Date of Patent: May 19, 2020

(54) HEADPHONES AND HEADPHONE SYSTEM

(71) Applicant: Semiconductor Energy Laboratory Co., Ltd., Atsugi-shi, Kanagawa-ken (JP)

(72) Inventors: Hideaki Kuwabara, Atsugi (JP); Natsuko Takase, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/416,098

(22) Filed: Jan. 26, 2017

(65) Prior Publication Data

US 2017/0223442 A1    Aug. 3, 2017

(30) Foreign Application Priority Data

Jan. 29, 2016 (JP) ................. 2016-015180

(51) Int. Cl.
| | |
|---|---|
| *H04R 1/10* | (2006.01) |
| *H04R 1/02* | (2006.01) |
| *H05B 47/11* | (2020.01) |
| *H05B 47/105* | (2020.01) |
| *H02J 50/10* | (2016.01) |
| *F21V 33/00* | (2006.01) |
| *H02J 7/02* | (2016.01) |

(52) U.S. Cl.
CPC ....... *H04R 1/1008* (2013.01); *F21V 33/0056* (2013.01); *H02J 7/025* (2013.01); *H02J 50/10* (2016.02); *H04R 1/028* (2013.01); *H04R 1/1041* (2013.01); *H05B 47/105* (2020.01); *H05B 47/11* (2020.01); *H04R 1/1025* (2013.01); *H04R 1/1091* (2013.01); *H04R 2420/07* (2013.01)

(58) Field of Classification Search
CPC .. H04R 1/1008; H04R 1/1025; H04R 1/1041; H04R 2420/07; H02J 50/10; H02J 7/025; F21V 33/0056; H05B 37/0218
USPC .................. 381/74, 370, 371, 378, 384, 374
See application file for complete search history.

(56) References Cited

U.S. PATENT DOCUMENTS

2007/0032274 A1 * 2/2007 Lee ...................... H04R 1/1025
                                                                   455/575.2
2011/0096939 A1    4/2011 Ichimura
(Continued)

FOREIGN PATENT DOCUMENTS

| JP | 2009-206692 | 9/2009 |
|---|---|---|
| JP | 2009-206692 A | 9/2009 |

(Continued)

*Primary Examiner* — Ahmad F. Matar
*Assistant Examiner* — Sabrina Diaz
(74) *Attorney, Agent, or Firm* — Robinson Intellectual Property Law Office; Eric J. Robinson

(57) ABSTRACT

Headphones including a sound output unit, a processing unit, a memory unit, a lighting unit, and a detection unit are provided. The sound output unit is configured to output sound. The memory unit is configured to store a program. The lighting unit is configured to emit light in response to a signal supplied from the processing unit. The detection unit is configured to obtain detection information and supply a detection signal corresponding to the detection information to the processing unit. The processing unit is configured to read out the program, carry out an operation using the detection signal and the program, and supply a signal corresponding to an operation result to the lighting unit.

15 Claims, 38 Drawing Sheets

(56) References Cited

U.S. PATENT DOCUMENTS

| | | | |
|---|---|---|---|
| 2014/0055702 A1* | 2/2014 | Park | G02F 1/136286 |
| | | | 349/43 |
| 2014/0253419 A1 | 9/2014 | Tanada | |
| 2015/0030176 A1* | 1/2015 | Yang | H04R 1/1041 |
| | | | 381/74 |
| 2015/0146880 A1* | 5/2015 | Boni | H04R 1/1008 |
| | | | 381/74 |
| 2015/0230020 A1* | 8/2015 | Jeon | H04R 1/1091 |
| | | | 381/74 |
| 2015/0230022 A1* | 8/2015 | Sakai | H04R 1/1041 |
| | | | 381/58 |
| 2016/0029929 A1* | 2/2016 | Worthen | A61B 5/1116 |
| | | | 600/595 |
| 2016/0205459 A1* | 7/2016 | Kamada | H04R 1/1041 |
| | | | 381/74 |
| 2017/0041711 A1 | 2/2017 | Inakoshi | |

FOREIGN PATENT DOCUMENTS

| | | |
|---|---|---|
| JP | 2011-097268 A | 5/2011 |
| WO | WO-2015-0162923 A | 10/2015 |

* cited by examiner

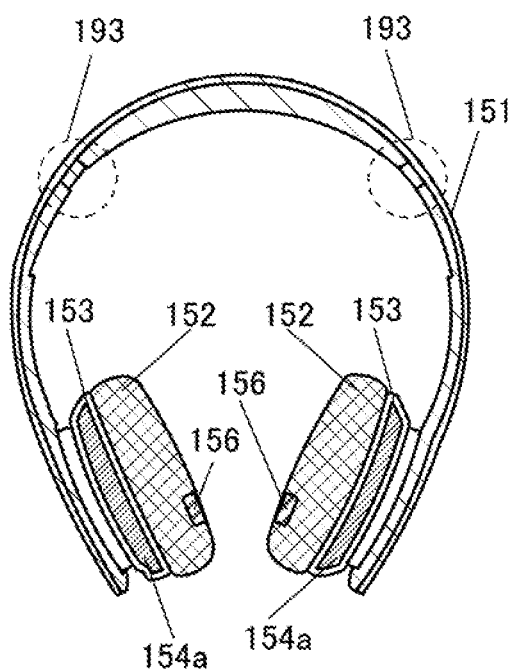

FIG. 12A

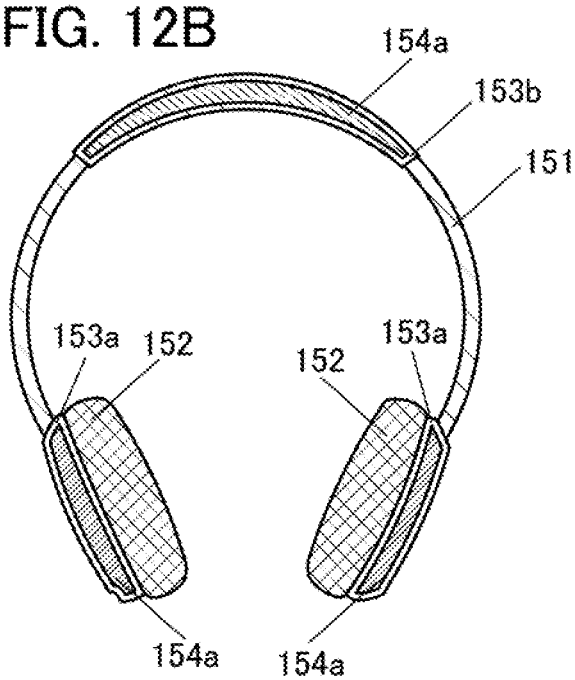

FIG. 12B

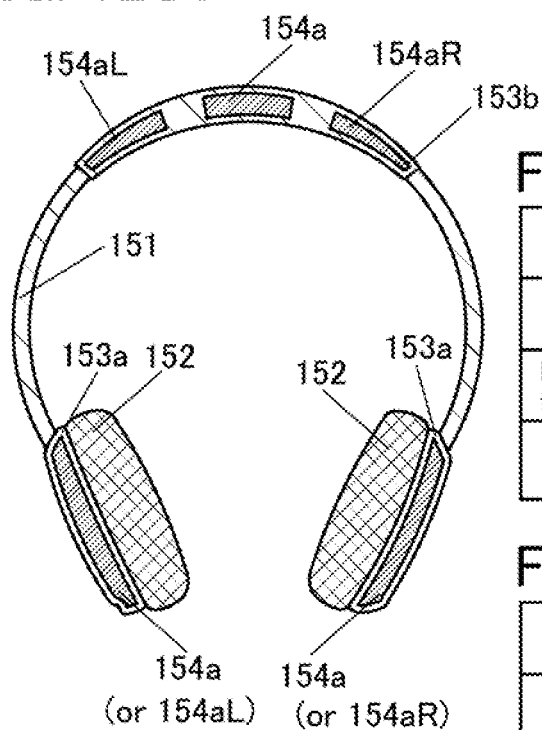

| 124 | 154aL | 154a | 154aR |
|---|---|---|---|
| normal | emitting no light | emitting light | emitting no light |
| leaning to right | emitting no light | emitting light | blinking |
| leaning to left | blinking | emitting light | emitting no light |

FIG. 12C3

| 124 | 154aL | 154a | 154aR |
|---|---|---|---|
| normal | emitting light | emitting light | emitting light |
| leaning to right | emitting no light | emitting light | blinking |
| leaning to left | blinking | emitting light | emitting no light |

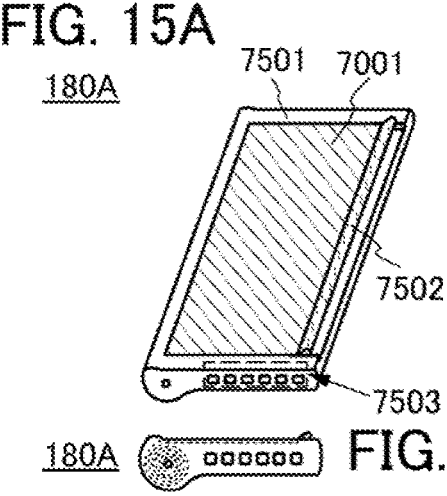
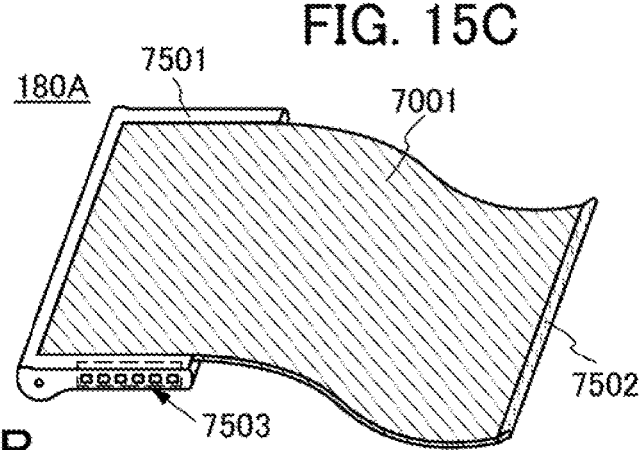
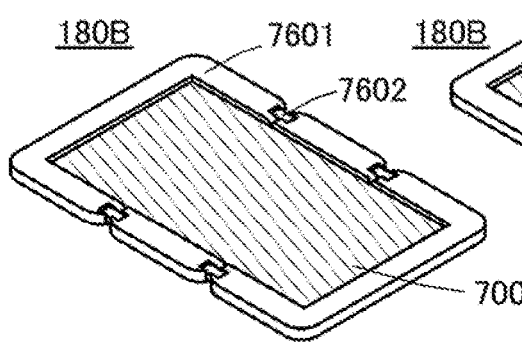
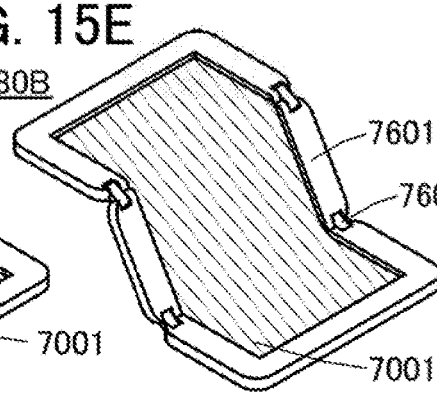
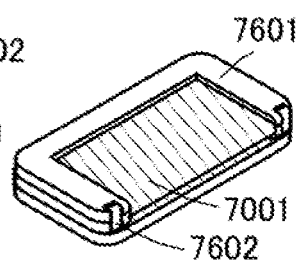
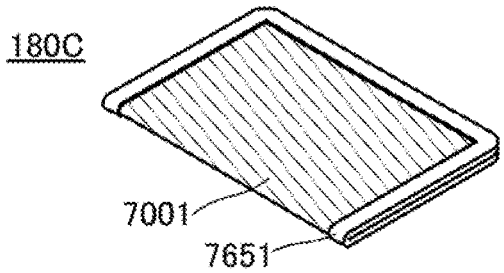

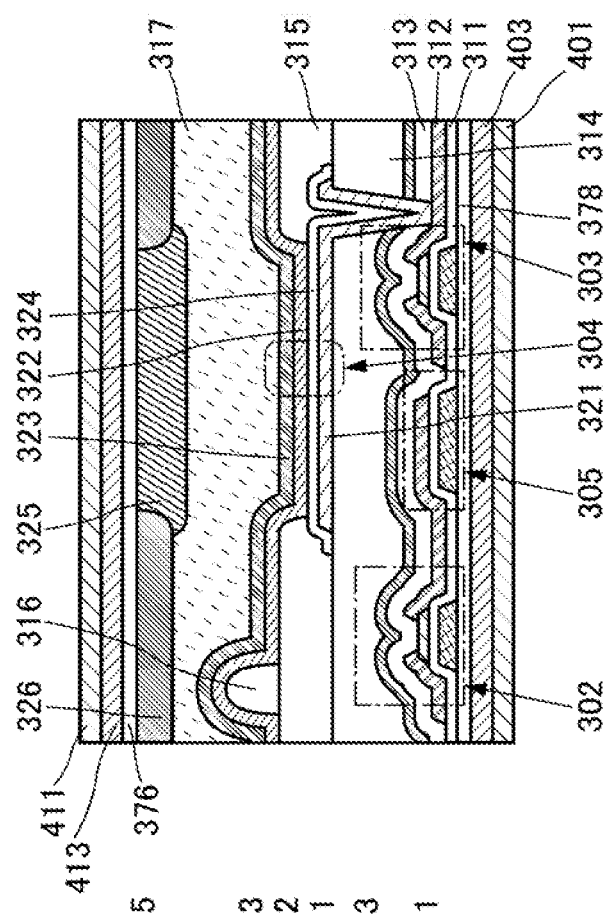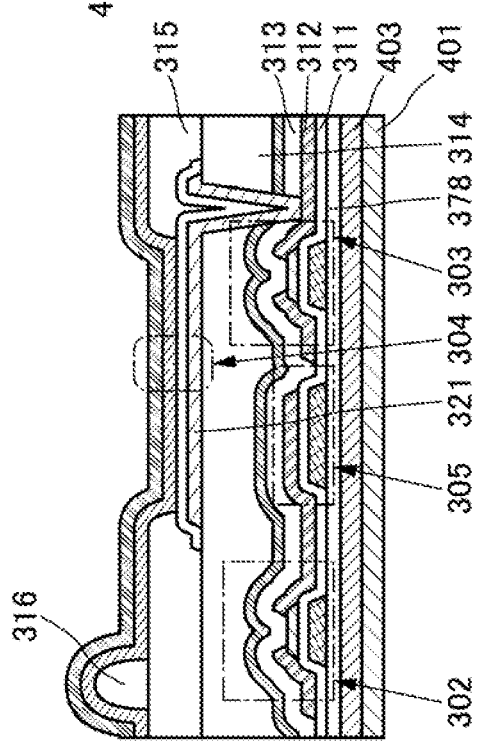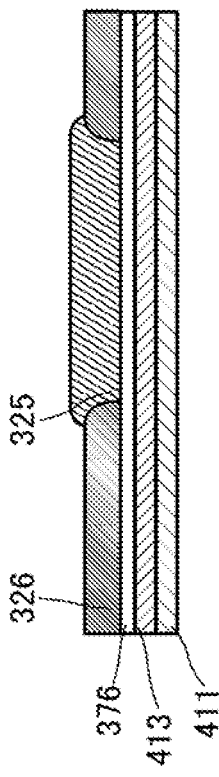

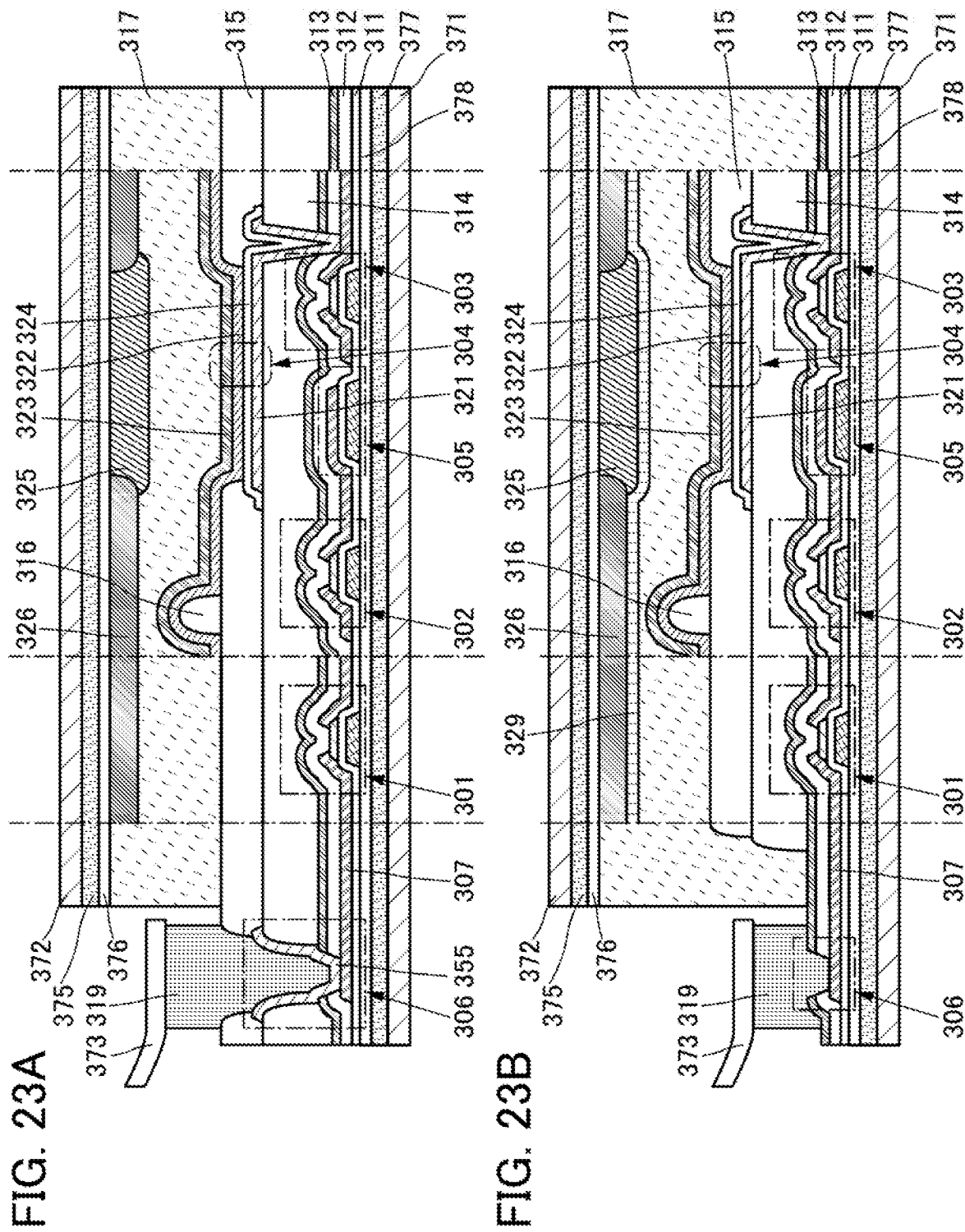

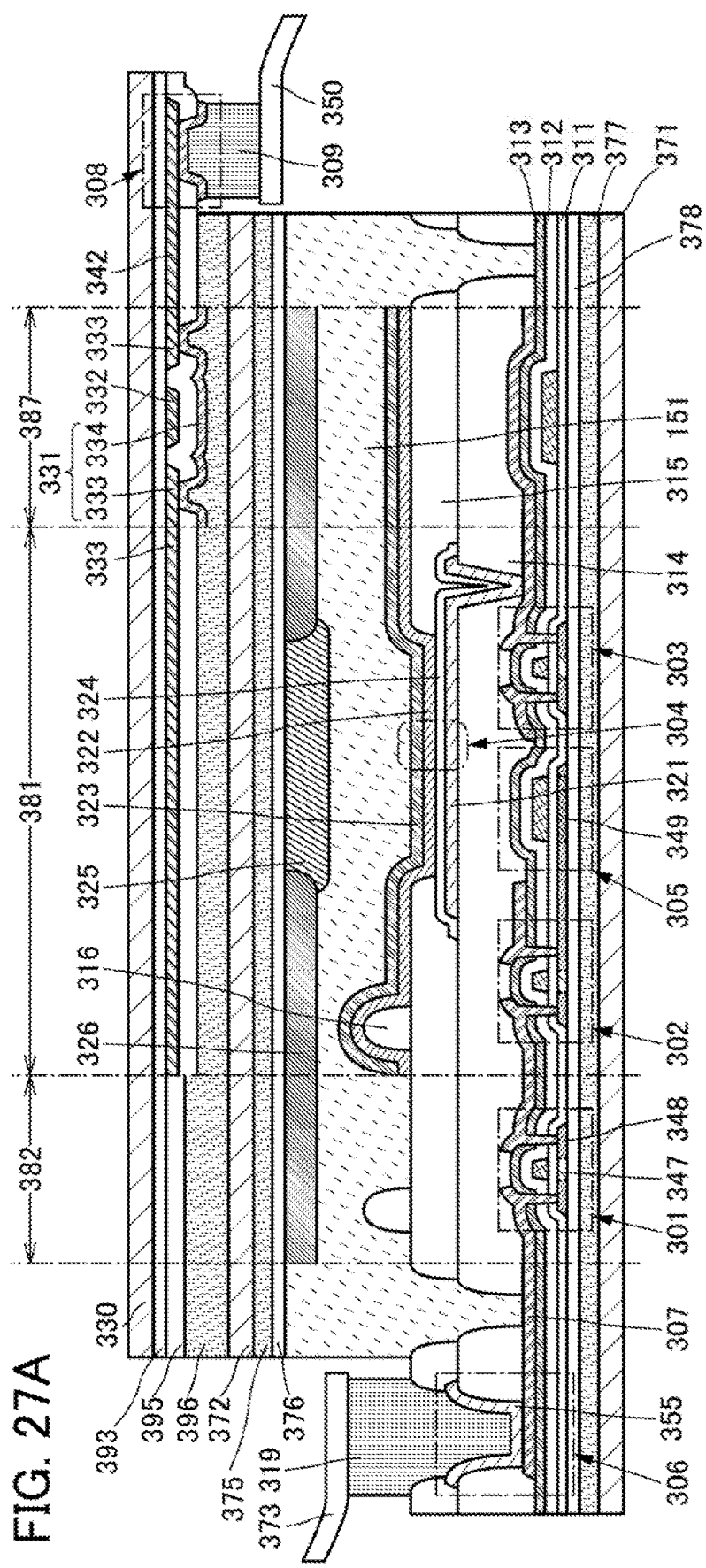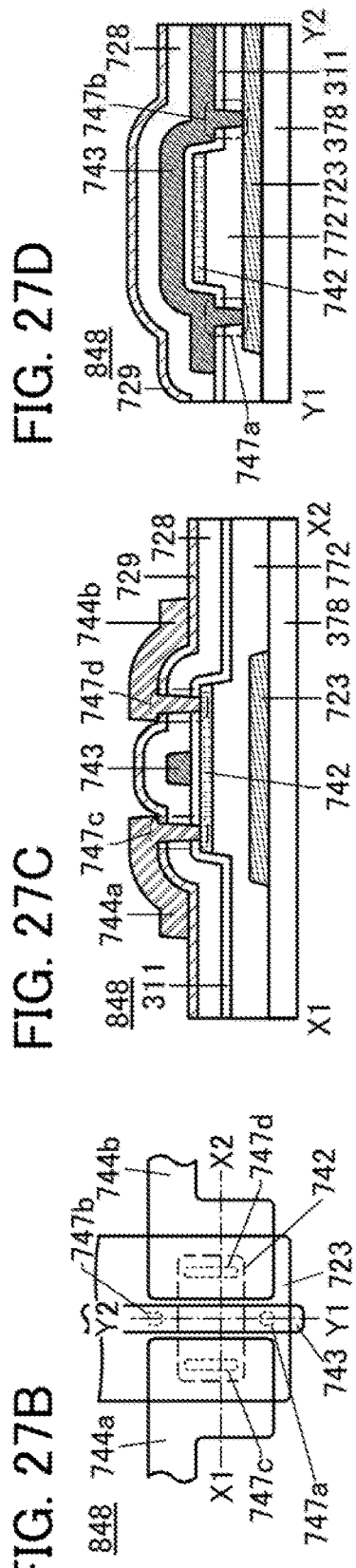

FIG. 31A
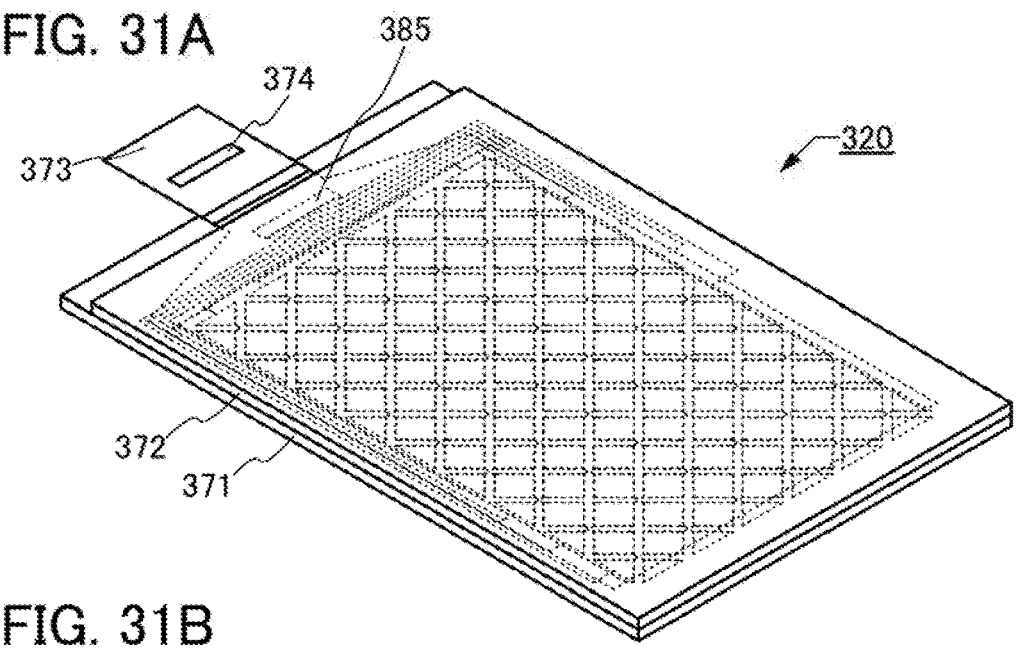
FIG. 31B
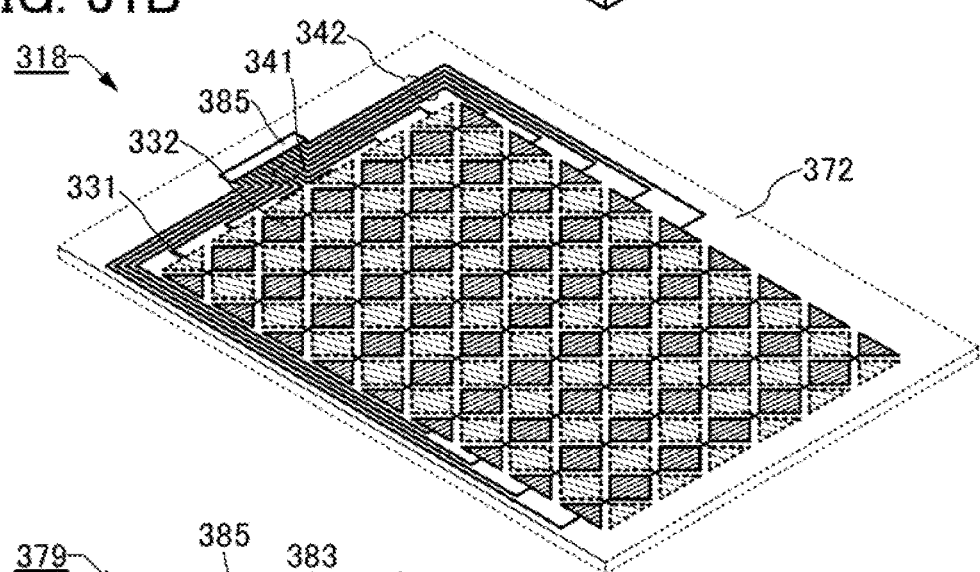
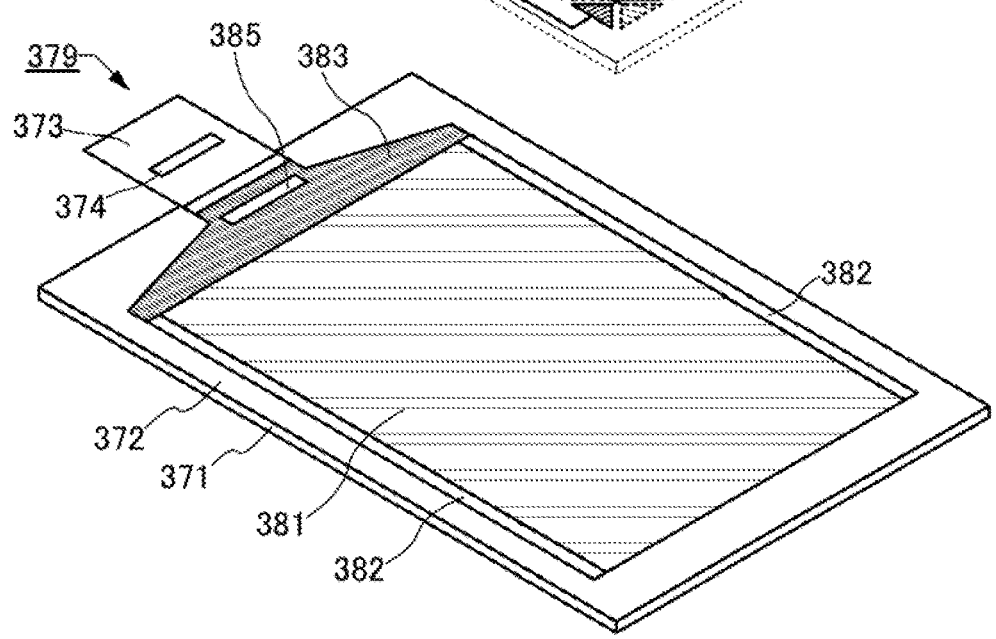

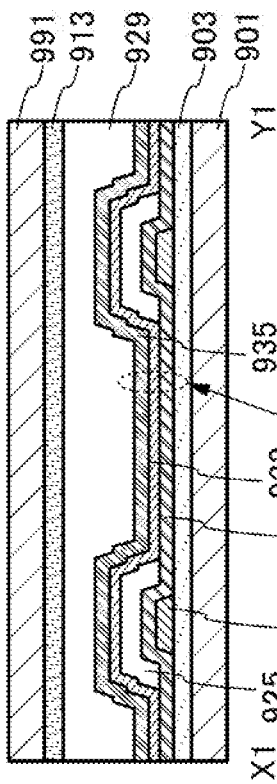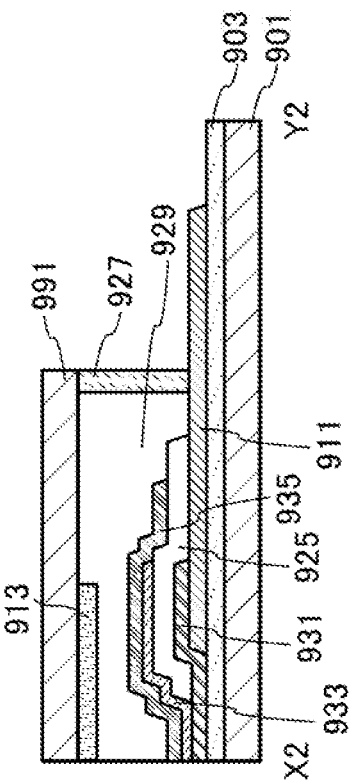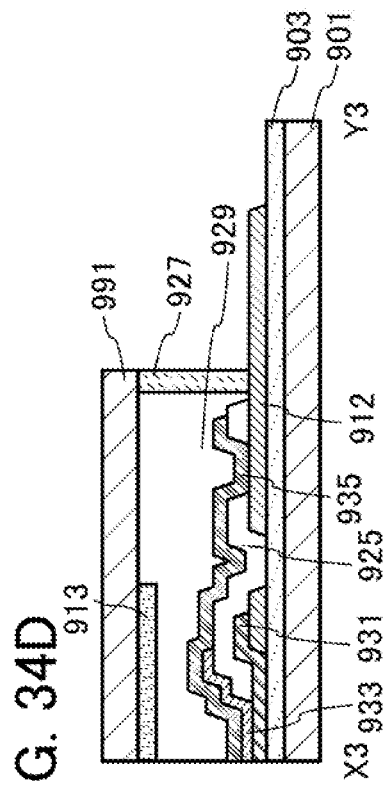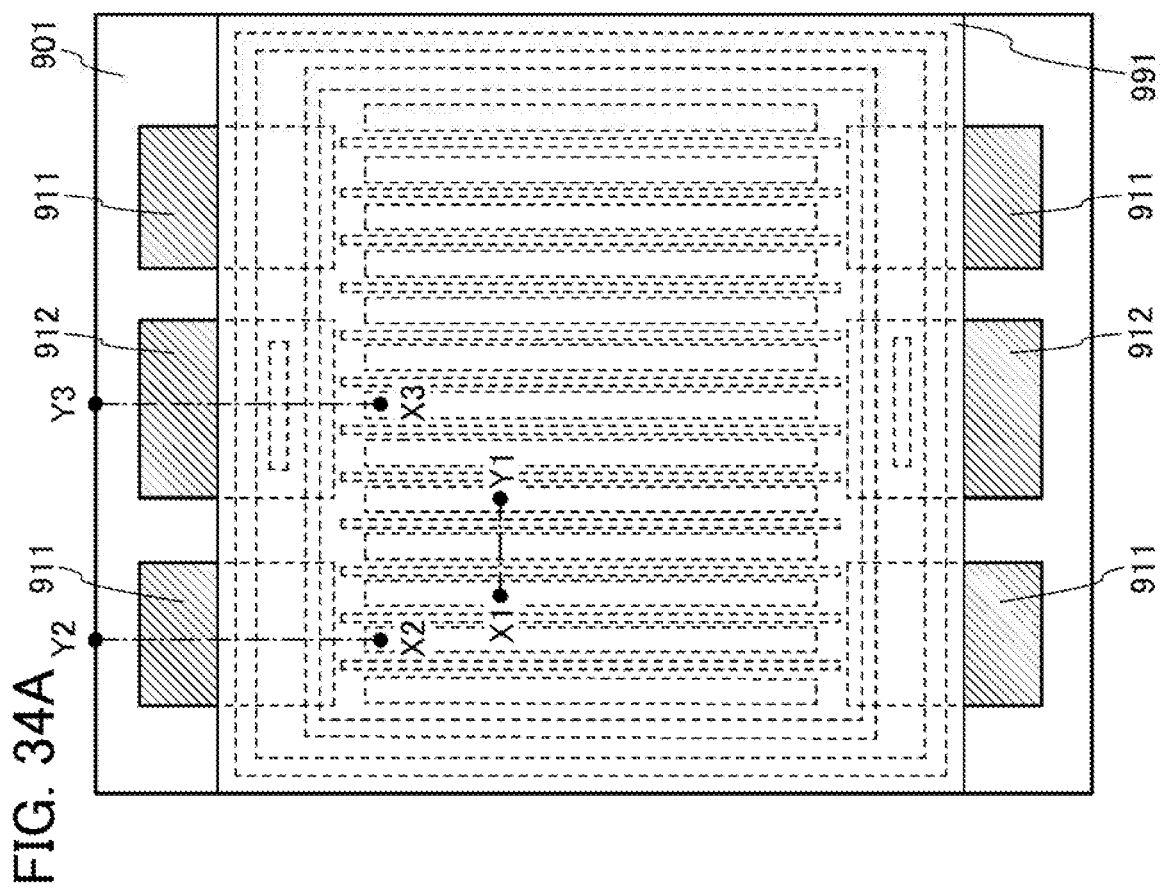

HEADPHONES AND HEADPHONE SYSTEM

BACKGROUND OF THE INVENTION

Field of the Invention

One embodiment of the present invention relates to an audio output device. Another embodiment of the present invention relates to headphones and a headphone system.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a method for driving any of them, and a method for manufacturing any of them.

Description of the Related Art

Portable information terminals including cellular phones and portable music players have been spread, and it becomes possible to listen audio contents, e.g., music and a language course, in various locations by carrying them. For example, it is possible to enjoy listening to audio contents by using headphones in travel by train or in sports such as running.

The functions of headphones are being increased and varied. Specifically, improvement in sound quality, reduction in weight, and reduction in noise from the outside are achieved in headphones, and wireless headphones and the like are developed.

For example, Patent Document 1 discloses headphones which are highly convenient when the user wearing the headphones has a conversation.

REFERENCE

Patent Document

[Patent Document 1] Japanese Published Patent Application No. 2011-097268

SUMMARY OF THE INVENTION

An object of one embodiment of the present invention is to add a novel function to headphones.

Another object of one embodiment of the present invention is to provide a novel audio output device. Another object of one embodiment of the present invention is to provide novel headphones. Another object of one embodiment of the present invention is to provide a novel headphone system.

Another object of one embodiment of the present invention is to provide headphones with high convenience. Another object of one embodiment of the present invention is to provide lightweight headphones.

Note that the descriptions of these objects do not disturb the existence of other objects. Note that one embodiment of the present invention does not necessarily achieve all the objects. Other objects can be derived from the description of the specification, the drawings, and the claims.

One embodiment of the present invention is an electronic device which includes a sound output unit, a processing unit, a memory unit, a lighting unit, and a detection unit and is configured to output sound. Another embodiment of the present invention is headphones including a sound output unit, a processing unit, a memory unit, a lighting unit, and a detection unit. The sound output unit is configured to output sound. The memory unit is configured to store a program. The lighting unit is configured to emit light in response to a signal supplied from the processing unit. The detection unit is configured to obtain detection information and supply a detection signal corresponding to the detection information to the processing unit. The processing unit is configured to read out the program, carry out an operation using the detection signal and the program, and supply a signal corresponding to an operation result to the lighting unit.

The detection unit preferably includes a photodetector unit. The photodetector unit is configured to supply a detection signal corresponding to a measured quantity of light to the processing unit. For example, the processing unit is preferably configured to make the lighting unit emit light when the quantity of light measured by the photodetector unit is smaller than a reference quantity. The processing unit is preferably configured to make the lighting unit emit light at a first luminance when the quantity of light measured by the photodetector unit is smaller than a reference quantity and make the lighting unit emit light at a second luminance different from the first luminance when the quantity of light measured by the photodetector unit is larger than the reference quantity.

The detection unit preferably includes an attitude detection unit. The attitude detection unit is configured to supply a detection signal corresponding to measured change in attitude to the processing unit. For example, the processing unit is preferably configured to make the lighting unit blink when the measured change in attitude is larger than a reference quantity.

It is preferable that the headphones of one embodiment of the present invention further include a biological sensor. The biological sensor is configured to obtain biological information and supply a detection signal corresponding to the biological information to the processing unit. For example, the processing unit is configured to stop the sound output unit from outputting sound when the biological sensor obtains no biological information.

It is preferable that the headphones of one embodiment of the present invention further include a power supply unit. The power supply unit preferably includes a power storage device and an antenna. The power supply unit is preferably configured to charge the power storage device wirelessly with the antenna.

It is preferable that the headphones of one embodiment of the present invention further include an external connection terminal. The processing unit is preferably supplied with a sound signal from an external device that is connected to the external connection terminal with a wire.

It is preferable that the headphones of one embodiment of the present invention further include a housing, and the sound output unit and the lighting unit be located inside the housing. The sound output unit preferably outputs sound to the outside of the housing through a first surface of the housing, and the lighting unit preferably emits light to the outside of the housing through a second surface of the housing.

It is preferable that the headphones of one embodiment of the present invention further include a band that can be worn on a human body. The band preferably includes the lighting unit.

It is preferable that the headphones of one embodiment of the present invention further include a display unit. The display unit is configured to display an image. The lighting unit may also serve as the display unit.

It is preferable that the headphones of one embodiment of the present invention further include a first communication unit. The first communication unit is preferably supplied with a sound signal from a computer network or an electronic device with wireless communication Another embodiment of the present invention is a headphone system including the headphone with any of the above structures and an arm-worn information terminal. The arm-worn information terminal includes an input unit and a second communication unit. The input unit is configured to supply a signal corresponding to an input content to the second communication unit. The second communication unit is configured to supply a signal corresponding to the supplied signal to the first communication unit.

According to one embodiment of the present invention, a novel function can be added to headphones.

According to one embodiment of the present invention, a novel audio output device can be provided. According to one embodiment of the present invention, novel headphones can be provided. According to one embodiment of the present invention, a novel headphone system can be provided.

According to one embodiment of the present invention, headphones with high convenience can be provided. According to one embodiment of the present invention, lightweight headphones can be provided.

Note that the description of these effects does not preclude the existence of other effects. One embodiment of the present invention does not necessarily achieve all the effects listed above. Other effects can be derived from the description of the specification, the drawings, and the claims.

BRIEF DESCRIPTION OF THE DRAWINGS

FIGS. 12A, 12B, 12C1, 12C2, and 12C3 show examples of structures and functions of headphones.

FIGS. 15A to 15G illustrate examples of a portable information terminal.

FIGS. 20A to 20C are cross-sectional views illustrating an example of a method for manufacturing a light-emitting panel.

FIGS. 23A and 23B are cross-sectional views illustrating examples of a light-emitting panel.

FIG. 27A is a cross-sectional view illustrating an example of a touch panel and FIGS. 27B to 27D are a top view and cross-sectional views of a transistor.

FIGS. 31A and 31B are perspective views illustrating an example of a touch panel.

FIGS. 33A and 33B are cross-sectional views illustrating examples of a touch panel.

FIGS. 34A to 34D illustrate an example of a light-emitting panel.

DETAILED DESCRIPTION OF THE INVENTION

Figure 1A:
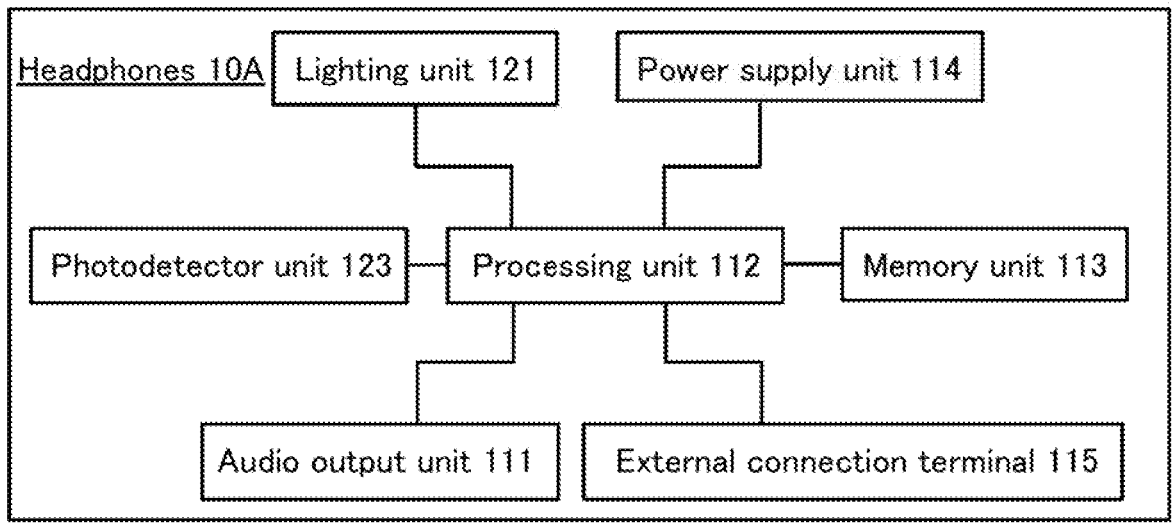
FIGS. 1A and 1B are block diagrams showing examples of headphones.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

The position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive layer" can be changed into the term "conductive film". Also, the term "insulating film" can be changed into the term "insulating layer".

Embodiment 1

In this embodiment, headphones and a headphone system of one embodiment of the present invention are described with reference to FIGS. 1A and 1B, FIG. 2, FIG. 3, FIG. 4, FIG. 5, FIGS. 6A and 6B, FIG. 7, FIG. 8, FIGS. 9A and 9B, FIGS. 10A and 10B, FIGS. 11A and 11B, FIGS. 12A, 12B, 12C1, 12C2, and 12C3, FIGS. 13A to 13F, FIGS. 14A to 14E, FIGS. 15A to 15G, FIGS. 16A and 16B, and FIGS. 17A to 17F.

Although headphones and a headphone system are described as examples in this embodiment, one embodiment of the present invention is not limited thereto. One embodiment of the present invention can be applied to various audio output devices. Examples of audio output devices include headphones, earphones (including an in-ear type, a canal type, and an ear-hanging type), hearing aids, audio output devices included in headsets, and audio output devices included in head-mounted displays. Note that the audio output device has one or both of a function of playing music by being connected to an external device and a function of playing music by itself. In addition, the audio output device may be combined with the headphones of one embodiment of the present invention to be used as optional equipment of a head-mounted display. With a combination of images and sounds, an immersion feeling obtained by images displayed in the head-mounted display may be further enhanced by sounds from the headphones.

The headphones of one embodiment of the present invention include an audio output unit, a processing unit, a memory unit, a lighting unit, and a detection unit.

The lighting unit can emit light toward the surroundings of the headphones.

The lighting unit which emits light can light up the surroundings or notify the existence of a user wearing the headphones when the user passes through a dark location, e.g., streets at night, by foot or by bicycle, which ensures the safety of the user of the headphones.

The processing unit can control light emission of the lighting unit in accordance with detection information obtained by the detection unit, whereby the convenience of the headphone can be enhanced.

Configuration Example 1 of Headphones

Headphones 10A shown in FIG. 1A include an audio output unit 111, a processing unit 112, a memory unit 113, a power supply unit 114, an external connection terminal 115, a lighting unit 121, and a photodetector unit 123.

The headphones 10A can output sound from the audio output unit 111. The audio output unit 111 can reproduce sound from an audio signal supplied from an external device connected via the external connection terminal 115, an audio signal stored in the memory unit 113, or the like, for example.

The photodetector unit 123 can measure the brightness of the surroundings of the headphones.

The photodetector unit 123 has a function of supplying a detection signal which corresponds to the quantity of detected light to the processing unit 112. The processing unit 112 has a function of carrying out an operation using the supplied detection signal. The processing unit 112 can control light emission of the lighting unit 121 by supplying a signal which corresponds to the operation result to the lighting unit 121.

The lighting unit 121 can emit light in accordance with the signal supplied from the processing unit.

The memory unit 113 can store a program which the processing unit 112 uses in the operation, and the like.

The power supply unit 114 can supply power to the audio output unit 111, the processing unit 112, the memory unit 113, the lighting unit 121, the photodetector unit 123, and the like.

Figure 2:
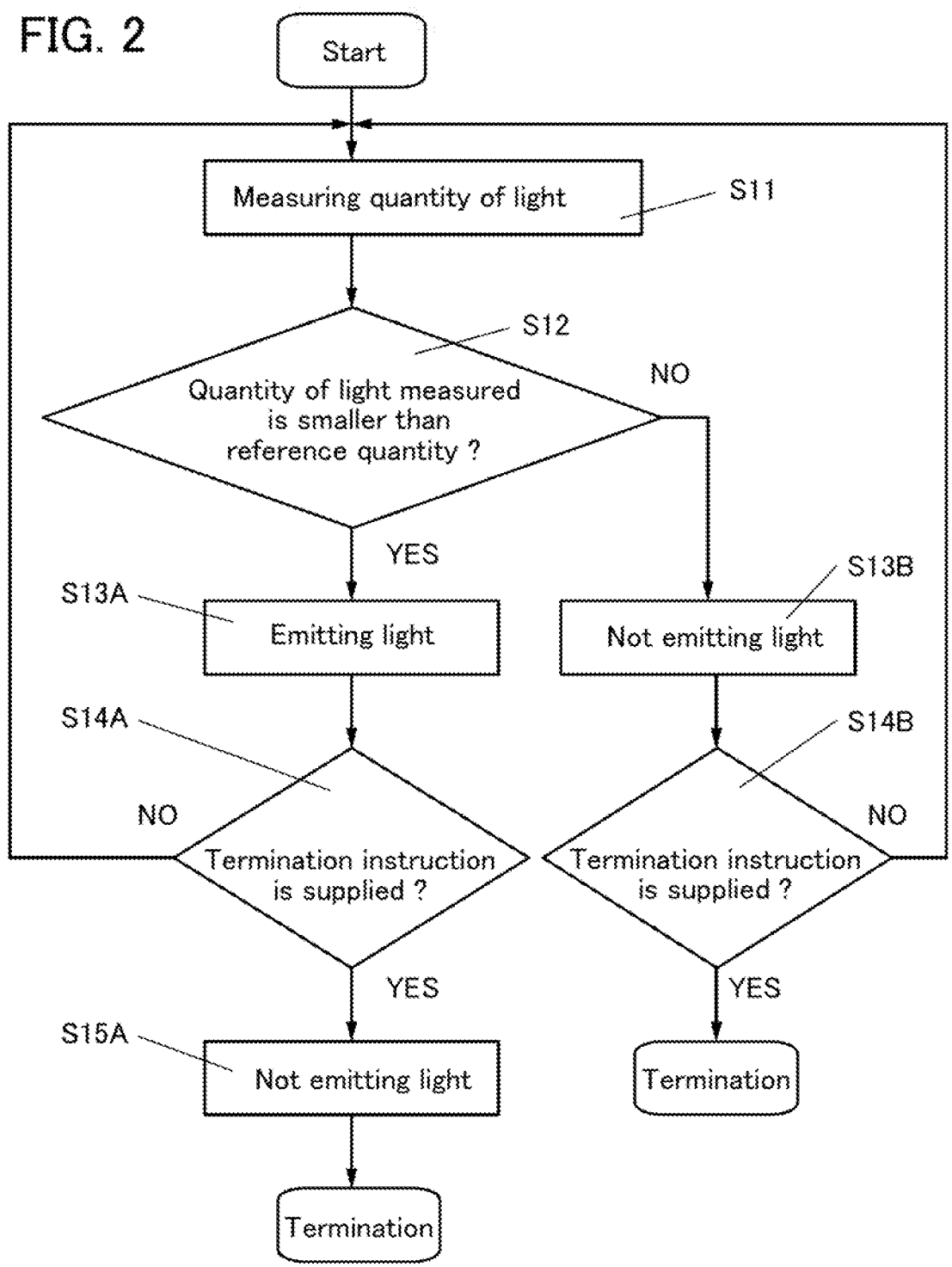
FIG. 2 is a flow chart showing an example of the function of headphones.
Figure 3:
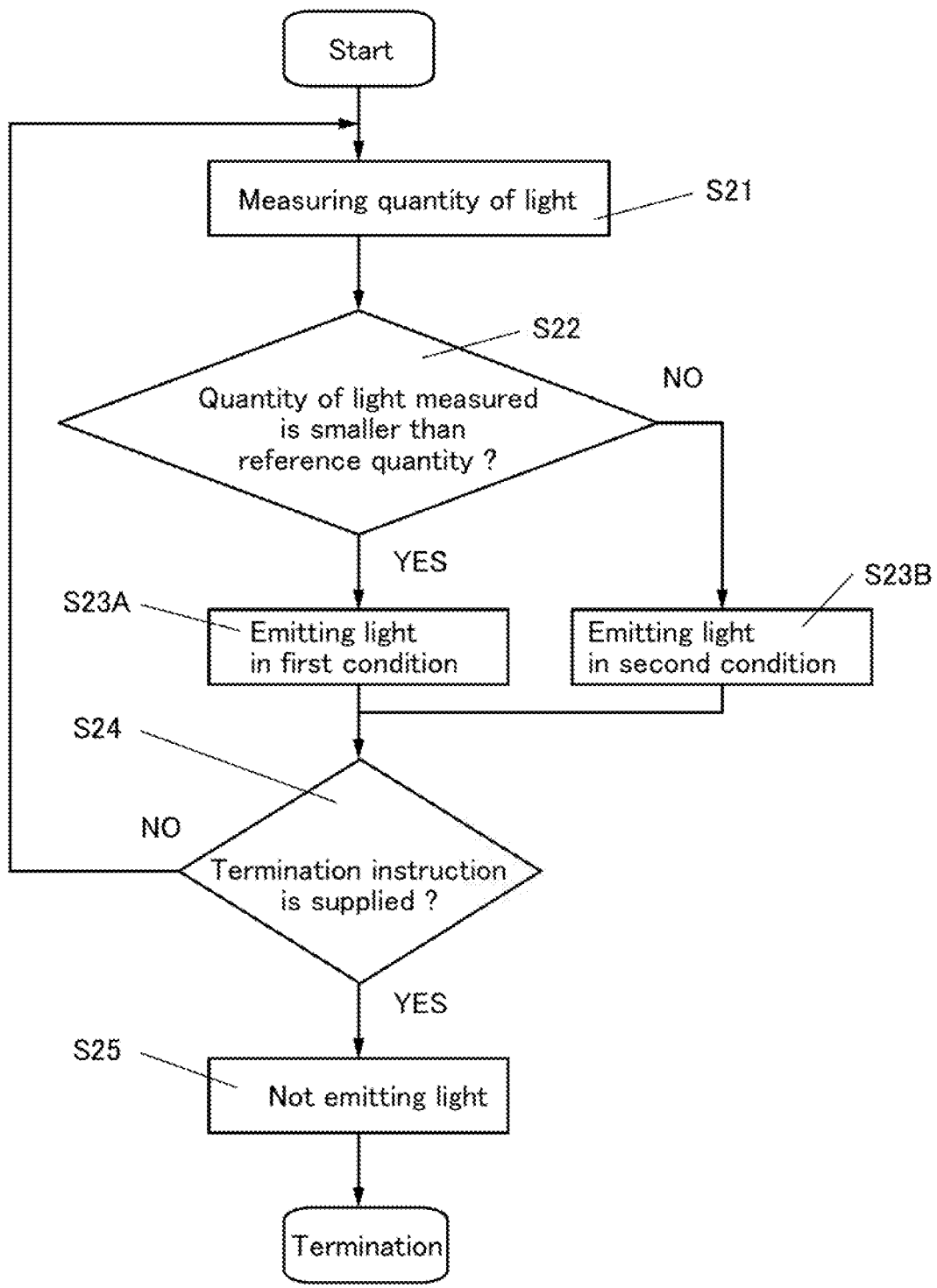
FIG. 3 is a flow chart showing an example of the function of headphones.

FIG. 2 and FIG. 3 show flow charts showing examples of functions of the headphones 10A. Operations of controlling the lighting unit 121 with the photodetector unit 123 are described with reference to FIG. 2 and FIG. 3.

It is preferable that the headphones have a function of turning on and off the lighting unit 121 with the photodetector unit 123. Furthermore, it is preferable that the user of the headphones can turn on and off the lighting unit 121 manually.

FIG. 2 shows an example in which the lighting unit 121 is turned on and off with the photodetector unit 123.

First, the quantity of light is measured by the photodetector unit 123 (Step S11). Then, the photodetector unit 123 supplies a detection signal which corresponds to the measured quantity of light to the processing unit 112.

Next, the processing unit 112 carries out an operation using the supplied detection signal (Step S12). The processing unit 112 can carry out an operation using a program read out from the memory unit 113. For example, in Step S12, the processing unit 112 determines whether or not the quantity of light measured by the photodetector unit 123 is smaller than a reference quantity.

When the quantity of light measured by the photodetector unit 123 is determined to be smaller than the reference quantity in Step S12 (YES), the lighting unit 121 emits light (Step S13A). A signal which is supplied from the processing unit 112 to the lighting unit 121 makes the lighting unit 121 emit light. When the lighting unit 121 does not emit light at a time before the signal is supplied, the lighting unit 121 begins to emit light, whereas when the lighting unit 121 has already emit light, the lighting unit 121 keeps emitting light.

When the quantity of light measured by the photodetector unit 123 is determined to be larger than or equal to the reference quantity in Step S12 (NO), the lighting unit 121 does not emit light (Step S13B). A signal which is supplied from the processing unit 112 to the lighting unit 121 makes the lighting unit 121 not emit light. When the lighting unit 121 does not emit light at the time before the signal is supplied, the lighting unit 121 keeps the state, whereas when the lighting unit 121 has already emit light, light emission of the lighting unit 121 is stopped.

In Steps S14A and S14B, the processing unit 112 determines whether a termination instruction is sent to the processing unit 112.

As the termination instruction, the user turns off the power or function manually, or a signal is output at a time or after a period which has been set by a timer in advance, for example.

The operations shown in FIG. 2 can be performed at any time as long as power is supplied to the photodetector unit 123, the processing unit 112, and the like. For example, it is possible to determine operation conditions in advance. For example, the operation conditions can be set so that operations are performed repeatedly without any interval, they are performed at every certain period, or they are performed at a predetermined number of times. Whether to terminate the operation may be determined on the basis of the set operation conditions. The operation may be started or terminated by the user manually.

When the termination instruction is determined not to be supplied to the processing unit 112 in Steps S14A or S14B, the process returns to Step S11, and light is detected by the photodetector unit 123.

When the termination instruction is determined to be supplied to the processing unit 112 in Step S14A, a signal is supplied from the processing unit 112 to the lighting unit 121 to stop light emission of the lighting unit 121 (Step S15A). Then, the operation of controlling the lighting unit 121 with the photodetector unit 123 is terminated.

When the instruction operation is determined to be supplied to the processing unit 112 in Step S14B, the operation of controlling the lighting unit 121 with the photodetector unit 123 is terminated.

The headphones preferably have a function of changing the luminance, the color, or the like of light emitted from the lighting unit 121 with the photodetector unit 123. Alternatively, it is preferable that the user can change the luminance, the color, or the like of light emitted from the lighting unit 121 manually.

FIG. 3 shows an example in which the luminance, the color, or the like of light emitted from the lighting unit 121 is changed with the photodetector unit 123.

First, the quantity of light is measured by the photodetector unit 123 (Step S21). Then, the photodetector unit 123 supplies a detection signal which corresponds to the quantity of measured light to the processing unit 112.

Next, the processing unit 112 carries out an operation using the supplied detection signal (Step S22). For example, the processing unit 112 determines whether or not the quantity of light measured by the photodetector unit 123 is smaller than a reference quantity.

When the quantity of light measured by the photodetector unit 123 is determined to be smaller than the reference quantity in Step S22 (YES), the processing unit 112 supplies a signal to the lighting unit 121 so that the lighting unit 121 emits light in a first condition (Step S23A).

When the quantity of light measured by the photodetector unit 123 is determined to be larger than or equal to the reference quantity in Step S22 (NO), the processing unit 112 supplies a signal to the lighting unit 121 so that the lighting unit 121 emits light in a second condition (Step S23B).

Although the lighting unit 121 emits light in the second condition when the quantity of light measured by the photodetector unit 123 is equal to the reference quantity in Step S22, the lighting unit 121 may emit light in the first condition at this time. That is, the processing unit 112 may determine whether the quantity of light measured by the photodetector unit 123 is smaller than or equal to the reference quantity.

For example, at least one of the luminance, the color, and the like of emitted light differs between the first condition and the second condition. For example, the luminance in the second condition can be higher than that in the first condition. That is, the luminance of light emitted from the lighting unit 121 in a dim or bright place is higher than that in a dark place, which can enhance an effect of illuminating the surroundings or notifying others around the user of the user's existence with the lighting unit 121, in a dim or bright place.

In Step S24, the processing unit 112 determines whether a termination instruction is sent to the processing unit 112.

When the termination instruction is determined not to be supplied to the processing unit 112 in Step S24, the process returns to Step S21, and the quantity of light is measured by the photodetector unit 123.

When the termination instruction is determined to be supplied to the processing unit 112 in Step S24, a signal is supplied from the processing unit 112 to the lighting unit 121 to stop light emission of the lighting unit 121 (Step S25). Then, the operation of controlling the lighting unit 121 with the photodetector unit 123 is terminated.

Configuration Example 2 of Headphones

Figure 1B:
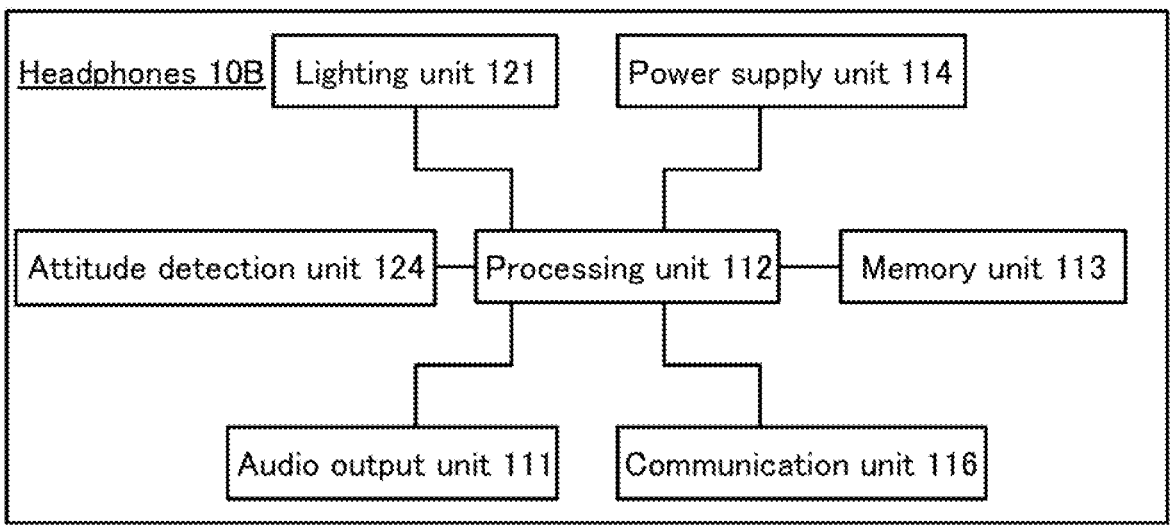

Headphones 10B shown in FIG. 1B include the audio output unit 111, the processing unit 112, the memory unit 113, the power supply unit 114, a communication unit 116, the lighting unit 121, and an attitude detection unit 124.

The attitude detection unit 124 can measure the attitude (e.g., inclination or direction) of the headphones or change in the attitude of the headphones.

For example, the attitude detection unit 124 has a function of supplying a detection signal which corresponds to change in attitude measured by the attitude detection unit 124 to the processing unit 112. The processing unit 112 has a function of carrying out an operation using the supplied detection signal. The processing unit 112 can control light emission of the lighting unit 121 by supplying a signal which corresponds to the operation result to the lighting unit 121.

Figure 4:
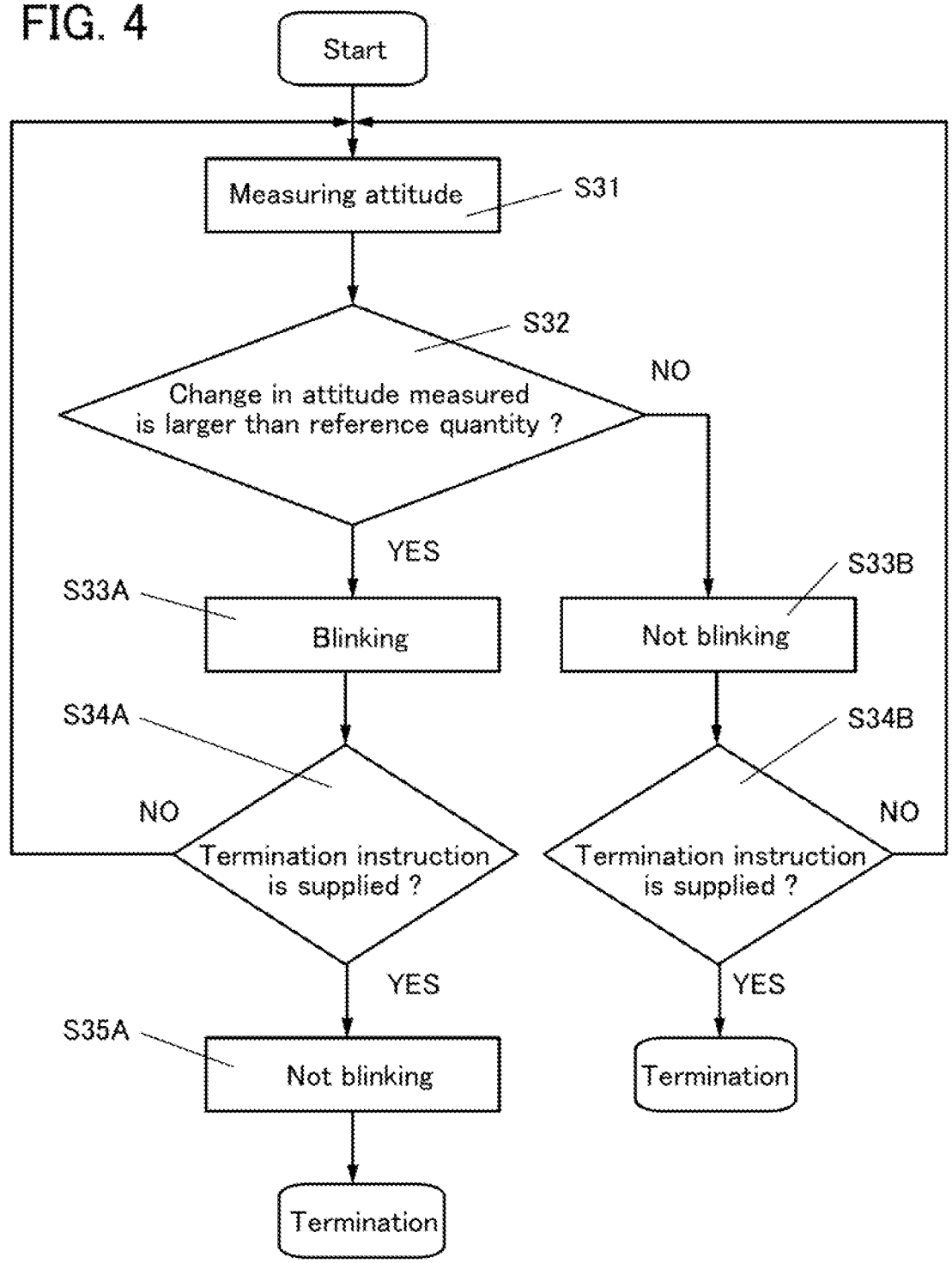
FIG. 4 is a flow chart showing an example of the function of headphones.

FIG. 4 shows a flow chart showing an example of the function of the headphones 10B. Operations of controlling the lighting unit 121 with the attitude detection unit 124 are described with reference to FIG. 4.

The headphones preferably have a function of making the lighting unit 121 blink with the attitude detection unit 124. In addition, it is preferable that the user of the headphones can blink the lighting unit 121 manually.

A signal can be sent to others around the user by blinks of the lighting unit 121. Blinks of the lighting unit 121 can be used as a variety of signs depending on circumstances.

For example, in the case of headphones in which the lighting unit 121 is provided on the right and left sides, one of the lighting units 121 can blink to indicate a direction (the right or left). That is, the lighting unit 121 can be used as a direction indicator (also referred to as a blinker, a turn signal, and the like). The user of the headphones can notify a direction to which the user is to turn, by blinking the lighting unit 121.

FIG. 4 shows an example in which the start and the end of blinks of the lighting unit 121 are controlled with the attitude detection unit 124.

First, change in the attitude of the headphones is measured by the attitude detection unit 124 (Step S31). Then, the attitude detection unit 124 supplies a detection signal which corresponds to the change in the attitude measured by the attitude detection unit 124 to the processing unit 112.

Next, the processing unit 112 carries out an operation using the supplied detection signal (Step S32). For example, in Step S32, the processing unit 112 determines whether the change in the attitude measured by the attitude detection unit 124 is larger than a reference quantity.

When the change in the attitude measured by the attitude detection unit 124 is determined to be larger than the reference quantity in Step S32 (YES), the lighting unit 121 blinks (Step S33A). A signal supplied from the processing unit 112 to the lighting unit 121 makes the lighting unit 121 blink.

When the change in the attitude measured by the attitude detection unit 124 is determined to be smaller than or equal to the reference quantity in Step S32 (NO), the lighting unit 121 does not blink (Step S33B). A signal supplied from the processing unit 112 to the lighting unit 121 makes the lighting unit 121 not blink. When the lighting unit 121 blinks at the time before the signal is supplied, the lighting unit 121 stops blinking. When the lighting unit 121 does not blink at the time before the signal is supplied, the lighting unit 121 can remain in the same state as that before the signal is supplied, i.e., the lighting unit 121 can keep emitting light or keep not emitting light.

Note that for blinking of the lighting unit 121, a period during which the lighting unit 121 keeps blinking or the number of blinks of the lighting unit 121 may be determined. After a predetermined period or a predetermined number of blinks, the processing unit 112 may supply a signal to the lighting unit 121 to stop blinks of the lighting unit 121. In that case, blinks of the lighting unit 121 are not necessarily stopped in Step S33B.

In Steps S34A and S34B, the processing unit 112 determines whether a termination instruction is sent to the processing unit 112. The operations shown in FIG. 4 can be performed at any time as long as power is supplied to the attitude detection unit 124, the processing unit 112, and the like. Operation conditions may be determined in advance so that, for example, operations are performed repeatedly without any interval, they are performed at every certain period, or they are performed at a predetermined number of times. Whether to terminate the operation may be determined on the basis of the set operation conditions. The operation may be started or terminated by the user manually.

When the termination instruction is determined not to be supplied to the processing unit 112 in Step S34A or S34B, the process returns to Step S31, and change in the attitude is measured by the attitude detection unit 124.

When the termination instruction is determined to be supplied to the processing unit 112 in Step S34A, a signal is supplied from the processing unit 112 to the lighting unit 121 to stop blinks of the lighting unit 121 (Step S35A). Then, the operation of controlling the lighting unit 121 with the attitude detection unit 124 is terminated. Note that in the case where a period during which blinks continue or the number of blinks is determined, blinks may be stopped after the predetermined period is elapsed or the predetermined number of blinks are made.

When the termination instruction is determined to be supplied to the processing unit 112 in Step S34B, the operation of controlling the lighting unit 121 with the attitude detection unit 124 is terminated.

Next, components of the headphones 10A and 10B are described in detail.

[Audio Output Unit 111]

The audio output unit 111 has a function of outputting sound. The audio output unit 111 is controlled by the processing unit 112.

The audio output unit 111 can convert an audio signal supplied from the processing unit 112 into sound and output the sound to the outside of the headphones.

The audio output unit 111 includes a speaker (a unit for emitting sound, also referred to as a driver unit) and a controller, for example.

[Processing Unit 112]

The processing unit 112 has a function of carrying out an operation using a supplied detection signal and a program and a function of supplying a signal which corresponds to the operation result to the lighting unit 121.

The processing unit 112 includes an operation circuit, a central processing unit (CPU), or the like, for example.

The processing unit 112 has a function of controlling components including the audio output unit 111, the memory unit 113, the power supply unit 114, the lighting unit 121, and a detection unit (the photodetector unit 123 in the headphones 10A or the attitude detection unit 124 in the headphones 10B).

Signals are transmitted between the processing unit 112 and the components via a system bus. Signals are input from the components, which are connected via the system bus, to the processing unit 112. The processing unit 112 processes the input signals and generates signals to be output to the components. The processing unit 112 can implement integrated control over the components connected to the system bus.

A transistor including an oxide semiconductor in its channel formation region is preferably used in the processing unit 112. The transistor has an extremely low off-state current; therefore, with the use of the transistor as a switch for retaining electric charge (data) which flows into a capacitor serving as a memory element, a long data retention period can be ensured. When this feature is applied to at least one of a register and a cache memory included in the processing unit 112, the processing unit 112 can be operated only when needed, otherwise immediately preceding processing data is saved in the memory element, thereby making normally-off computing possible and reducing the power consumption of the headphones.

The processing unit 112 may include a microprocessor such as a digital signal processor (DSP) or a graphics processing unit (GPU). The microprocessor may be configured with a programmable logic device (PLD) such as a field programmable gate array (FPGA) or a field programmable analog array (FPAA). The processing unit 112 can interpret and execute instructions from programs to process various kinds of data and control programs. The programs to be executed by the processor are stored in at least one of a memory region of the processor or the memory unit 113.

The processing unit 112 may include a main memory. The main memory includes at least one of a volatile memory such as a random access memory (RAM) and a nonvolatile memory such as a read-only memory (ROM).

For example, a dynamic random access memory (DRAM) or a static random access memory (SRAM) is used as the RAM, in which case a virtual memory space is assigned to the RAM to be used as a work space for the processing unit 112. An operating system, an application program, a program module, program data, a look-up table, and the like which are stored in the memory unit 113 are loaded into the RAM and executed. The data, program, and program module which are loaded into the RAM are each directly accessed and operated by the processing unit 112.

The ROM can store a basic input/output system (BIOS), firmware, and the like for which rewriting is not needed. Examples of the ROM include a mask ROM, a one-time programmable read only memory (OTPROM), and an erasable programmable read only memory (EPROM). Examples of the EPROM include an ultra-violet erasable programmable read only memory (UV-EPROM) which can erase stored data by irradiation with ultraviolet rays, an electrically erasable programmable read only memory (EEPROM), and a flash memory.

[Memory Unit 113]

The memory unit 113 includes a computer program with which the processing unit 112 executes arithmetic processing, a look-up table, and the like, for example.

The memory unit 113 includes at least one of a memory device including a nonvolatile memory element, such as a flash memory, a magnetoresistive random access memory (MRAM), a phase change RAM (PRAM), a resistance RAM (ReRAM), or a ferroelectric RAM (FeRAM), and a memory device including a volatile memory element, such as a DRAM or an SRAM. Alternatively, the memory unit 113 may include a storage media drive such as a hard disk drive (HDD) or a solid state drive (SSD).

The headphones may exchange data with a memory device which is capable of transmitting and receiving data with or without a wire. The processing unit 112 can transmit/receive data to/from a memory device such as HDD or SSD or a memory medium such as a flash memory, a Blu-ray Disk, or a digital versatile disc (DVD), via a connector and the external connection terminal 115 or via the communication unit 116.

The memory unit 113 may have a function of storing an audio signal. The audio signal stored in the memory unit 113 is supplied to the audio output unit 111 via the processing unit 112.

[Power Supply Unit 114]

The headphones preferably include the power supply unit 114. The power supply unit 114 includes at least a battery. Examples of the battery include a primary battery, a secondary battery, a lithium-ion secondary battery such as a lithium polymer battery with a gel electrolyte (a lithium-ion polymer battery), a lithium air battery, a lead-acid battery, a nickel-hydrogen battery, a nickel-cadmium battery, a nickel-iron battery, a nickel-zinc battery, a silver oxide-zinc battery, a solid battery, an air battery, a zinc-air battery, a capacitor, a lithium-ion capacitor, an electric double layer capacitor, an ultracapacitor, and a supercapacitor.

The power supply unit 114 can perform charging through wires using an AC adapter or with a wireless power feeding system such as an electric-field coupling system, an electromagnetic induction system, or an electromagnetic resonance (electromagnetic resonant coupling) system.

Figure 5:
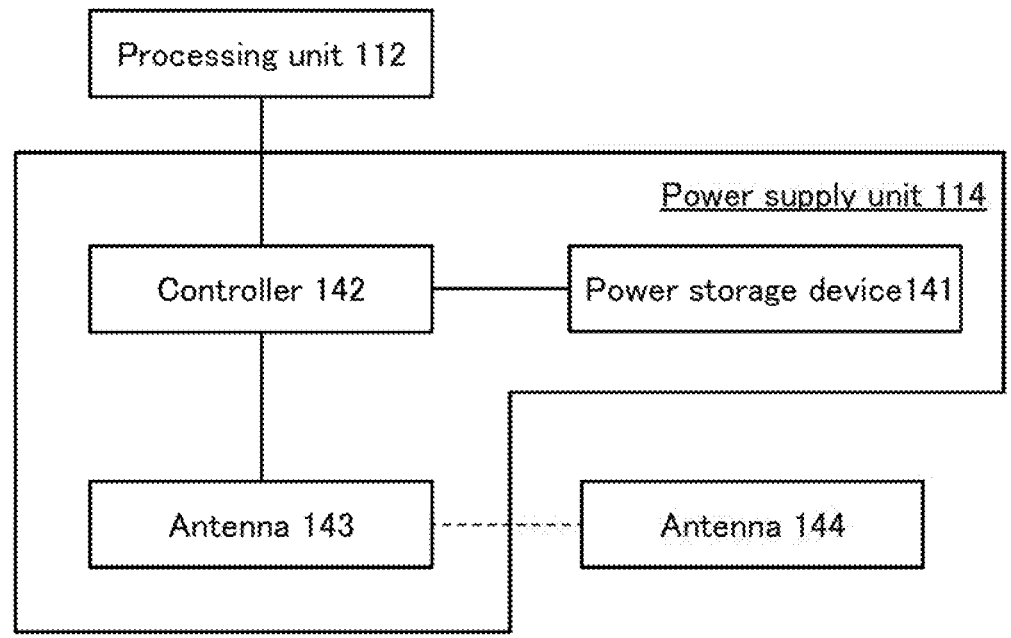
FIG. 5 is a block diagram showing an example of a power supply unit.

A configuration example of the power supply unit 114 is shown in FIG. 5.

The power supply unit 114 includes a power storage device 141, a controller 142, and an antenna 143. It is preferable that the power supply unit 114 have a function of charging the power storage device 141 wirelessly with the use of the antenna 143.

The antenna 143 can receive power from an external antenna (e.g., an antenna 144 of a charger). There is no particular limitation on a power receiving system.

The controller 142 has a function of converting power received via the antenna 143 into power to be supplied to the power storage device 141 and outputting the power to the power storage device 141. For example, the controller 142 may function as an AC-DC converter. In that case, the controller 142 converts power received via the antenna 143 into DC power and outputs the DC power to the power storage device 141.

Power can be supplied from the power storage device 141 to components including the processing unit 112 via the controller 142.

For example, any of the power storage devices mentioned as examples of the battery can be used as the power storage device 141.

A lithium-ion secondary battery which achieves a high energy density is preferably used because the weight and size of the headphones can be reduced.

As the power storage device 141, any of secondary batteries with a variety of shapes, such as a coin-type (single-layer flat type) secondary battery, a cylindrical secondary battery, a thin secondary battery, a square-type secondary battery, and a sealed secondary battery can be used. Furthermore, a structure in which a plurality of positive electrodes, a plurality of negative electrodes, and a plurality of separators are stacked or a structure in which a positive electrode, a negative electrode, and a separator are wound (winding structure) may be employed.

The power storage device 141 preferably has flexibility. For example, when a film is used as an exterior body, the flexibility of the power storage device 141 can be increased. In a region surrounded by the exterior body, at least a positive electrode, a negative electrode, and an electrolyte (or an electrolytic solution) are provided.

The power supply unit 114 may include a battery management unit (BMU), for example. The BMU performs at least one of collection of data on cell voltage or cell temperatures of the battery, monitoring of overcharge and overdischarge, control of a cell balancer, management of a deterioration state of the battery, calculation of the remaining battery power (state of charge: SOC), and control of detection of a failure.

The headphones include at least one of the external connection terminal 115 and the communication unit 116.

The headphones can reproduce sound by converting an audio signal supplied from an external device (e.g., an electronic device or an electric device) connected thereto with or without a wire, into sound. In addition, the headphones may be supplied with power from an external device connected thereto with a wire. Examples of the electronic and electric devices include cellular phones (also referred to as mobile phones or mobile phone devices), portable game consoles, portable information terminals, audio players, portable CD players, radios, IC recorders, stereo sets, television sets (also referred to as televisions and television receivers), personal computers, monitors for computers and the like, image reproducing devices which reproduce still or moving images stored in memory media such as DVDs, cameras such as digital video cameras, large game machines such as pachinko machines, electric musical instruments such as electric guitars and electric bass guitars, synthesizers, and electronic musical instruments such as electronic organs.

[External Connection Terminal 115]

The headphones can be connected to an external device with a cable or a cord. A plug as an example of the external connection terminal 115 can be connected to a headphone terminal of an external device, for example. A plug of an external device can be connected to a port as an example of the external connection terminal 115.

[Communication Unit 116]

The communication unit 116 can receive data from an external device with analog transmission with FM modulation, wireless communication conformable to a communication standard, such as Bluetooth (registered trademark) and Wi-Fi (registered trademark), infrared communication, or the like. Examples of the data include audio data and image data.

[Lighting Unit 121]

The lighting unit 121 has a function of emitting light. The lighting unit 121 is controlled by the processing unit 112.

The lighting unit 121 includes a light-emitting panel and a controller, for example.

Any of a point light source, a line light source, and a planar light source can be used for the light-emitting panel.

The light-emitting panel includes a light-emitting element such as an inorganic electroluminescence (EL) element, an organic EL element, or a light-emitting diode (LED).

It is possible to at least switch on and off of the lighting unit 121. In addition, the lighting unit 121 may be capable of blinking. In the case where the lighting unit 121 includes a plurality of light-emitting elements, the light emitting elements are preferably capable of being driven independently of each other.

[Detection Unit]

The detection unit has a function of obtaining detection information and supplying a detection signal corresponding to the detection data to the processing unit 112.

For example, the detection unit includes a sensor element and a controller (the two are also collectively referred to as a sensor).

Examples of the sensor include a variety of sensors having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays.

In this embodiment, sensors having a function of measuring the quantity of light or attitude (e.g., inclination or direction) are mainly described.

[Photodetector Unit 123]

The photodetector unit 123 includes a sensor (e.g., a photosensor or an illuminance sensor) which measures the brightness of an environment where the headphones are used. The photodetector unit 123 preferably includes a photoelectric conversion element such as a photodiode, for example. The photodetector unit 123 supplies a detection signal which corresponds to the quantity of received light to the processing unit 112.

[Attitude Detection Unit 124]

The attitude detection unit 124 has a function of detecting the attitude (e.g., the inclination or the direction) of the headphones. For example, an acceleration sensor, an angular velocity sensor (e.g., a gyroscope sensor), a vibration sensor, a pressure sensor, or the like can be used for the attitude detection unit 124.

Alternatively, the attitude detection unit 124 may include a camera module including an image sensor. Change in the attitude of the headphones can be obtained from a difference between taken images.

Configuration Example 3 of Headphones

Figure 6A:
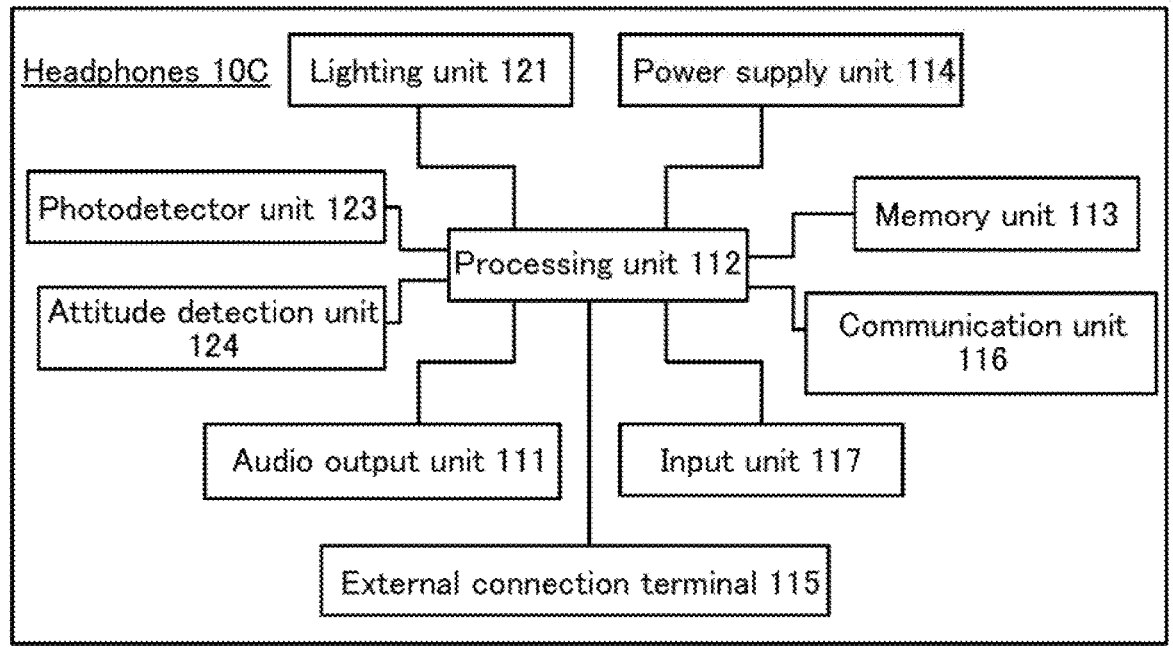
FIGS. 6A and 6B are block diagrams showing examples of headphones.

Headphones 10C shown in FIG. 6A includes the audio output unit 111, the processing unit 112, the memory unit 113, the power supply unit 114, the external connection terminal 115, the communication unit 116, an input unit 117, the lighting unit 121, the photodetector unit 123, and the attitude detection unit 124.

Figure 6B:
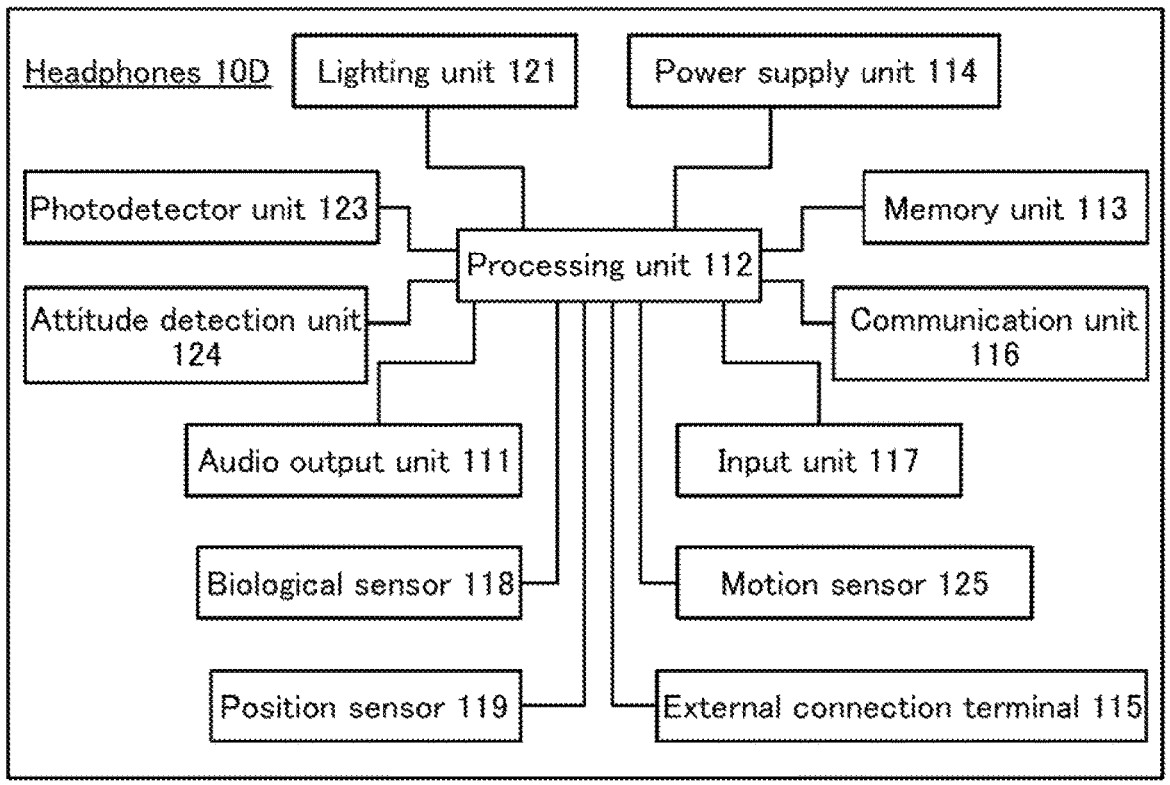

Headphones 10D shown in FIG. 6B includes, in addition to the configuration of the headphones 10C, a biological sensor 118, a position sensor 119, and a motion sensor 125.

The headphones 10C and the headphones 10D both have the photodetector unit 123 and the attitude detection unit 124; therefore, the headphones 10C and the headphones 10D each can control the lighting unit 121 using the photodetector unit 123 and the attitude detection unit 124. The headphones 10C and the headphones 10D can conduct any of the control operations shown in FIG. 2, FIG. 3, and FIG. 4, for example.

[Input Unit 117]

For example, one or more buttons or switches provided in a housing, an input terminal capable of being connected to another input unit, or the like can be used as the input unit 117. For example, a switch relating to on and off of the power of the headphones or the lighting unit 121, a play button, a stop button, a next button, a previous button, a volume button, a button for adjusting the light of the lighting unit 121, a camera shutter button, and the like may be provided.

The input unit 117 may include a touch panel and a controller. For example, a touch panel can be provided in a housing of the headphones.

In addition, the headphones may include a camera module so that the user of the headphones can input data by gesture.

[Biological Sensor 118]

The biological sensor 118 has a function of obtaining biological information and a function of supply a detection signal corresponding to the biological information to the processing unit 112.

For example, it is preferable that whether the headphones are worn or not be determined with the biological sensor 118.

The headphones preferably have a function of sensing the headphones being worn by a human body to turn on the power (or start the audio output unit 111 outputting sound) and a function of sensing the headphones being removed from a human body to turn off the power (or stop the audio output unit 111 from outputting sound).

For example, the processing unit 112 preferably has a function of stopping the audio output unit 111 from outputting the sound when the biological sensor 118 does not obtain any biological information.

Examples of the biological information include a heart rate, a respiration rate, a pulse, body temperature, and blood pressure.

For example, an optical sensor can be used to measure a heart rate from contraction of capillaries.

Turning on/off the power of the headphones may be performed by determining whether the headphones are worn or not with the use of a sensor for measuring the electrical conductivity of skin.

Any of these sensors is preferably mounted on a part which is in contact with the skin of a person who wears the headphones.

[Position Sensor 119]

The position sensor 119 has a function of obtaining positional information on the headphones and a function of supplying a detection signal which corresponds to the positional information to the processing unit 112.

The headphones may be capable of receiving GPS (Global positioning System) signals, for example.

The headphones may have a function of switching music in accordance with the obtained positional information, for example. Specifically, in a road race e.g., a marathon race or a walking race, when an athlete who wears the headphones of one embodiment of the present invention reaches a certain distance from the starting point, the music is switched. The switch of the music can let the athlete be aware of reaching the certain distance from the start point.

The headphones preferably have functions of sensing biological information and positional information and transmitting the information. For example, the headphones can sense changes in user's physical conditions and transmit the biological information and the positional information to an external device. Thus, for example, when the user gets out of condition or has an accident, he/she can be saved or the like quickly.

For example, the headphones may be connected to a portable information terminal such as a smartphone wirelessly so as to send and receive an e-mail.

[Motion Sensor 125]

The motion sensor 125 has a function of sensing the movement of the headphones or the user of the headphones and a function of supplying a detection signal corresponding to the movement to the processing unit 112.

The motion sensor 125 can include an acceleration sensor, an angular velocity sensor, or the like, for example.

For example, the headphones can adjust the volume, switch the music, or the like with the motion sensor 125 in response to change in the movement of the user of the headphones.

The headphones can execute processing, e.g., increasing or reducing the volume, starting or stopping playing music, or changing the tune when the headphones sense the user who has stood still beginning to walk or run, for example.

<Configuration example 4 of headphones>

Figure 7:
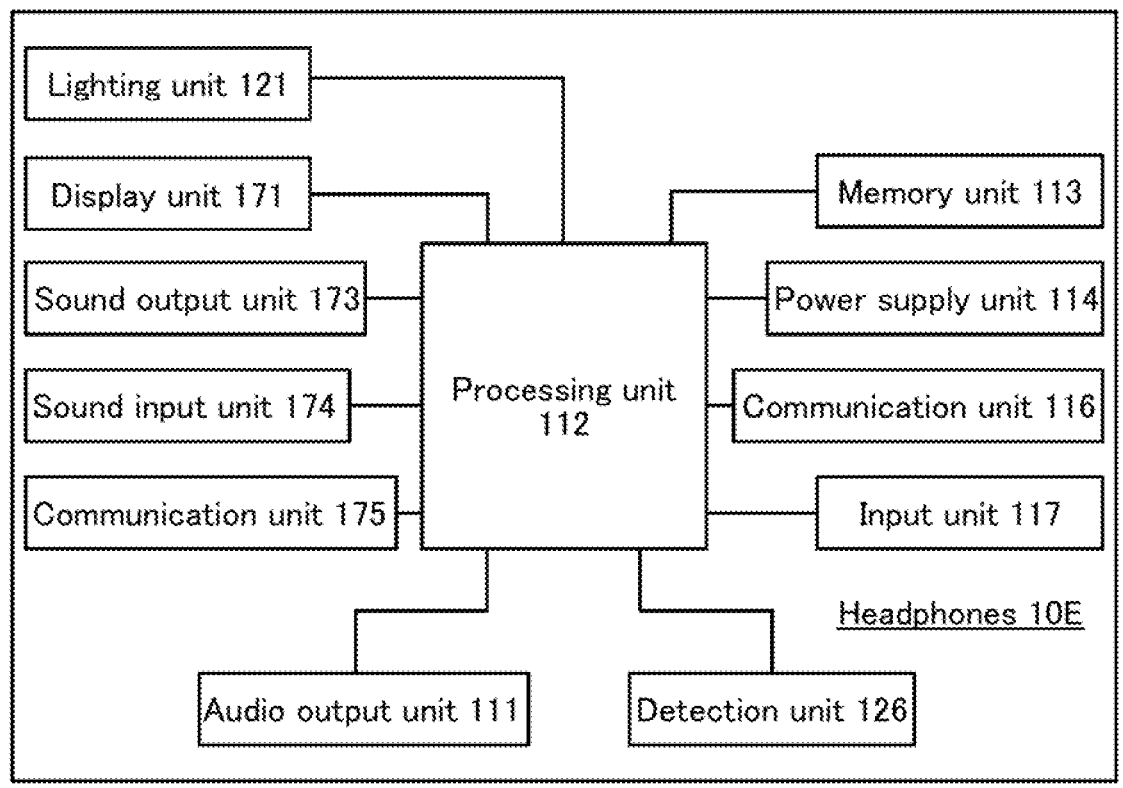
FIG. 7 is a block diagram showing an example of headphones.

Headphones 10E shown in FIG. 7 includes the audio output unit 111, the processing unit 112, the memory unit 113, the power supply unit 114, the communication unit 116, the input unit 117, the lighting unit 121, a detection unit 126, a display unit 171, a sound output unit 173, a sound input unit 174, and a communication unit 175.

The headphones 10E have a communication function so as to be capable of sending or receiving an e-mail by itself. The headphones 10E are preferably capable of executing a variety of applications, e.g., mobile phone calls, e-mailing, reading and editing texts, Internet communication, and a computer game, in addition to playing music.

[Display Unit 171]

The display unit 171 has a function of displaying an image. The display unit 171 is controlled by the processing unit 112. The display unit 171 can display image data stored in the memory unit 113, for example. The display unit 171 can display image data supplied from a computer network or an electronic device with wireless communication, for example. While the user wears the headphones with the display units, a person other than the user can control a light-emitting region of the headphones, e.g., can instruct the headphones to display an image only on a right/left side, with wireless communication.

The display unit 171 includes a controller and a display panel. The display panel includes a display element. Examples of the display element include a light-emitting element such as an inorganic EL element, an organic EL element, or an LED; a liquid crystal element; an electrophoretic element; and a display element using micro electro mechanical systems (MEMS). The display panel is preferably a touch panel with a touch sensor. The user wearing the headphones can switch on and off of the display or adjust the brightness of the display by touch input for the display unit. Note that when the lighting unit 121 has a function of displaying an image, the lighting unit 121 can also serve as the display unit 171.

[Sound Output Unit 173]

The sound output unit 173 has a function of outputting sound. The sound output unit 173 is controlled by the processing unit 112.

The sound output unit 173 includes a speaker or a sound output connector, and a controller, for example.

The audio output unit 111 is configured to output sound toward the user of the headphones through ear pads of the headphones. In contrast, the sound output unit 173 is configured to output sound toward persons who do not wear the headphones (persons around the headphones and the user who removes the headphones). The sound output unit 173 can output a ringtone for an incoming call or e-mail, an alarm tone, and the like. Alternatively, the sound output unit 173 can output, as sound, a sound signal similar to the sound signal that can be output by the audio output unit 111.

[Sound Input Unit 174]

The sound input unit 174 has a function of inputting sound. The sound input unit 174 is controlled by the processing unit 112.

The sound input unit 174 includes a microphone or a sound input connector, and a controller, for example.

[Communication Unit 175]

The communication unit 175 has a function of connecting the headphones 10E and a computer network. Examples of the computer network include the Internet, which is an infrastructure of the World Wide Web (WWW)), an intranet, an extranet, a personal area network (PAN), a local area network (LAN), a campus area network (CAN), a metropolitan area network (MAN), a wide area network (WAN), and a global area network (GAN).

The communication unit 175 includes an antenna, for example.

The headphones may further include another communication unit so as to be connected to a telephone line.

<Headphone System>

The headphone system of one embodiment of the present invention includes headphones and a portable information terminal.

The portable information terminal includes an input unit and a communication unit. The input unit has a function of supplying a signal corresponding to input contents to the communication unit. The communication unit has a function of supplying a signal which corresponds to the supplied signal to a communication unit of the headphones.

There is a limitation on contents that the user wearing the headphones can input from an input unit (e.g., a touch panel or buttons) of the headphones.

The headphone system of one embodiment of the present invention makes it possible to operate the headphones with the portable information terminal. Therefore, the user wearing the headphones can perform a variety of inputs and operations for the headphones.

The portable information terminal is preferably a wearable information terminal (also referred to as a wearable device).

In contrast to a non-wearable portable information terminal, the wearable information terminal makes it unnecessary for the user to hold the portable information terminal in the user's hand or take out the portable information terminal from a bag or the like, which allows simpler and quicker use. The wearable information terminal can also be used in sports or the like, offering high convenience.

The wearable information terminal is particularly preferably an arm-worn (wristwatch-type) information terminal, e.g., a smartwatch.

Figure 8:
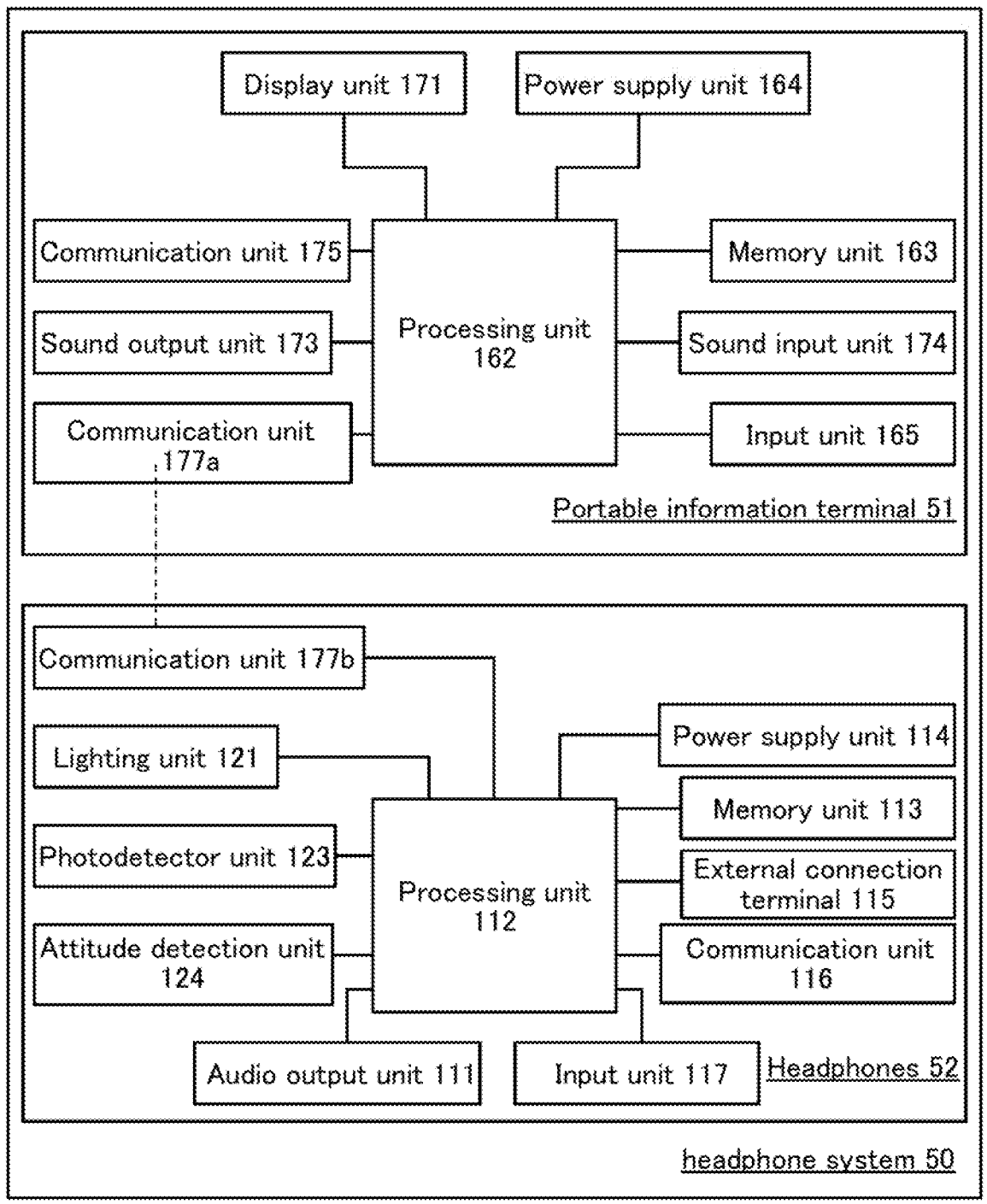
FIG. 8 is a block diagram showing an example of a headphone system.

FIG. 8 shows a headphone system 50 including a portable information terminal 51 and headphones 52.

The portable information terminal 51 includes a processing unit 162, a memory unit 163, a power supply unit 164, an input unit 165, the display unit 171, the sound output unit 173, the sound input unit 174, the communication unit 175, and a communication unit 177a.

The headphones 52 include a communication unit 177b, in addition to the configuration of the headphones 10C (see FIG. 6A).

The communication unit 177a of the portable information terminal 51 and the communication unit 177b of the headphones 52 each include an antenna.

Either of the communication units 177a and 177b can receive a signal which has been sent from the other with wireless communication.

[Processing Unit 162]

The processing unit 162 includes an operation circuit or a CPU, for example.

The processing unit 162 has a function of controlling components of the portable information terminal 51.

A configuration which is applicable to the processing unit 162 is similar to the configuration that is applicable to the processing unit 112.

[Memory Unit 163]

The memory unit 163 has a function of supplying a program to the processing unit 162.

The memory unit 163 includes a computer program with which the processing unit 162 executes arithmetic processing, a look-up table, and the like, for example.

A configuration which is applicable to the memory unit 163 is similar to the configuration that is applicable to the memory unit 113.

[Power Supply Unit 164]

The power supply unit 164 includes at least a power storage device.

The power supply unit 164 can perform charging through wires using an AC adapter or with a wireless power feeding system such as an electric-field coupling system, an electromagnetic induction system, or an electromagnetic resonance (electromagnetic resonant coupling) system.

For example, the configuration of the power supply unit 114 shown in FIG. 5 is applicable to the power supply unit 164.

[Input Unit 165]

A configuration which is applicable to the input unit 165 is similar to the configuration that is applicable to the input unit 117.

The headphones 52 preferably detect the position of the portable information terminal 51 with a camera module or the like, for example. The movement of the arm of the user can be grasped by detection of the position of the portable information terminal 51.

The user can send a sign to the headphones 52 by moving the arm. For example, the lighting unit 121 can blink in accordance with the movement of the user's arm.

For example, in the case where the lighting units 121 are provided on the right and left sides of the headphones and used as direction indicators, the lighting units 121 can be controlled by the movement of the user's arm. Specifically, the lighting unit 121 on the right side can blink in response to a big movement of the user's arm toward the right so as to indicate the right. Similarly, the lighting unit 121 on the left side can blink in response to a big movement of the use's arm toward the left so as to indicate the left.

Structure Examples of Headphones and Headphone System

Any of the configurations described using FIGS. 1A and 1B, FIG. 2, FIG. 3, FIG. 4, FIG. 5, FIGS. 6A and 6B, FIG. 7, FIG. 8 can be applied as appropriate to headphones and a headphone system which are described below.

Figure 9A:
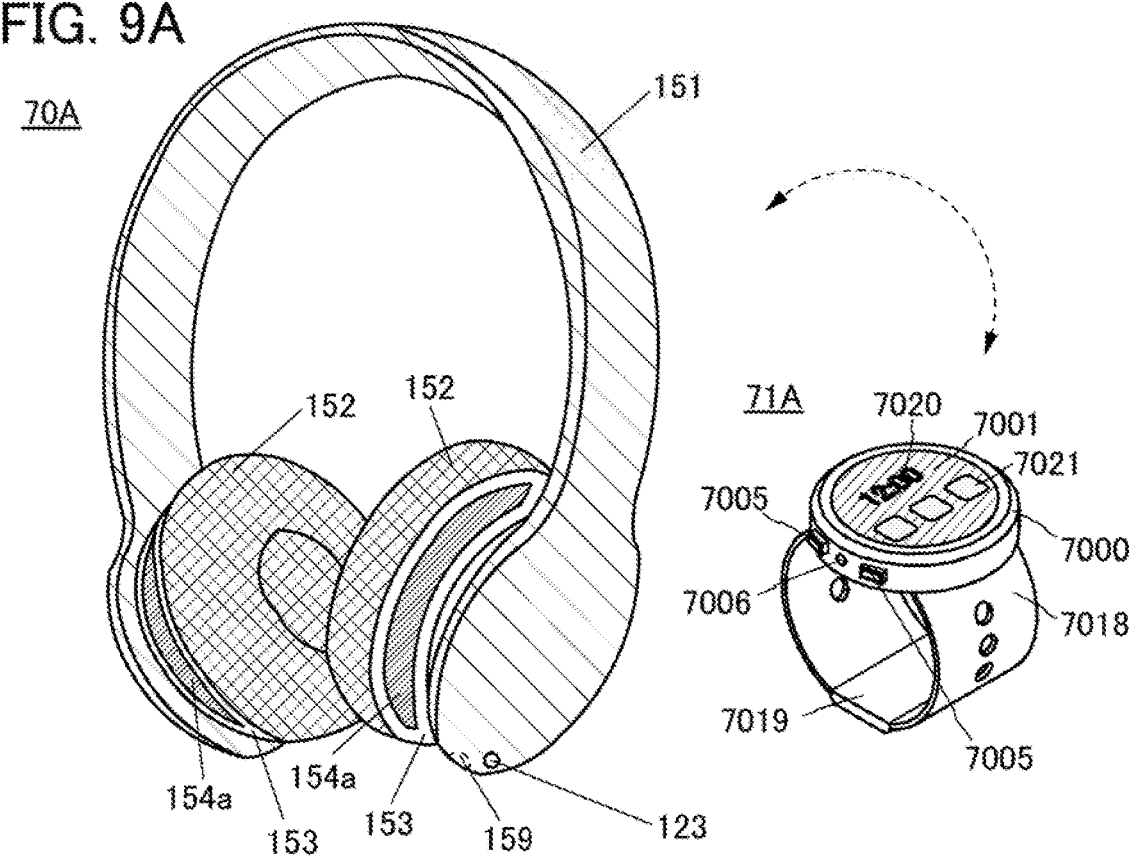
FIGS. 9A and 9B are perspective views illustrating examples of headphones.

FIG. 9A illustrates headphones 70A and an arm-worn information terminal 71A. The headphones 70A and the arm-worn information terminal 71A can be used independently of each other. In addition, the headphones 70A and the arm-worn information terminal 71A can collectively function as one headphone system.

The headphones 70A include at least a band 151, two ear pads 152, two housings 153, two light-emitting units 154a, an external connection terminal 159, and the photodetector unit 123.

The band 151 illustrated in FIG. 9A has a shape in which two almost circular parts connected to the respective housings 153 are connected with an arc-shaped part. The shape of the band 151 is not limited thereto. For example, the band 151 may have an arc shape and may be connected to the housings 153 with connection parts. Alternatively, the band 151 may have an arc shape and may be connected to the housings 153 at end portions of the arc.

The components of the headphones shown in FIGS. 1A and 1B and other figures are mainly positioned in the band 151 and at least one of the housings 153.

The ear pads 152 are parts to be in contact with the user's ears. Sound output from the sound output units are transmitted to the user's ears through the ear pads 152.

The ear pads 152 can be formed using sponge, a resin, artificial leather, leather, or cloth, for example.

The housing 153 can cover at least part of the speaker. The housing 153 preferably includes the speaker inside.

The housings 153 can be formed using plastic, wood, metal such as aluminum or titanium, or an alloy such as stainless steel, for example.

The light-emitting units 154a are provided on side surfaces of the housings 153. The light-emitting units 154a have a function of emitting light. Light-emitting panels included in the light-emitting units 154a each correspond to the light-emitting panel of the lighting unit 121. The light-emitting panels of the light-emitting units 154a may also function as the light-emitting panel of the display unit 171.

The light-emitting units 154a have curved surfaces. Light-emitting panels with curved surfaces are preferably used for the light-emitting units 154a. For example, light-emitting panels with EL elements are preferably used. The use of EL elements makes it possible to provide highly reliable flexible light-emitting panels. In addition, it is possible to reduce the sizes and weights of the light-emitting panels. The flexible light-emitting panels can be put along the housings with curved surfaces. Therefore, the light-emitting panels can be positioned without compromising the design of the housings.

There is no particular limitation on the shapes of the light-emitting units 154a. The light-emitting units 154a may be polygonal (e.g., quadrangular), circular, or elliptical, for example.

The external connection terminal 159 can be connected to an external device with a cable or a cord.

The photodetector unit 123 is positioned so as to be capable of measuring the brightness of the surroundings of the headphones. There is no limitation on the number of the photodetector units 123.

The headphones 70A include the photodetector unit 123 on the almost circular part of the band 151 that is connected to the housing 153.

The headphones 70A may have an attitude detection unit. The light-emitting units 154a on the right and left sides may be used as direction indicators, for example.

The arm-worn information terminal 71A can include a housing 7000, a display unit 7001, operation keys 7005

(including a power switch or an operation switch), an external connection terminal 7006, a band 7018, a clasp 7019, and the like. The display unit 7001 mounted in the housing 7000 also serving as a bezel includes a non-rectangular display region. The display unit 7001 can display an icon 7020 indicating time, other icons 7021, and the like.

The arm-worn information terminal 71A can have a variety of functions, for example, a function of displaying a variety of data (a still image, a moving image, a text image, and the like) on the display unit, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display unit, and the like.

The arm-worn information terminal 71A can employ near field communication that is a communication method based on an existing communication standard. Therefore, the arm-worn information terminal 71A and the headphones 70A can communicate with each other.

Figure 9B:
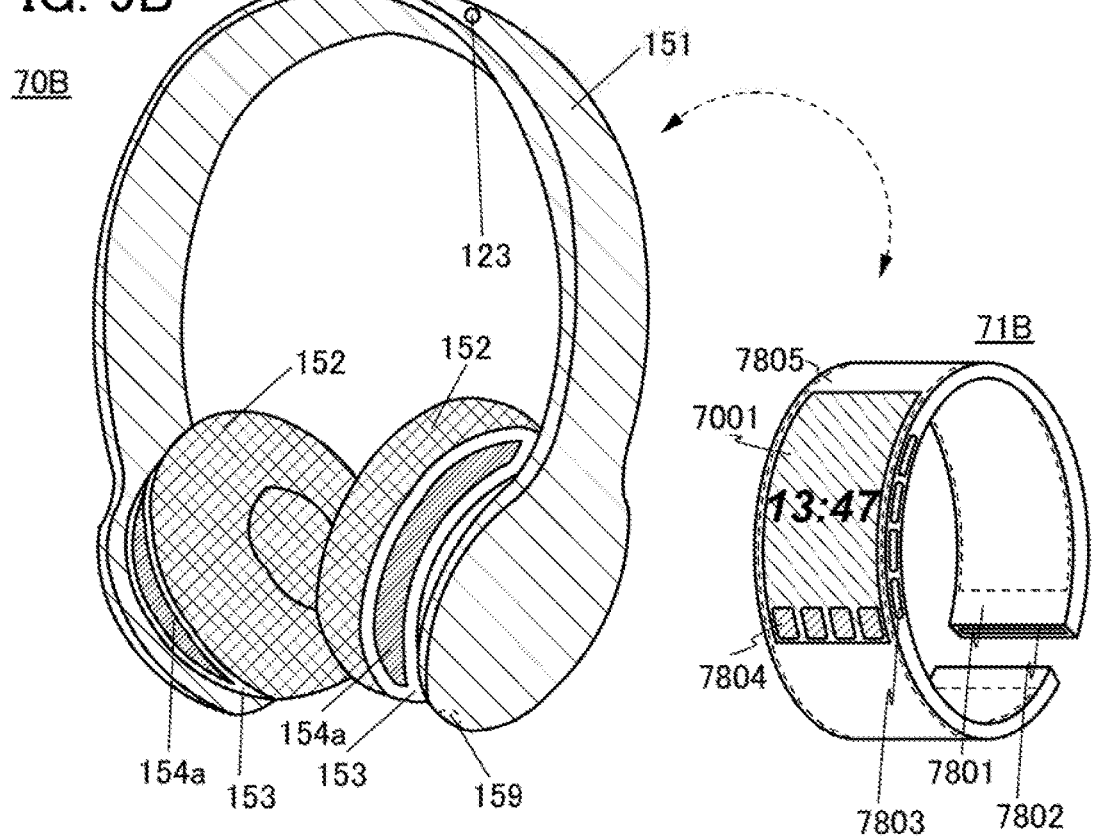

FIG. 9B illustrates headphones 70B and an arm-worn information terminal 71B. The headphones 70B and the arm-worn information terminal 71B can be used independently of each other. In addition, the headphones 70B and the arm-worn information terminal 71B can collectively function as one headphone system.

The headphones 70B include at least the band 151, two ear pads 152, two housings 153, two light-emitting units 154*a*, the external connection terminal 159, and the photodetector unit 123.

The headphones 70B are different from the headphones 70A in the position of the photodetector unit 123. The headphones 70B include the photodetector unit 123 on the arc-shaped part of the band 151.

The arm-worn information terminal 71B includes the display unit 7001, a band 7801, an external connection terminal 7802, operation buttons 7803, and the like. The band 7801 has a function of a housing. In addition, a flexible battery 7805 can be mounted on the arm-worn information terminal 71B. The battery 7805 and the display unit 7001 or the band 7801 may overlap with each other, for example.

The display unit 7001 preferably includes a display panel which is bendable at a curvature radius of greater than or equal to 0.01 mm and less than or equal to 150 mm. The display unit 7001 preferably includes a touch sensor. Therefore, the arm-worn information terminal 71B can be operated by touching the display unit 7001 with a finger or the like.

The band 7801, the display unit 7001, and the battery 7805 have flexibility. Thus, the arm-worn information terminal 71B can be easily curved to have a desired shape.

With the operation buttons 7803, a variety of functions such as time setting, on/off of the power, on/off of wireless communication, setting and cancellation of silent mode, and setting and cancellation of power saving mode can be performed. For example, the functions of the operation buttons 7803 can be set freely by the operating system incorporated in the arm-worn information terminal 71B.

By touching an icon 7804 displayed on the display unit 7001 with a finger or the like, application can be started.

The arm-worn information terminal 71B can employ near field communication that is a communication method based on an existing communication standard. Therefore, the arm-worn information terminal 71B and the headphones 70B can communicate with each other.

The arm-worn information terminal 71B may include an external connection terminal 7802. When the external connection terminal 7802 is included, the arm-worn information terminal 71B can exchange data directly with external devices (including the headphones 70B) via a connector. In addition, charging through the external connection terminal 7802 is possible. Operation of charging the arm-worn information terminal 71B may be performed with non-contact power transmission without any external connection terminal.

Figure 10A:
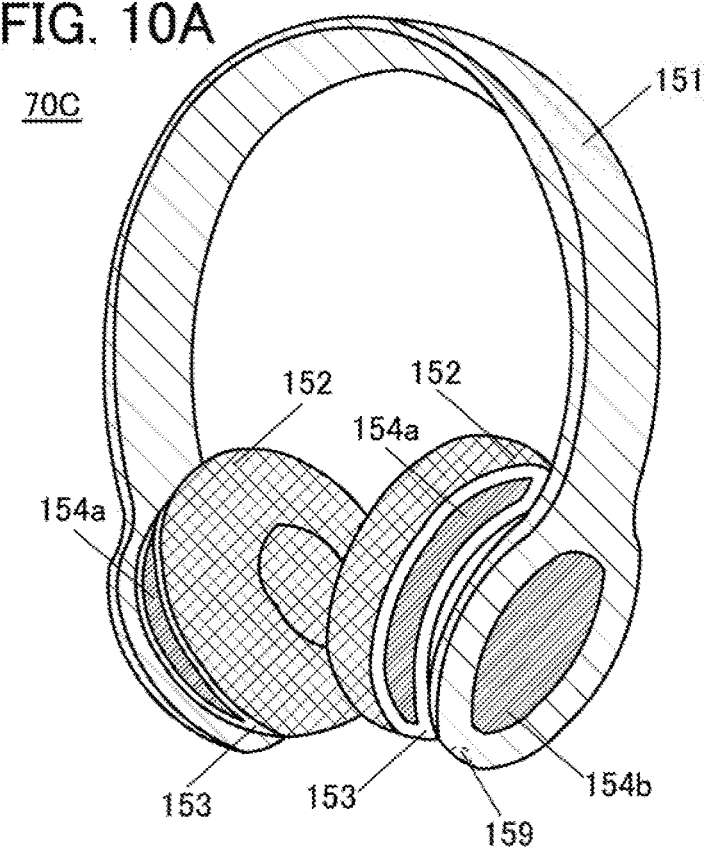
FIGS. 10A and 10B are perspective views illustrating examples of headphones.

FIG. 10A illustrates headphones 70C. The headphones 70C can be used in the headphone system of one embodiment of the present invention.

The headphones 70C include at least the band 151, two ear pads 152, two housings 153, two light-emitting units 154*a*, two light-emitting units 154*b* (only one of them is illustrated in FIG. 10A), and the external connection terminal 159.

The headphones 70C can control light emission of the two light-emitting units 154*a* in accordance with information detected by a detection unit (not illustrated). In the following structures, the headphones can control light emission of one or both of the light-emitting units 154*a* in accordance with information detected by the detection unit, even when the detection unit is not shown in the figure.

The light-emitting units 154*a* are provided on side surfaces of the housings 153.

The light-emitting units 154*b* are positioned on the almost circular parts of the band 151 that are connected to the housings 153. The light-emitting units 154*b* correspond to at least one of the light-emitting panel of the lighting unit 121 and the display panel of the display unit 171.

The light-emitting units 154*b* may be planar or may have curved surfaces. Light-emitting panels with EL elements are preferably used for the light-emitting units 154*b*. The use of EL elements makes it possible to provide a thin and light-weight light-emitting panel with high reliability. Furthermore, the light-emitting panels can be flexible, which enables the light-emitting units 154*b* to be positioned on the curved surface or a portion to be curved of the band 151.

Figure 10B:
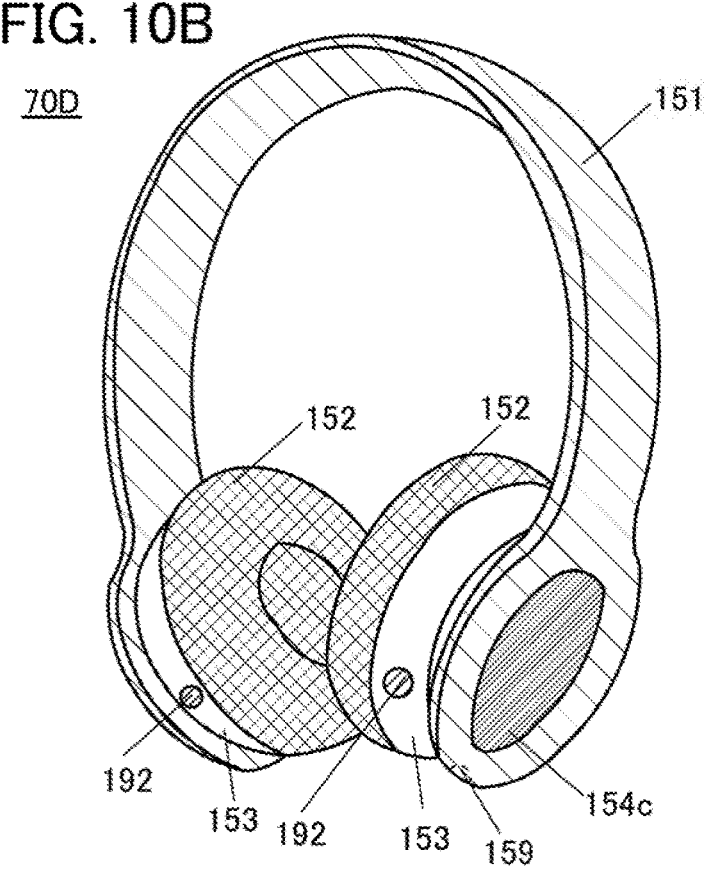

FIG. 10B illustrates headphones 70D. The headphones 70D can be used in the headphone system of one embodiment of the present invention.

The headphones 70D include at least the band 151, two ear pads 152, two housings 153, two light-emitting units 154*c* (only one of them is shown in FIG. 10B), the external connection terminal 159, and two cameras 192.

The headphones 70D are capable of measuring the attitude of the headphones or detecting the position of the arm-worn information terminal with the cameras 192 positioned on the right and left sides.

The light-emitting units 154*c* are provided on the almost circular parts of the band 151 that are connected to the housings 153. The light-emitting units 154*c* correspond to the light-emitting panel of the lighting unit 121. The light-emitting units 154*c* may also serve as the display panel of the display unit 171.

The light-emitting units 154*c* may be planar or may have curved surfaces. Light-emitting panels with EL elements are preferably used for the light-emitting units 154*c*. The use of EL elements makes it possible to provide a thin and light-weight light-emitting panel with high reliability. Furthermore, the light-emitting panels can be flexible, which enables the light-emitting units 154c to be positioned on the curved surface or a portion to be curved of the band 151.

Figure 11A:
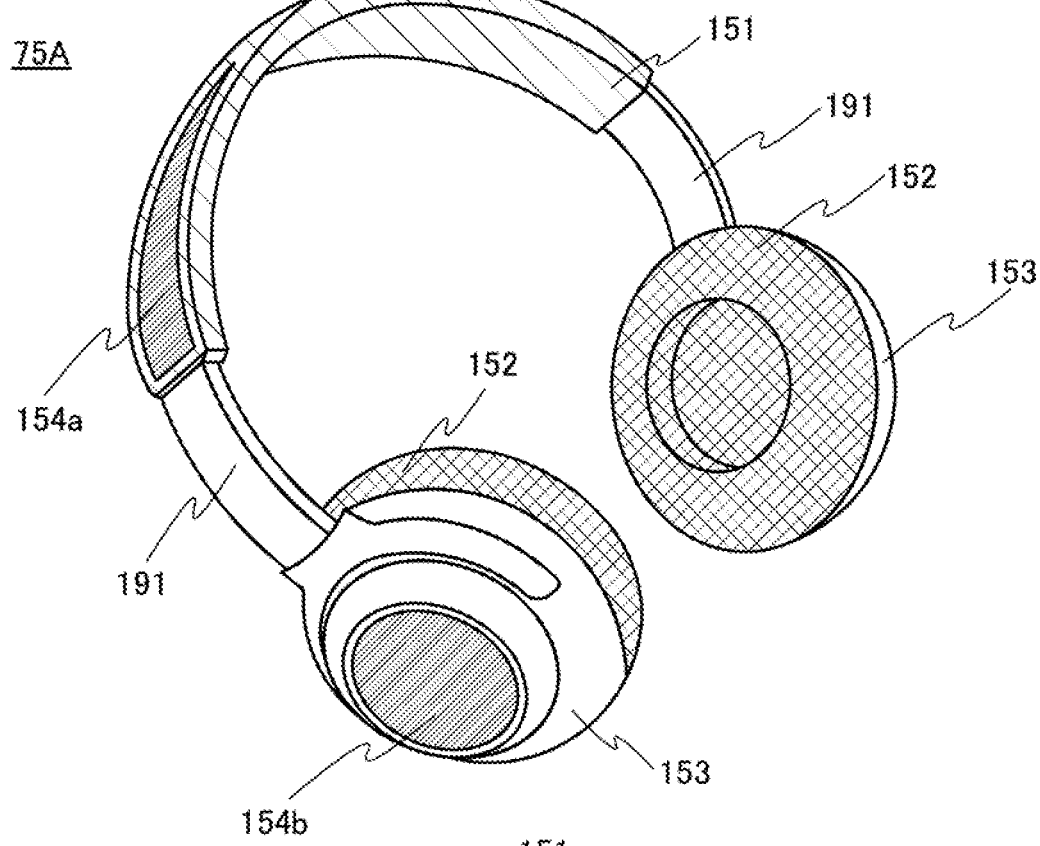
FIGS. 11A and 11B are perspective views illustrating examples of headphones.

FIG. 11A illustrates headphones 75A. The headphones 75A can be used in the headphone system of one embodiment of the present invention.

The headphones 75A include at least the band 151, two ear pads 152, two housings 153, one light-emitting unit 154a, two light-emitting units 154b (only one of them is illustrated in FIG. 11A), and two connection parts 191.

The light-emitting unit 154a is provided on the arc-shaped part of the band 151.

The light-emitting unit 154a provided on the arc-shaped part of the band 151 preferably includes a flexible light-emitting panel. The flexible light-emitting panel can be provided on a bendable part of the headphones. Therefore, a large-area light-emitting unit can be provided in the headphones. Therefore, an effect of lighting up the surroundings or notifying others around the user of the user's existence can be enhanced.

The light-emitting units 154b are provided on the almost circular parts of the housings 153.

The connection parts 191 each have a function of connecting the band 151 and the housing 153. It is preferable that the lengths of the connection parts 191 be adjustable, in which case the shape of the headphones 75A can be changed to be suitable for the user.

Figure 11B:
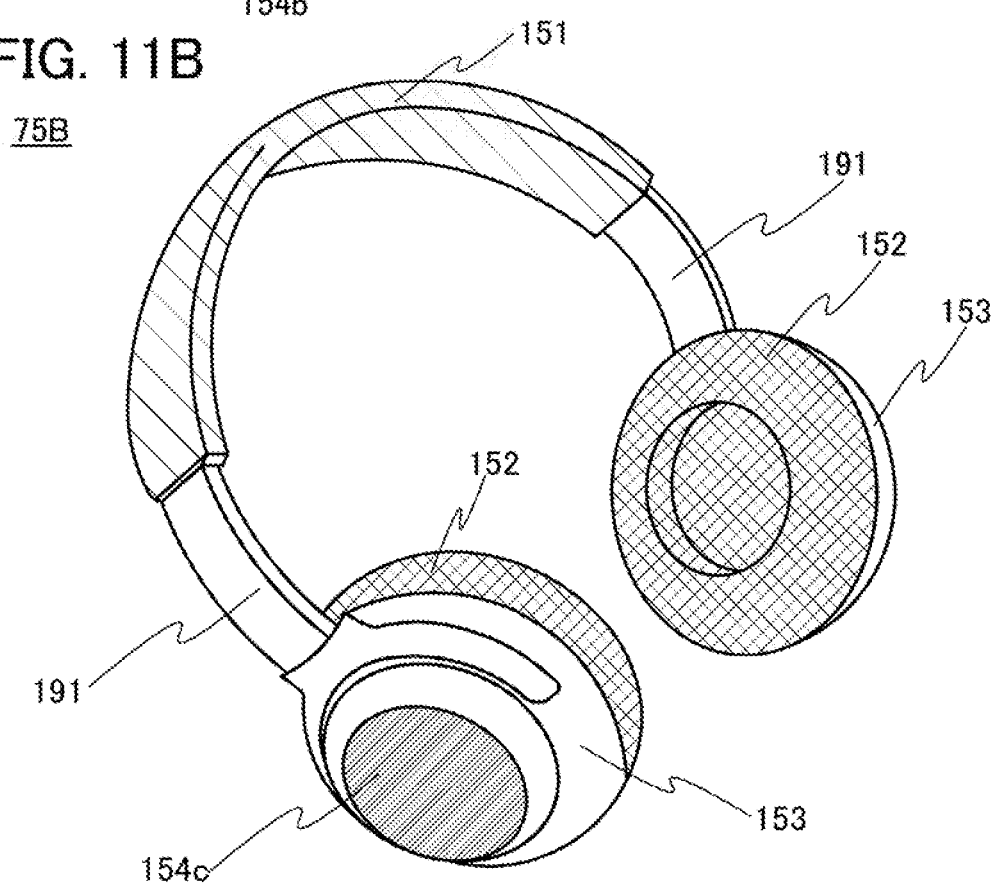

FIG. 11B illustrates headphones 75B. The headphones 75B can be used in the headphone system of one embodiment of the present invention.

The headphones 75B include at least the band 151, two ear pads 152, two housings 153, two light-emitting units 154c (only one of them is illustrated in FIG. 11B), and two connection parts 191

The light-emitting units 154c are provided on the almost circular parts of the housings 153.

Headphones illustrated in FIG. 12A include the band 151, two ear pads 152, two housings 153, two light-emitting units 154a, two biological sensors 156, and two hinges 193.

The light-emitting units 154a are provided on side surfaces of the housings 153. Each housing 153 may be provided with two or more light-emitting units 154a. For example, assuming that FIG. 12A shows the face side (front side) of the headphones, the housings 153 may further include the light-emitting units 154a on the rear side (back side) of the headphones.

The biological sensors 156 are each provided in a position to be in contact with the skin of the user. Although FIG. 12A shows an example in which the biological sensor 156 is provided on the right and left sides, it is necessary that at least one biological sensor 156 be provided.

The headphones preferably include the hinges 193 because the hinges 193 facilitate folding of the headphones.

Headphones illustrated in FIG. 12B include the band 151, two ear pads 152, two housings 153a, one housing 153b, and three light-emitting units 154a.

The light-emitting units 154a are provided on side surfaces of the two housings 153a and a side surface of the housing 153b. Light-emitting panels of the three light-emitting units 154a each correspond to the light-emitting panel of the lighting unit 121. The light-emitting panel of at least one of the three light-emitting units 154a may also serve as the light-emitting panel of the display unit 171.

The two housings 153a each include a speaker.

The components of the headphones described using FIGS. 1A and 1B and other figures are provided in any of the band 151, the housings 153a, and the housing 153b.

Headphones illustrated in FIG. 12C1 include the band 151, two ear pads 152, two housings 153a, one housing 153b, the attitude detection unit 124 (not illustrated), and five light-emitting units. The headphones illustrated in FIG. 12C1 include at least one light-emitting unit 154a, one light-emitting unit 154aL, and one light-emitting unit 154aR. The other two of the five light-emitting units are light-emitting units 154a or light-emitting units 154aL and 154aR.

The light-emitting units are provided on side surfaces of the two housings 153a and a side surface of the housing 153b. Light-emitting panels of the five light-emitting units each correspond to the light-emitting panel of the lighting unit 121. The light-emitting panel of at least one of the five light-emitting units may also serve as the light-emitting panel of the display unit 171.

FIG. 12C2 shows an example of the relationship between detection results of the attitude detection unit 124 and the light emission states of the light-emitting units.

The light-emitting unit(s) 154a emits light regardless of the detection results obtained by the attitude detection unit 124. When the attitude detection unit 124 does not perform detection operation (or when the attitude of the headphones does not change), the light-emitting unit(s) 154aL and the light-emitting unit(s) 154aR do not emit light.

When the attitude detection unit 124 detects the headphones leaning to the right, the light-emitting unit(s) 154aR blinks. When the attitude detection unit 124 detects the headphones leaning to the left, the light-emitting unit(s) 154aL blinks.

FIG. 12C3 shows an example of the relationship between detection results obtained by the attitude detection unit 124 and the light emission states of the light-emitting units.

The light-emitting unit(s) 154a emits light regardless of the detection results obtained by the attitude detection unit 124. When the attitude detection unit 124 does not perform detection operation (or when the attitude of the headphones does not change), the light-emitting unit(s) 154aL and the light-emitting unit(s) 154aR emit light.

When the attitude detection unit 124 detects the headphones leaning to the right, the light-emitting unit(s) 154aR blinks and the light-emitting unit(s) 154aL stops emitting light. When the attitude detection unit 124 detects the headphones leaning to the left, the light-emitting unit(s) 154aL blinks and the light-emitting unit(s) 154aR stops emitting light.

The relationship between the detection results obtained by the attitude detection unit 124 and the light emission states of the light-emitting units is not limited to the example described above. For example, the headphones may sense movement of the user, e.g., turning to the right or turning to the left.

Figure 13A:
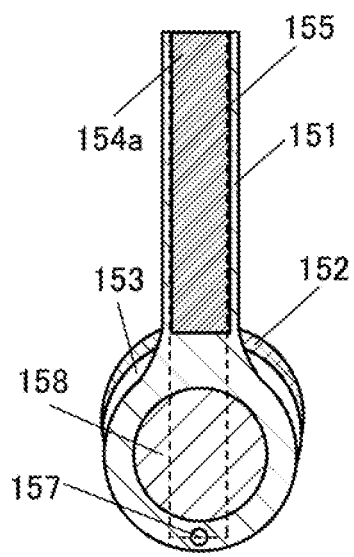
FIGS. 13A to 13F illustrate examples of headphones.

Headphones illustrated in FIG. 13A include at least the band 151, the ear pads 152, the housings 153, the light-emitting unit 154a, a power storage device 155, an operation button 157, and a touch pad 158.

The light-emitting unit 154a is provided along the arc-shaped part of the band 151.

The power storage device 155 is provided along the arc-shaped part of the band 151.

It is preferable that the headphones include a flexible power storage device. The flexible power storage device can be provided in a bendable part of the headphones. Accordingly, a large-area power storage device can be provided in the headphones. Therefore, it is possible to provide headphones which can be used for a long time with one time charging.

Part of the power storage device 155 and the light-emitting units 154*a* may overlap with each other.

The operation button 157 is provided on the almost circular part of the band 151. There is no particular limitation on the position of the operation button 157. For example, the operation button 157 can be provided anywhere on a surface of the band 151 or the housing 153.

The touch pad 158 is provided on the almost circular part of the band 151. There is no particular limitation on the position of the touch pad 158. For example, the touch pad 158 can be provided anywhere on a surface of the band 151 or the housing 153.

Figure 13B:
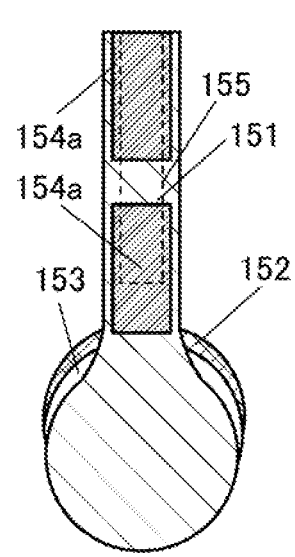

FIG. 13B illustrates an example of the headphones in which a plurality of light-emitting units 154*a* is provided on the arc-shaped part of the band 151.

Figure 13C:
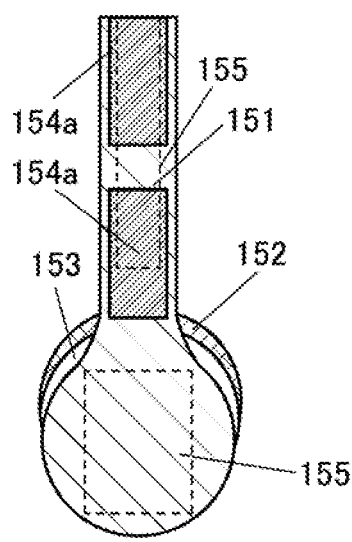

FIG. 13C illustrates an example of headphones in which the power storage device 155 is provided in each of the arc-shaped part and the almost circular part of the band 151. Note that the power storage device 155 positioned in an inflexible part of the headphones is not necessarily flexible.

Figure 13D:
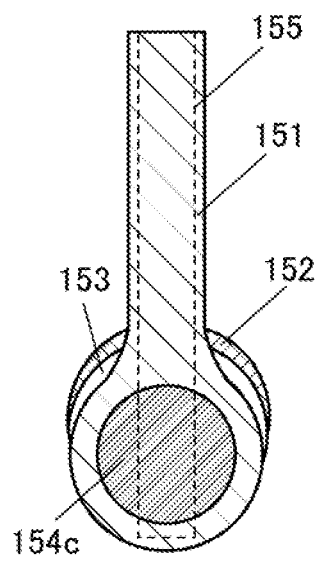

FIG. 13D illustrates an example of headphones in which the power storage device 155 extends from the arc-shaped part to the almost circular part of the band 151. In addition, the light-emitting units 154*c* each having a circular shape are provided on the band 151.

Figure 13E:
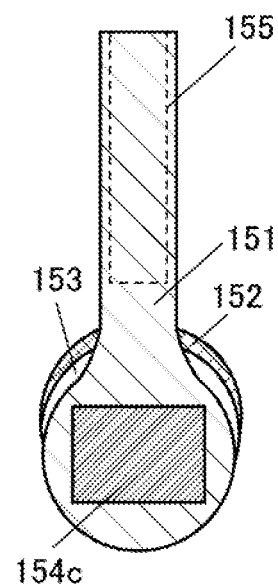

FIG. 13E illustrates an example of headphones in which the power storage device 155 and the light-emitting unit 154*c* do not overlap with each other. In addition, the light-emitting units 154*c* each having a quadrangular shape are provided on the band 151.

Figure 13F:
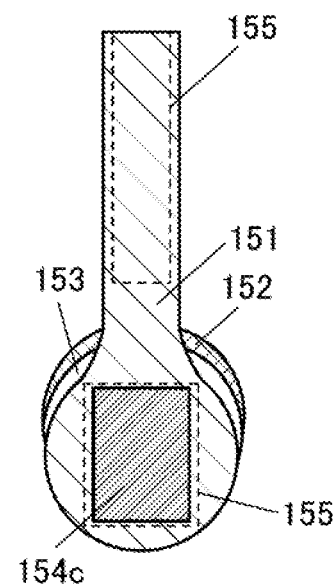

FIG. 13F illustrates an example of headphones in which the light-emitting unit 154*c* and one of two power storage devices 155 overlap with other, and the light-emitting unit 154*c* and the other of the two power storage devices 155 do not overlap with each other.

Figure 14A:
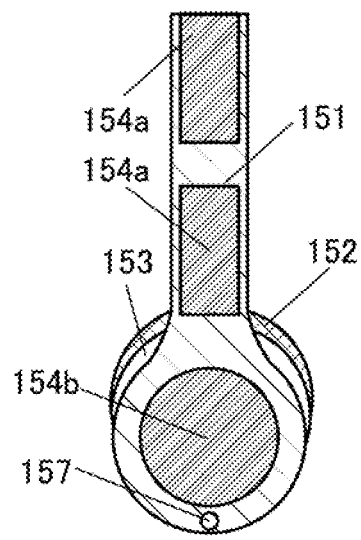
FIGS. 14A to 14E illustrate examples of headphones.

Headphones illustrated in FIG. 14A include at least the band 151, the ear pads 152, the housings 153, the light-emitting units 154*a*, the light-emitting units 154*b*, and the operation button 157.

Figure 14B:
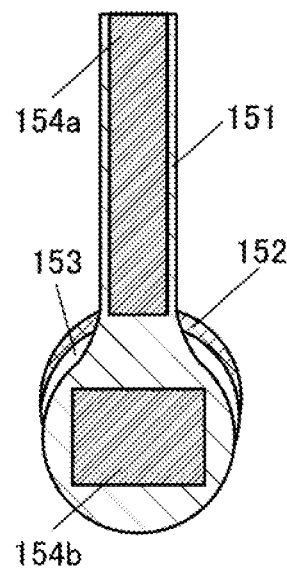

Headphones illustrated in FIG. 14B include at least the band 151, the ear pads 152, the housings 153, the light-emitting unit 154*a*, and the light-emitting units 154*b*.

Figure 14C:
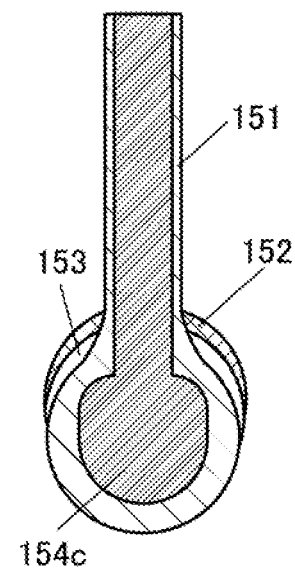

Headphones illustrated in FIG. 14C include at least the band 151, the ear pads 152, the housings 153, and the light-emitting unit 154*c*.

In FIG. 14C, the light-emitting unit 154*c* is provided over a wide area from the arc-shaped part to the almost circular part of the band 151. For example, a part of the light-emitting unit 154*c* may be used as lighting and the other part thereof may be used as a display.

Figure 14D:
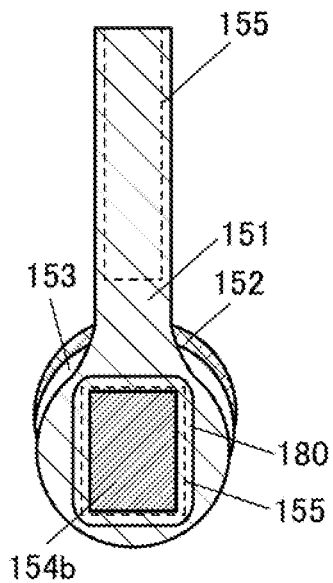
Figure 14E:
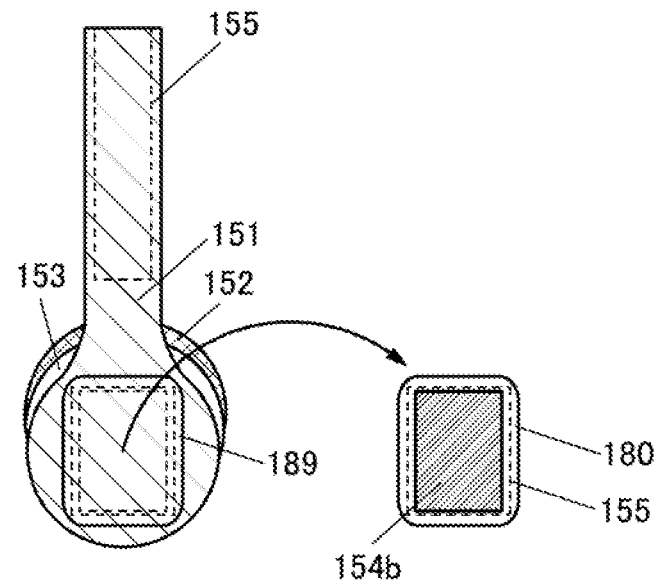

Headphones illustrated in FIGS. 14D and 14E include at least the band 151, the ear pads 152, the housings 153, the light-emitting units 154*b*, and two power storage devices 155.

Part of the headphones can be detached to be used as a portable information terminal 180 (FIG. 14E). The headphones include a storage portion 189. The portable information terminal 180 can be stored in a depression of the storage portion 189. The storage portion 189 may further include a cover for the portable information terminal 180.

One of the two power storage devices is provided in the arc-shaped part of the band 151. The other thereof is provided in the portable information terminal 180. The portable information terminal 180 includes the light-emitting unit 154*b* and the power storage device 155.

For example, the portable information terminal 180 has a configuration similar to that of the portable information terminal 51 shown in FIG. 8. The headphones have a configuration similar to that of the headphones 52.

In the portable information terminal 180 detached from the headphones, the light-emitting unit 154*b* may be extended so as to display an image on a larger area.

FIGS. 15A to 15G illustrate examples of a portable information terminal including the display unit 7001 with flexibility.

The display unit 7001 is formed using a display panel (including a touch panel) with flexibility. For example, a display panel or the like that can be bent with a curvature radius of greater than or equal to 0.01 mm and less than or equal to 150 mm can be used. The display unit 7001 may include a touch sensor so that the portable information terminal can be operated by touching the display unit 7001 with a finger or the like.

FIG. 15A is a perspective view illustrating an example of a portable information terminal and FIG. 15B is a side view illustrating an example of the portable information terminal. A portable information terminal 180A includes a housing 7501, the display unit 7001, a display unit tab 7502, operation buttons 7503, and the like.

The portable information terminal 180A includes the display unit 7001 that is flexible and rolled in the housing 7501. The display unit 7001 can be pulled out by using the display unit tab 7502.

The portable information terminal 180A can receive an image signal with a control portion incorporated therein and can display the received image on the display unit 7001. The portable information terminal 180A incorporates a battery. A terminal portion for connecting a connector may be included in the housing 7501 so that an image signal and power can be directly supplied from the outside with a wiring.

By pressing the operation buttons 7503, power on/off, switching of displayed images, and the like can be performed. Although FIGS. 15A to 15C illustrate an example where the operation buttons 7503 are positioned on a side surface of the portable information terminal 180A, one embodiment of the present invention is not limited thereto. The operation buttons 7503 may be placed on a display surface (a front surface) or a rear surface of the portable information terminal 180A.

FIG. 15C illustrates the portable information terminal 180A in a state where the display unit 7001 is pulled out. Images can be displayed on the display unit 7001 in this state. In addition, the portable information terminal 180A may perform different displays in the state where part of the display unit 7001 is rolled as shown in FIG. 15A and in the state where the display unit 7001 is pulled out as shown in FIG. 15C. For example, in the state shown in FIG. 15A, the rolled portion of the display unit 7001 is put in a non-display state, which results in a reduction in power consumption of the portable information terminal 180A.

Note that a reinforcement frame may be provided for a side portion of the display unit 7001 so that the display unit 7001 maintains a flat display surface when pulled out.

Note that in addition to this structure, a speaker may be provided in the housing so that sound is output in accordance with an audio signal received together with an image signal.

FIGS. 15D and 15F illustrate an example of a foldable portable information terminal. FIG. 15D illustrates a portable information terminal 180B that is opened. FIG. 15E illustrates the portable information terminal 180B that is being opened or being folded. FIG. 15F illustrates the portable information terminal 180B that is folded. The portable information terminal 180B is highly portable when folded, and is highly browsable when unfolded because of a seamless large display area.

The display unit 7001 is supported by three housings 7601 joined together by hinges 7602. By folding the portable information terminal 180B at a connection portion between two housings 7601 with the hinges 7602, the portable information terminal 180B can be reversibly changed in shape from an opened state to a folded state.

FIG. 15G illustrates an example of a foldable portable information terminal. FIG. 15G illustrates a portable information terminal 180C that is folded so that the display unit 7001 is on the inside. The portable information terminal 180C includes the display unit 7001 and a non-display portion 7651. The portable information terminal 180C may be folded so that the display unit 7001 is on the inside. When the portable information terminal 180C is not used, the portable information terminal 180C is folded so that the display unit 7001 is on the inside, whereby the display unit 7001 can be prevented from being contaminated and damaged.

Figure 16A:
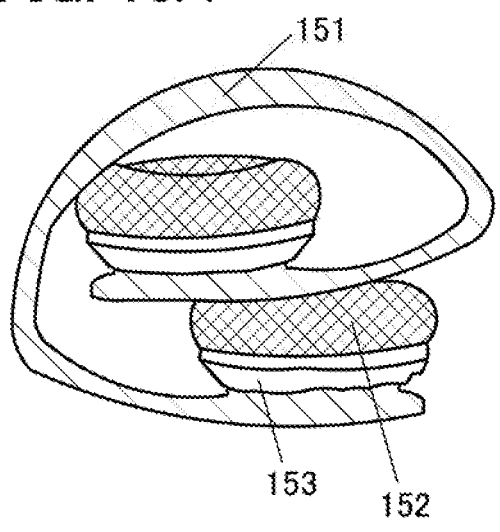
FIGS. 16A and 16B illustrate examples of headphones.
Figure 16B:
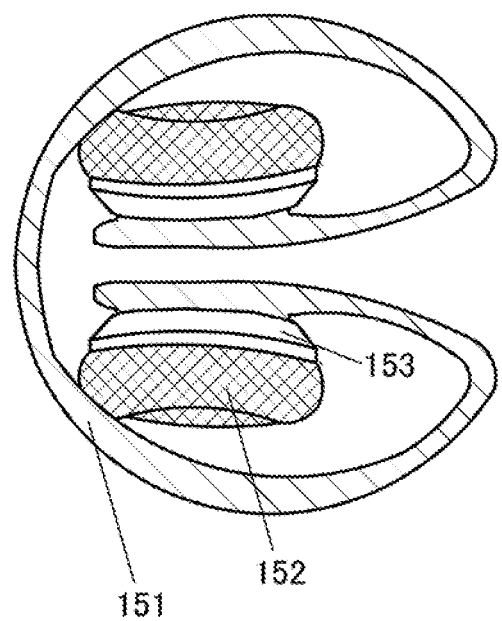

FIGS. 16A and 16B illustrate examples of the headphones of one embodiment of the present invention which are folded. Note that there is no particular limitation on how to fold the headphones of one embodiment of the present invention.

It is preferable that the headphones be folded to be reduced in size when not used, which facilitates carrying of the headphones.

For example, the headphones can include the hinges as described above so as to be bent at predetermined positions.

A flexible light-emitting panel, a flexible display panel, and a flexible power storage device can be used in the headphones of one embodiment of the present invention. Therefore, at least one of them can be provided in a bendable portion of the band 151.

FIG. 16A illustrates an example in which two portions of the band 151 are bent at different curvature radii. FIG. 16B illustrates an example in which two portions of the band 151 are bent at the same curvature radius.

A minimum curvature radius at which the band 151 can be bent repeatedly is determined by the components of the headphones and the positions of the components. In the case where a minimum curvature radius at which repeated bending is possible varies in different portions of the band 151, the size of the headphones can be reduced by, for example, bending a portion of the band 151 which is capable of being bent at a smaller curvature radius, as illustrated in FIG. 16A. In the case where the minimum curvature radius at which repeated bending is possible is the same at any portion of the band 151, the size of the headphones can be reduced by, for example, bending the band 151 symmetrically as illustrated in FIG. 16B.

FIGS. 17A to 17F illustrate examples of how to wear the headphones of one embodiment of the present invention.

One embodiment of the present invention can be applied to various headphones such as neckband headphones, headband headphones, and hanging-type (clip-on) headphones.

Figure 17A:
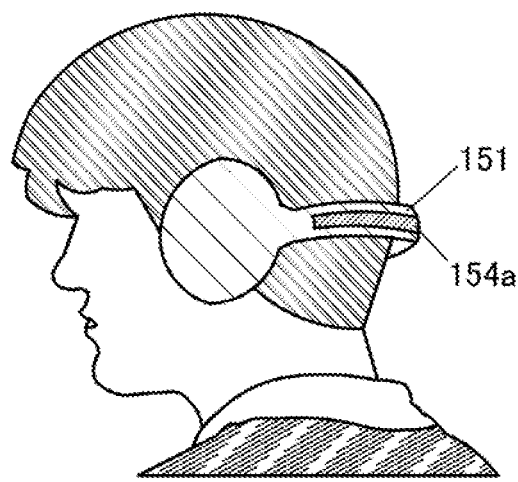
FIGS. 17A to 17F illustrate examples of how to wear headphones.

FIG. 17A illustrates neckband headphones in which the band 151 includes the light-emitting unit 154a.

Figure 17B:
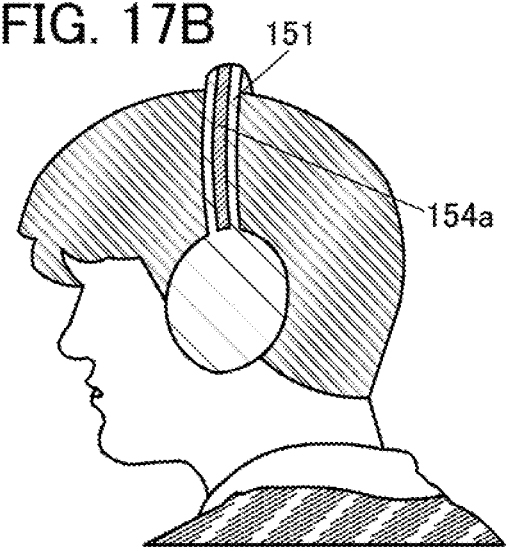

FIG. 17B illustrates headband headphones in which the band 151 includes the light-emitting unit 154a.

Figure 17C:
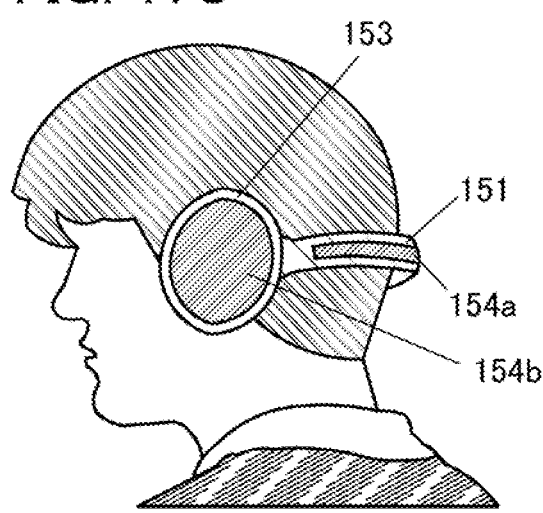

FIG. 17C illustrates neckband headphones in which the band 151 includes the light-emitting unit 154a and the housings 153 include the light-emitting units 154b.

Figure 17D:
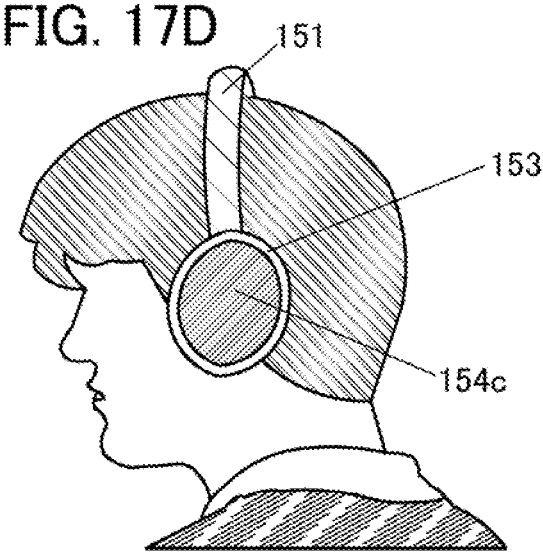

FIG. 17D illustrates headband headphones in which the housings 153 include the light-emitting units 154c.

Figure 17E:
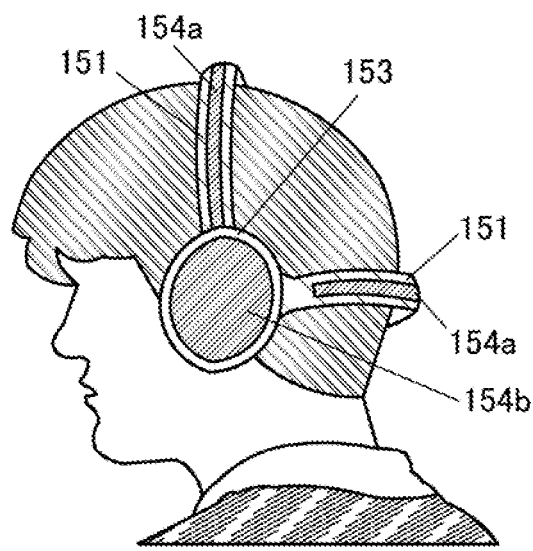

FIG. 17E illustrates the headphones which include the band 151 for the head and the band 151 for the neck. A light-emitting unit can be provided on at least one of the bands 151 and the housings 153.

Figure 17F:
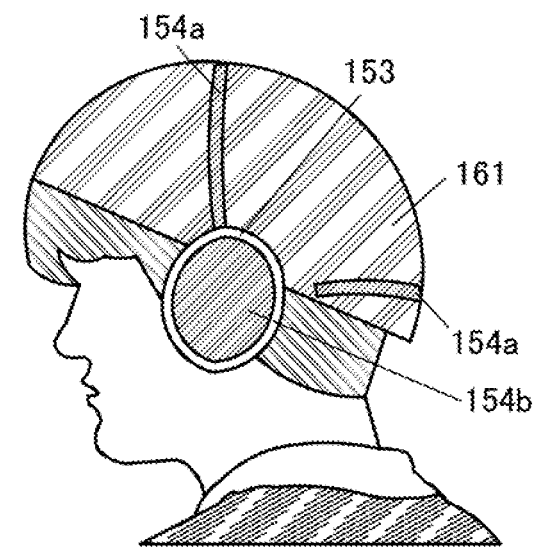

FIG. 17F illustrates cap headphones. A light-emitting unit can be provided on at least one of a cap portion 161 and the housing 153. The material of the cap portion 161 may be either cloth or plastic. When the cap portion 161 is formed using a plastic material, the headphones can also be referred to as helmet headphones. For example, when a driver of a vehicle such as a motorbike who wears the cap headphones formed of a plastic material leans his/her head before turning to the right, left, or the like, an acceleration sensor senses the leaning and the light-emitting unit emits light in accordance with the movement, whereby a signal can be sent to the following driver in advance. Alternatively, the headphones may be a separate type, and the user may wear a helmet and headphones separately so that the headphones are put inside or outside the helmet. The helmet headphones are highly convenient because they can also be used in sports or the like. For winter sports, for example, people are hard to recognize each other's positions when visibility is poor, e.g., in a fog or a snowstorm. In such a case, turning on the display units or the light-emitting units of the headphones allows the people to recognize each other's positions. For motor bike races or similar sports, if racers are close to each other during a race, it is difficult to keep the distance between the racers long enough to recognize direction indicators, and an accident is difficult to prevent accordingly. However, when each racer wears the helmet and the headphones with the display units in combination, the racers can communicate each other with texts or colors displayed on the display units, so that an accident or the like can be prevented.

As described above, the headphones of one embodiment of the present invention include a lighting unit and a detection unit. Light emission of the lighting unit of the headphones can be controlled in accordance with the quantity of external light, the movement of the user, or the like, which can enhance the convenience of the headphones.

This embodiment can be combined with any of other embodiments as appropriate.

Embodiment 2

Structures and manufacturing methods of light-emitting panels which can be used in one embodiment of the present invention are described in this embodiment with reference to FIGS. 18A to 18D, FIG. 19, FIGS. 20A to 20C, FIGS. 21A and 21B, FIGS. 22A and 22B, FIGS. 23A and 23B, FIGS. 24A and 24B, FIGS. 25A and 25B, FIG. 26, FIGS. 27A to 27D, FIG. 28, FIG. 29, FIG. 30, FIGS. 31A and 31B, FIG. 32, FIGS. 33A and 33B, and FIGS. 34A to 34D. In this embodiment, light-emitting panels including EL elements as light-emitting elements are described as examples.

FIGS. 18A to 18D each illustrate a light-emitting panel including a pair of substrates (a substrate 371 and a substrate 372). The light-emitting panel includes a light-emitting unit 381 and a driver circuit unit 382. An FPC 373 is connected to the light-emitting panel. The FPC 373 is electrically connected to an external connection electrode (not illustrated) over the substrate 371.

Figure 18A:
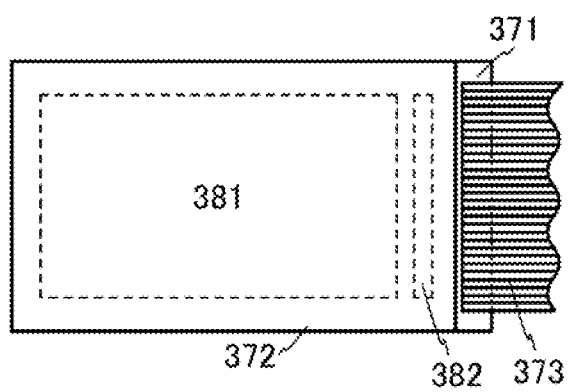
FIGS. 18A to 18D are top views illustrating examples of a light-emitting panel.

FIG. 18A illustrates an example of the light-emitting panel in which the driver circuit unit 382 is provided on one side.

Figure 18B:
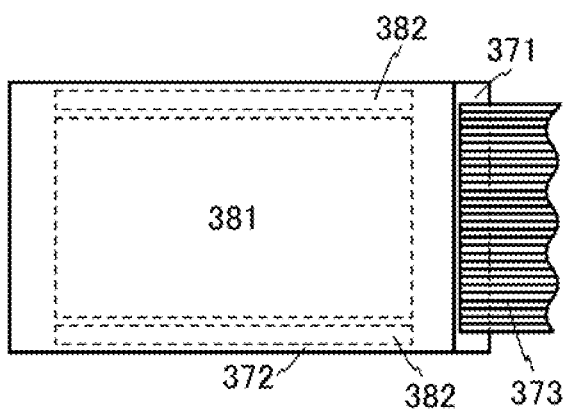
Figure 18C:
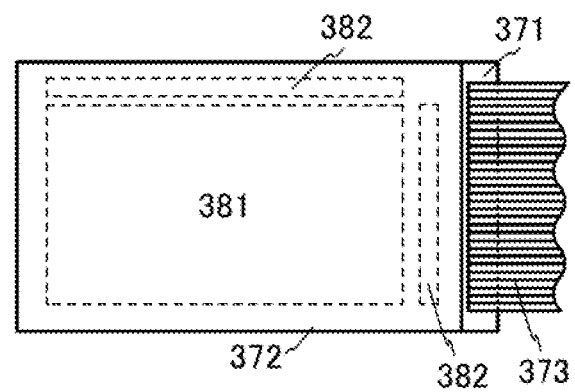

FIGS. 18B and 18C each illustrate an example of the light-emitting panel in which the driver circuit units 382 are provided on two sides. In FIG. 18B, the driver circuit units 382 are provided along two sides facing each other. In the light-emitting panel illustrated in FIG. 18C, one of the driver circuit units 382 is provided along a short side and the other thereof is provided along a long side.

Figure 18D:
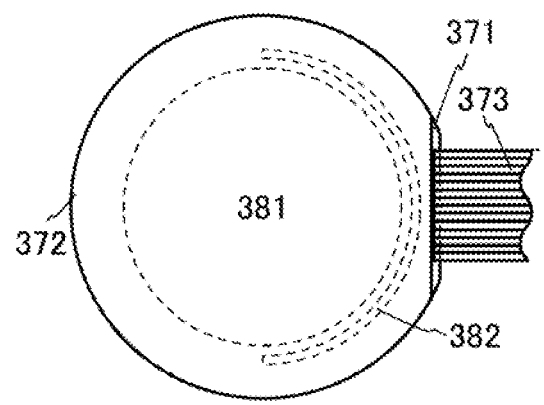

FIG. 18D illustrates an example of the light-emitting panel in which the top surface shape of the light-emitting unit 381 is circular. The light-emitting unit 381 does not necessarily have a circular top surface shape and may have any of a variety of top surface shapes such as polygonal and elliptical shapes.

The light-emitting panel does not necessarily have a circular top surface shape and may have any of a variety of top-view shapes such as polygonal and elliptical shapes. The light-emitting panel in FIG. 18D has a top surface shape including both a curved portion and a linear portion.

Structural Example 1

Figure 19:
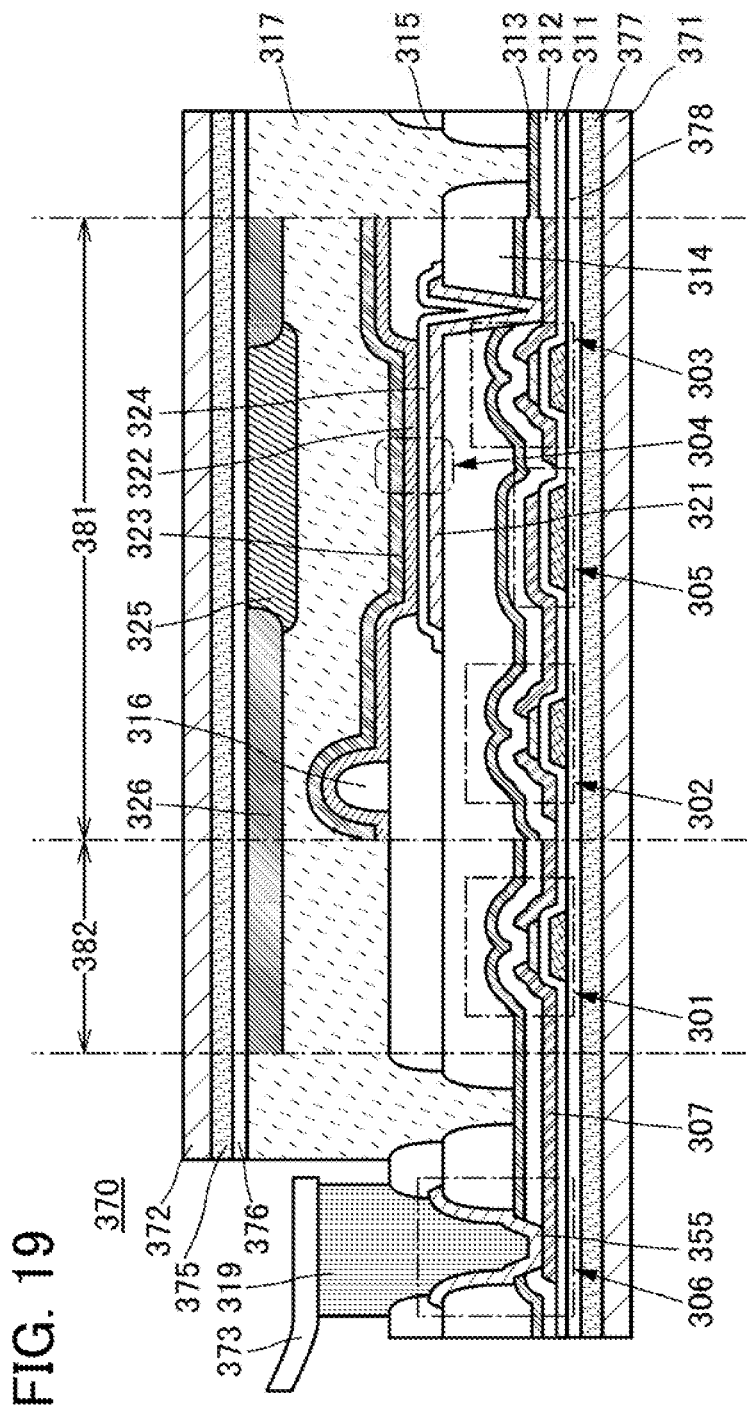
FIG. 19 is a cross-sectional view illustrating an example of a light-emitting panel.

FIG. 19 is a cross-sectional view of a light-emitting panel 370 employing a color filter method and having a top-emission structure.

In this embodiment, the light-emitting panel can have, for example, a structure in which sub-pixels of three colors of red (R), green (G), and blue (B) express one color, a structure in which sub-pixels of four colors of red (R), green (G), blue (B), and white (W) express one color, or a structure in which sub-pixels of four colors of red (R), green (G), blue (B), and yellow (Y) express one color. The color element is not particularly limited and colors other than R, G, B, and W may be used. For example, cyan, magenta, or the like may be used.

The light-emitting panel 370 includes the substrate 371, a bonding layer 377, an insulating layer 378, a plurality of transistors, a capacitor 305, a conductive layer 307, an insulating layer 312, an insulating layer 313, an insulating layer 314, an insulating layer 315, a light-emitting element 304, a conductive layer 355, a spacer 316, a bonding layer 317, a coloring layer 325, a light-blocking layer 326, the substrate 372, a bonding layer 375, and an insulating layer 376.

The driver circuit unit 382 includes a transistor 301. The light-emitting unit 381 includes a transistor 302 and a transistor 303.

Each transistor includes a gate, a gate insulating layer 311, a semiconductor layer, a source, and a drain. The gate and the semiconductor layer overlap with each other with the gate insulating layer 311 provided therebetween. Part of the gate insulating layer 311 functions as a dielectric of the capacitor 305. The conductive layer functioning as the source or the drain of the transistor 302 serves as one electrode of the capacitor 305.

In FIG. 19, bottom-gate transistors are illustrated. The structure of the transistor may differ between the driver circuit unit 382 and the light-emitting unit 381. The driver circuit unit 382 and the light-emitting unit 381 may each include a plurality of kinds of transistors.

The capacitor 305 includes a pair of electrodes and the dielectric therebetween. The capacitor 305 includes a conductive layer that is formed using the same material and the same step as the gates of the transistors and a conductive layer that is formed using the same material and the same step as the sources and the drains of the transistors.

The insulating layer 312, the insulating layer 313, and the insulating layer 314 are each provided to cover the transistors and the like. The number of the insulating layers covering the transistors and the like is not particularly limited. The insulating layer 314 functions as a planarization layer. It is preferable that at least one of the insulating layer 312, the insulating layer 313, and the insulating layer 314 be formed using a material inhibiting diffusion of impurities such as water or hydrogen. Diffusion of impurities from the outside into the transistors can be effectively inhibited, leading to improved reliability of the light-emitting panel.

In the case where the insulating layer 314 is formed using an organic material, impurities such as moisture might enter the light-emitting element 304 and the like from the outside of the light-emitting panel through the insulating layer 314 exposed at an end portion of the light-emitting panel. Deterioration of the light-emitting element 304 due to the entry of an impurity leads to deterioration of the light-emitting panel. Thus, as illustrated in FIG. 19, it is preferable that an opening which reaches an inorganic film (here, the insulating layer 313) be formed in the insulating layer 314 so that an impurity such as moisture entering from the outside of the light-emitting panel does not easily reach the light-emitting element 304.

FIG. 23A is a cross-sectional view illustrating the case where the opening is not provided in the insulating layer 314. The insulating layer 314 is preferably provided in the entire area of the light-emitting panel as illustrated in FIG. 23A, in which case the yield of the separation step described below can be increased.

FIG. 23B is a cross-sectional view illustrating the case where the insulating layer 314 is not positioned at the end portion of the light-emitting panel. Since an insulating layer formed using an organic material is not positioned at the end portion of the light-emitting panel in the structure of FIG. 23B, entry of impurities into the light-emitting element 304 can be inhibited.

The light-emitting element 304 includes an electrode 321, an EL layer 322, and an electrode 323. The light-emitting element 304 may include an optical adjustment layer 324. The light-emitting element 304 has a top-emission structure with which light is emitted to the coloring layer 325 side.

The transistor, the capacitor, the wiring, and the like are provided to overlap with a light-emitting region of the light-emitting element 304, whereby an aperture ratio of the light-emitting unit 381 can be increased.

One of the electrode 321 and the electrode 323 functions as an anode and the other functions as a cathode. When a voltage higher than the threshold voltage of the light-emitting element 304 is applied between the electrode 321 and the electrode 323, holes are injected to the EL layer 322 from the anode side and electrons are injected to the EL layer 322 from the cathode side. The injected electrons and holes are recombined in the EL layer 322 and a light-emitting substance contained in the EL layer 322 emits light.

The electrode 321 is electrically connected to the source or the drain of the transistor 303 directly or through a conductive layer. The electrode 321 functions as a pixel electrode and is provided for each light-emitting element 304. Two adjacent electrodes 321 are electrically insulated from each other by the insulating layer 315.

The EL layer 322 is a layer containing a light-emitting substance.

The electrode 323 functions as a common electrode and is provided for a plurality of light-emitting elements 304. A fixed potential is supplied to the electrode 323.

The light-emitting element 304 and the coloring layer 325 overlap with each other with the bonding layer 317 positioned therebetween. The spacer 316 and the light-blocking layer 326 overlap with each other with the bonding layer 317 positioned therebetween. Although FIG. 19 illustrates the case where a space is provided between the light-emitting element 304 and the light-blocking layer 326, the light-emitting element 304 and the light-blocking layer 326 may be in contact with each other. Although the spacer 316 is provided on the substrate 371 side in the structure illustrated in FIG. 19, the spacer 316 may be provided on the substrate 372 side (e.g., in a position closer to the substrate 371 than that of the light-blocking layer 326).

Owing to the combination of a color filter (the coloring layer 325) and a microcavity structure (the optical adjustment layer 324), light with high color purity can be extracted from the light-emitting panel. The thickness of the optical adjustment layer 324 is varied depending on the color of the pixel.

The coloring layer 325 is a coloring layer that transmits light in a specific wavelength range. For example, a color filter or the like that transmits light in a specific wavelength range, such as red, green, blue, or yellow light, can be used. As examples of a material that can be used for the coloring layer, a metal material, a resin material, a resin material containing a pigment or dye, and the like can be given.

Note that one embodiment of the present invention is not limited to a color filter method, and a separate coloring method, a color conversion method, a quantum dot method, or the like may be employed.

The light-blocking layer 326 is provided between adjacent light-blocking layers 326. The light-blocking layer 326 blocks light emitted from an adjacent light-emitting element to prevent color mixture between adjacent light-emitting elements. Here, the coloring layer 325 is provided such that its end portion overlaps with the light-blocking layer 326, whereby light leakage can be reduced. As the light-blocking layer 326, a material that can block light from the light-emitting element can be used; for example, a black matrix can be formed using a metal material or a resin material containing a pigment or dye. Note that it is preferable to provide the light-blocking layer 326 in a region other than the pixel portion, such as the driver circuit unit or the like, in which case undesired leakage of guided light or the like can be prevented.

In FIG. 23B, an overcoat 329 is provided so as to cover the coloring layer 325 and the light-blocking layer 326. The overcoat 329 can prevent impurities and the like contained in the coloring layer 325 from being diffused into the light-emitting element. The overcoat 329 is formed with a material that transmits light emitted from the light-emitting element 304; for example, an inorganic insulating film such as a silicon nitride film or a silicon oxide film, an organic insulating film such as an acrylic film or a polyimide film can be used, and further, a stacked-layer structure of an organic insulating film and an inorganic insulating film may be employed.

In the case where upper surfaces of the coloring layer 325 and the light-blocking layer 326 are coated with a material of the bonding layer 317, a material which has high wettability with respect to the material of the bonding layer 317 is preferably used as the material of the overcoat 329. For example, an oxide conductive film such as an indium tin oxide (ITO) film or a metal film such as an Ag film which is thin enough to transmit light is preferably used as the overcoat 329.

When the overcoat 329 is formed using a material that has high wettability with respect to the material for the bonding layer 317, the material for the bonding layer 317 can be uniformly applied. Thus, entry of bubbles in the step of attaching the pair of substrates to each other can be prevented, and thus a display defect can be prevented.

The insulating layer 378 and the substrate 371 are attached to each other with the bonding layer 377. The insulating layer 376 and the substrate 372 are attached to each other with the bonding layer 375. The insulating layer 376 and the insulating layer 378 are preferably highly resistant to moisture. The light-emitting element 304, the transistors, and the like are preferably provided between a pair of insulating layers which are highly resistant to moisture, in which case impurities such as moisture can be prevented from entering these elements, leading to higher reliability of the light-emitting panel.

Examples of the insulating film highly resistant to moisture include a film containing nitrogen and silicon (e.g., a silicon nitride film and a silicon nitride oxide film) and a film containing nitrogen and aluminum (e.g., an aluminum nitride film).

Alternatively, a silicon oxide film, a silicon oxynitride film, an aluminum oxide film, or the like may be used.

For example, the water vapor transmittance of the insulating film having an excellent moisture-proof property is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], and still further preferably lower than or equal to $1\times10^{-8}$ [g/(m$^2$·day)].

A connection portion 306 includes the conductive layer 307 and the conductive layer 355. The conductive layer 307 and the conductive layer 355 are electrically connected to each other. The conductive layer 307 can be formed using the same material and the same step as those of the sources and the drains of the transistors. The conductive layer 355 is electrically connected to an external input terminal through which a signal or a potential from the outside is transmitted to the driver circuit unit 382. Here, an example in which an FPC 373 is provided as an external input terminal is shown. The FPC 373 and the conductive layer 355 are electrically connected to each other through a connector 319.

As the connector 319, any of various anisotropic conductive films (ACF), anisotropic conductive pastes (ACP), and the like can be used.

The substrates of the light-emitting panel of one embodiment of the present invention preferably have flexibility. As the flexible substrates, a material that is thin enough to have flexibility, such as glass, quartz, a resin, a metal, an alloy, or a semiconductor, can be used. The substrate through which light is extracted from the light-emitting element is formed using a material which transmits the light. The thickness of the flexible substrate is preferably greater than or equal to 1 μm and less than or equal to 200 μm, further preferably greater than or equal to 1 μm and less than or equal to 100 μm, still further preferably greater than or equal to 10 μm and less than or equal to 50 μm, yet further preferably greater than or equal to 10 μm and less than or equal to 25 μm, for example. The thickness and hardness of the flexible substrate are set in the range where mechanical strength and flexibility can be balanced against each other. The flexible substrate may have a single-layer structure or a stacked-layer structure.

An organic resin, which has a specific gravity smaller than that of glass, is preferably used for the flexible substrate, in which case the light-emitting panel can be more lightweight as compared with the case where glass is used.

The substrate is preferably formed using a material with high toughness. In that case, a light-emitting panel with high impact resistance that is less likely to be broken can be provided. For example, when a resin substrate or a thin metal or alloy substrate is used, the light-emitting panel can be lightweight and unlikely to be broken as compared with the case where a glass substrate is used.

A metal material and an alloy material, which have high thermal conductivity, are each preferable because they can easily conduct heat to the whole substrate and accordingly can prevent a local temperature rise in the light-emitting panel. The thickness of a substrate using a metal material or an alloy material is preferably greater than or equal to 10 μm and less than or equal to 200 μm, further preferably greater than or equal to 20 μm and less than or equal to 50 μm.

There is no particular limitation on a material of the metal substrate or the alloy substrate, but it is preferable to use, for example, aluminum, copper, nickel, or a metal alloy such as an aluminum alloy or stainless steel. Examples of a material for a semiconductor substrate include silicon and the like.

Furthermore, when a material with high thermal emissivity is used for the substrates, the surface temperature of the light-emitting panel can be prevented from rising, leading to prevention of breakage and a decrease in reliability of the light-emitting panel. For example, the substrate may have a stacked-layer structure of a metal substrate and a layer with high thermal emissivity (e.g., the layer can be formed using a metal oxide or a ceramic material).

Examples of materials with flexibility and a light-transmitting property include polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (such as nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and a cellulose nanofiber. In particular, a material with a low coefficient of linear expansion is preferred, and for example, a polyamide imide resin, a polyimide resin, a polyamide resin, or PET can be suitably used. Alternatively, a substrate in which a fibrous body is impregnated with a resin (also referred to as prepreg), a substrate whose coefficient of linear expansion is reduced by mixing an organic resin with an inorganic filler, or the like can be used.

The flexible substrate may have a stacked-layer structure in which at least one of a hard coat layer (e.g., a silicon nitride layer) by which a surface of the device is protected from damage or the like, a layer for dispersing pressure (e.g., an aramid resin layer), and the like is stacked over a layer of any of the above-mentioned materials. For example, a resin film may be provided between a pair of hard coat layers.

Any of a variety of curable adhesives, e.g., light curable adhesives such as a UV curable adhesive, a reactive curable adhesive, a thermal curable adhesive, and an anaerobic adhesive can be used for the bonding layer. Still alternatively, an adhesive sheet or the like may be used.

Furthermore, the bonding layer may include a drying agent. For example, it is possible to use a substance that adsorbs moisture by chemical adsorption, such as oxide of an alkaline earth metal (e.g., calcium oxide or barium oxide). Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

When a filler with a high refractive index or a light scattering member is contained in the bonding layer, the efficiency of light extraction from the light-emitting element can be improved. For example, titanium oxide, barium oxide, zeolite, zirconium, or the like can be used.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top-emission, bottom-emission, or dual-emission light-emitting element. A conductive film that transmits visible light is used as the electrode through which light is extracted. A conductive film that reflects visible light is preferably used as the electrode through which light is not extracted.

The conductive film that transmits visible light can be formed using, for example, indium oxide, ITO, indium zinc oxide, zinc oxide (ZnO), ZnO to which gallium is added, or the like. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive film. For example, a stacked film of ITO and an alloy of silver and magnesium or the like is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La); or an alloy containing silver such as an alloy of silver and copper, an alloy of silver, palladium, and copper (also referred to as Ag—Pd—Cu or APC), or an alloy of silver and magnesium may be used. An alloy containing silver and copper is preferable because of its high heat resistance. Furthermore, when a metal film or a metal oxide film is stacked in contact with an aluminum alloy film, oxidation of the aluminum alloy film can be inhibited. As examples of a material for the metal film or the metal oxide film, titanium, titanium oxide, and the like are given. Alternatively, the above conductive film that transmits visible light and a film containing a metal material may be stacked. For example, a stacked film of silver and ITO, a stacked film of an alloy of silver and magnesium and ITO, or the like can be used.

Each of the electrodes can be formed by an evaporation method or a sputtering method. Alternatively, a discharging method such as an inkjet method, a printing method such as a screen printing method, or a plating method may be used.

The EL layer 322 includes at least a light-emitting layer. The EL layer 322 may include a plurality of light-emitting layers. In addition to the light-emitting layer, the EL layer 322 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 322, either a low molecular compound or a high molecular compound can be used, and an inorganic compound may also be used. Each of the layers included in the EL layer 322 can be formed by any of the following methods: an evaporation method (including a vacuum evaporation method), a transfer method, a printing method, an inkjet method, a coating method, and the like.

The light-emitting element 304 may contain two or more kinds of light-emitting substances. Thus, for example, a light-emitting element that emits white light can be achieved. For example, light-emitting substances are selected so that two or more kinds of light-emitting substances emit complementary colors to obtain white light emission. A light-emitting substance that emits red (R) light, green (G) light, blue (B) light, yellow (Y) light, or orange (O) light or a light-emitting substance that emits light containing spectral components of two or more of R light, G light, and B light can be used, for example. A light-emitting substance that emits blue light and a light-emitting substance that emits yellow light may be used, for example. At this time, the emission spectrum of the light-emitting substance that emits yellow light preferably contains spectral components of G light and R light. The emission spectrum of the light-emitting element 304 preferably has two or more peaks in the wavelength range in a visible region (e.g., greater than or equal to 350 nm and less than or equal to 750 nm or greater than or equal to 400 nm and less than or equal to 800 nm).

Moreover, the light-emitting element 304 may be a single element including one EL layer or a tandem element in which EL layers are stacked with a charge generation layer provided therebetween.

In one embodiment of the present invention, a light-emitting element containing an inorganic compound such as a quantum dot may be employed. Examples of quantum dot materials include a colloidal quantum dot material, an alloyed quantum dot material, a core-shell quantum dot material, a core quantum dot material, and the like. For example, an element such as cadmium (Cd), selenium (Se), zinc (Zn), sulfur (S), phosphorus (P), indium (In), tellurium (Te), lead (Pb), gallium (Ga), arsenic (As), or aluminum (Al) may be contained.

The structure of the transistors in the light-emitting panel is not particularly limited. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. A semiconductor having crystallinity is preferably used, in which case deterioration of the transistor characteristics can be suppressed.

A semiconductor material used for the semiconductor layers of the transistors is not particularly limited, and for example, a Group 14 element, a compound semiconductor, or an oxide semiconductor can be used. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because off-state current of the transistor can be reduced.

For example, the oxide semiconductor preferably contains at least indium (In) or zinc (Zn). The oxide semiconductor further preferably contains an In-M-Zn oxide (M is a metal such as Al, Ti, Ga, Ge, Y, Zr, Sn, La, Ce, Hf, or Nd).

A c-axis aligned crystalline oxide semiconductor (CAAC-OS) is preferably used as a semiconductor material for the transistors. Unlike amorphous semiconductor, the CAAC-OS has few defect states, so that the reliability of the transistor can be improved. Moreover, since the CAAC-OS does not have a grain boundary, a stable and uniform film can be formed over a large area, and stress that is caused by bending a flexible light-emitting panel does not easily make a crack in a CAAC-OS film.

A CAAC-OS is a crystalline oxide semiconductor having c-axis alignment of crystals in a direction substantially perpendicular to the film surface. It has been found that oxide semiconductors have a variety of crystal structures other than a single crystal structure. An example of such structures is a nano-crystal (nc) structure, which is an aggregate of nanoscale microcrystals. The crystallinity of a CAAC-OS structure is lower than that of a single crystal structure and higher than that of an nc structure.

As described above, the CAAC-OS has c-axis alignment, its pellets (nanocrystals) are connected in an a-b plane direction, and the crystal structure has distortion. For this reason, the CAAC-OS can also be referred to as an oxide semiconductor including a c-axis-aligned a-b-plane-anchored (CAA) crystal.

An organic insulating material or an inorganic insulating material can be used for the insulating layers included in the light-emitting panel. Examples of resins include an acrylic resin, an epoxy resin, a polyimide resin, a polyamide resin, a polyimide-amide resin, a siloxane resin, a benzocyclobutene-based resin, and a phenol resin. Examples of an inorganic insulating film include a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

The conductive layers included in the light-emitting panel can each have a single-layer structure or a stacked-layer structure including any of metals such as aluminum, titanium, chromium, nickel, copper, yttrium, zirconium, molybdenum, silver, tantalum, and tungsten or an alloy containing any of these metals as its main component. Alternatively, a light-transmitting conductive material such as indium oxide, ITO, indium oxide containing tungsten, indium zinc oxide containing tungsten, indium oxide containing titanium, ITO containing titanium, indium zinc oxide, ZnO, ZnO to which gallium is added, or indium tin oxide containing silicon may be used. Alternatively, a semiconductor such as an oxide semiconductor or polycrystalline silicon whose resistance is lowered by containing an impurity element or the like, or silicide such as nickel silicide may be used. A film including graphene may be used as well. The film including graphene can be formed, for example, by reducing a film containing graphene oxide. A semiconductor such as an oxide semiconductor containing an impurity element may be used.

Alternatively, the conductive layers may be formed using a conductive paste of silver, carbon, copper, or the like or a conductive polymer such as a polythiophene. A conductive paste is preferable because it is inexpensive.

A conductive polymer is preferable because it is easily applied.

Example of Manufacturing Method of Structure Example 1

As methods for forming a light-emitting element over a flexible substrate in the case of manufacturing a flexible light-emitting panel, there are methods such as a first method in which the light-emitting element is directly formed over a flexible substrate, and a second method in which the light-emitting element is formed over a highly heat-resistant substrate (hereinafter referred to as a formation substrate) which is different from a flexible substrate and the light-emitting element is then separated from the formation substrate and transferred to the flexible substrate.

When a substrate that is resistant to heat applied in the process of forming the light-emitting element, such as a glass substrate thin enough to have flexibility, is used, the first method is preferably employed, in which case the process can be simplified.

When the second method is used, an insulating film with low water permeability or the like which is formed over a formation substrate at high temperature can be transferred to a flexible substrate. Therefore, even when an organic resin with high water permeability and low heat resistance or the like is used as a material of the flexible substrate, a flexible light-emitting panel with high reliability can be manufactured.

An example of a manufacturing method of the structure example 1 is described with reference to FIGS. 20A to 20C, FIGS. 21A and 21B and FIGS. 23A and 23B. FIGS. 20A to 20C, FIGS. 21A and 21A, and FIGS. 22A and 22B are cross-sectional views illustrating a method for manufacturing the light-emitting unit 381 of the light-emitting panel 370.

As shown in FIG. 20A, a separation layer 403 is formed over a formation substrate 401. Next, a layer to be separated is formed over the separation layer 403. Here, the layer to be separated that is formed over the separation layer 403 corresponds to the layers from the insulating layer 378 to the light-emitting element 304 in FIG. 19.

As the formation substrate 401, a substrate having at least heat resistance high enough to withstand process temperature in a manufacturing process is used. As the formation substrate 401, for example, a glass substrate, a quartz substrate, a sapphire substrate, a semiconductor substrate, a ceramic substrate, a metal substrate, a resin substrate, or a plastic substrate can be used.

Note that it is preferable to use a large-sized glass substrate as the formation substrate 401 in terms of productivity. For example, a glass substrate having a size greater than or equal to the 3rd generation (550 mm×650 mm) and less than or equal to the 10th generation (2950 mm×3400 mm) or a glass substrate having a larger size than the 10th generation is preferably used.

In the case where a glass substrate is used as the formation substrate 401, as a base film, an insulating film such as a silicon oxide film, a silicon oxynitride film, a silicon nitride film, or a silicon nitride oxide film is preferably formed between the formation substrate 401 and the separation layer 403, in which case contamination from the glass substrate can be prevented.

The separation layer 403 can be formed using an element selected from tungsten, molybdenum, titanium, tantalum, niobium, nickel, cobalt, zirconium, zinc, ruthenium, rhodium, palladium, osmium, iridium, and silicon; an alloy material containing any of the elements; a compound material containing any of the elements; or the like. A crystal structure of a layer containing silicon may be amorphous, microcrystal, or polycrystal. Furthermore, a metal oxide such as aluminum oxide, gallium oxide, zinc oxide, titanium dioxide, indium oxide, indium tin oxide, indium zinc oxide, or an In—Ga—Zn oxide can be used. The separation layer 403 is preferably formed using a high-melting-point metal material such as tungsten, titanium, or molybdenum, in which case the degree of freedom of the process for forming the layer to be separated can be increased.

The separation layer 403 can be formed by, for example, a sputtering method, a plasma CVD method, a coating method (including a spin coating method, a droplet discharging method, a dispensing method, and the like), a printing method, or the like. The thickness of the separation layer 403 is, for example, greater than or equal to 1 nm and less than or equal to 200 nm, preferably greater than or equal to 10 nm and less than or equal to 100 nm.

In the case where the separation layer 403 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that the mixture of tungsten and molybdenum is an alloy of tungsten and molybdenum, for example.

In the case where the separation layer 403 is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment and heat treatment each may be performed in an atmosphere of oxygen, nitrogen, or nitrous oxide alone, or a mixed gas of any of these gasses and another gas. Surface condition of the separation layer 403 is changed by the plasma treatment or heat treatment, whereby adhesion between the separation layer 403 and the insulating film formed later can be controlled.

Note that the separation layer is not necessary in the case where separation at the interface between the formation substrate and the layer to be separated is possible. For example, a glass substrate is used as the formation substrate, and an organic resin such as polyimide, polyester, polyolefin, polyamide, polycarbonate, or acrylic is formed in contact with the glass substrate. Next, adhesion between the formation substrate and the organic resin is improved by laser light irradiation or heat treatment. Then, an insulating film, a transistor, and the like are formed over the organic resin. After that, separation at the interface between the formation substrate and the organic resin can be performed by performing laser light irradiation with energy density higher than that of the above laser light irradiation or performing heat treatment at a temperature higher than that of the above heat treatment. Moreover, the interface between the formation substrate and the organic resin may be filled with a liquid to perform separation.

The organic resin may be used for a substrate of the device. Alternatively, the organic resin may be removed and another substrate may be attached to an exposed surface of the layer to be separated with the use of an adhesive.

Alternatively, separation at the interface between a metal layer and the organic resin may be performed in the following manner: the metal layer is provided between the formation substrate and the organic resin and current is made to flow in the metal layer so that the metal layer is heated.

The insulating layer 378 preferably has a single-layer structure or a stacked-layer structure including any of a silicon nitride film, a silicon oxynitride film, a silicon oxide film, a silicon nitride oxide film, and the like.

The insulating layer 378 can be formed by a sputtering method, a plasma CVD method, a coating method, a printing method, or the like. For example, the insulating layer 378 is formed at a temperature higher than or equal to 250° C. and lower than or equal to 400° C. by a plasma CVD method, whereby the insulating layer 378 can be a dense film having an excellent moisture-resistant property. Note that the thickness of the insulating layer 378 is preferably greater than or equal to 10 nm and less than or equal to 3000 nm, or further preferably greater than or equal to 200 nm and less than or equal to 1500 nm.

As illustrated in FIG. 20B, a separation layer 413 is formed over a formation substrate 411. Next, a layer to be separated is formed over the separation layer 413. Here, the layer to be separated that is formed over the separation layer 413 corresponds to the insulating layer 376, the light-blocking layer 326, and the coloring layer 325 in FIG. 19.

The formation substrate 411, the separation layer 413, and the insulating layer 376 can be formed using the materials that can be used for the formation substrate 401, the separation layer 403, and the insulating layer 378, respectively.

Then, as illustrated in FIG. 20C, the formation substrate 401 and the formation substrate 411 are attached to each other with the bonding layer 317.

Figure 21A:
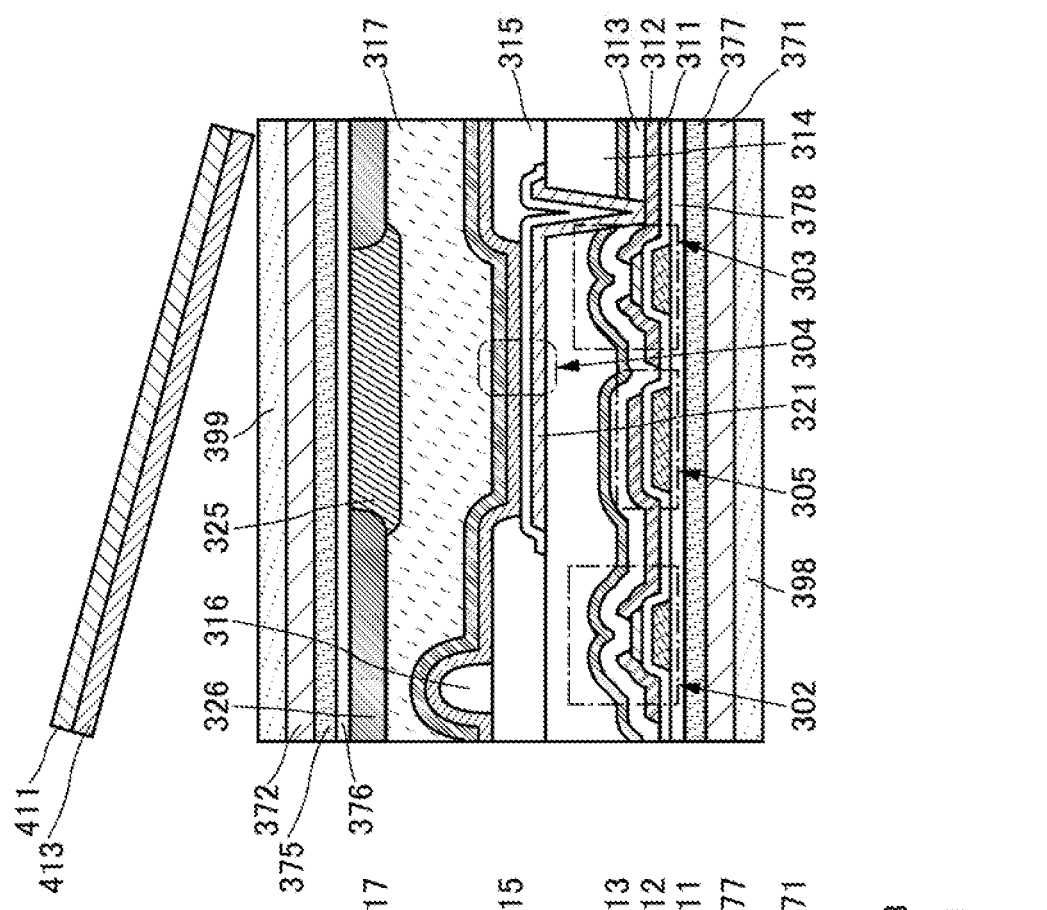
FIGS. 21A and 21B are cross-sectional views illustrating examples of a method for manufacturing a light-emitting panel.

Then, as illustrated in FIG. 21A, the formation substrate 401 and the insulating layer 378 are separated from each other. Note that either of the formation substrate 401 and the formation substrate 411 may be separated first.

Before the separation of the formation substrate 401 and the insulating layer 378, a separation starting point is preferably formed using laser light, a sharp knife, or the like. The insulating layer 378 is partly cracked (or broken), whereby the separation starting point can be formed. For example, laser light irradiation enables part of the insulating layer 378 to be melted, evaporated, or thermally broken.

Then, the insulating layer 378 and the formation substrate 401 are separated from the formed separation starting point by physical force (e.g., a separation process with a human hand or a jig, or a separation process by rotation of a roller adhered to the substrate). In the lower part of FIG. 21A, the separation layer 403 and the formation substrate 401 that are separated from the insulating layer 378 are illustrated. After that, as illustrated in FIG. 21A, the exposed insulating layer 378 and the substrate 371 are attached to each other with the bonding layer 377.

In many cases, both sides of a film that can be favorably used as the substrate 371 are provided with separation films (also referred to as separate films or release films). When the substrate 371 and the insulating layer 378 are bonded to each other, it is preferable that only one of the separation films which is provided over the substrate 371 be separated, and the other thereof remain. This facilitates transfer and processing in later steps. FIG. 21A illustrates an example in which one surface of the substrate 371 is provided with a separation film 398.

Figure 21B:
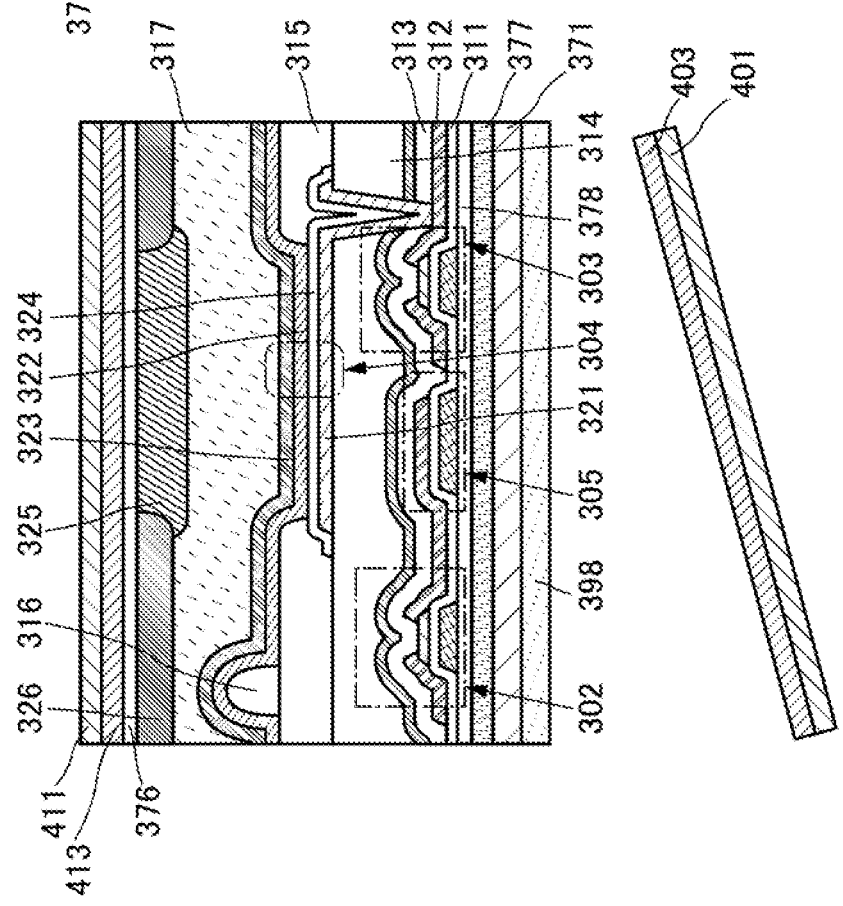

Then, as illustrated in FIG. 21B, the formation substrate 411 and the insulating layer 376 are separated from each other. In the upper part of FIG. 21B, the separation layer 413 and the formation substrate 411 that are separated from the insulating layer 376 are illustrated. Next, the exposed insulating layer 376 and the flexible substrate 372 are attached to each other with the bonding layer 375. FIG. 21B illustrates an example in which one surface of the substrate 372 is provided with a separation film 399.

Figure 22A:
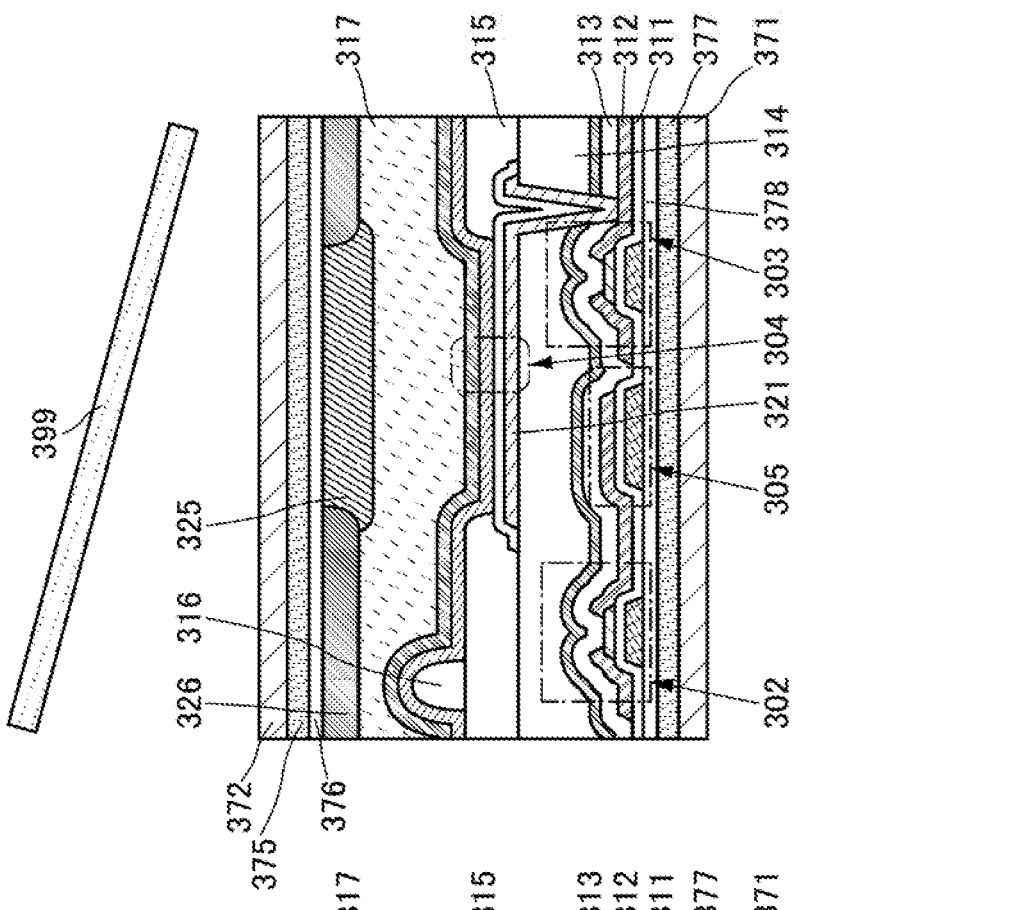
FIGS. 22A and 22B are cross-sectional views illustrating an example of a method for manufacturing a display panel.
Figure 22B:
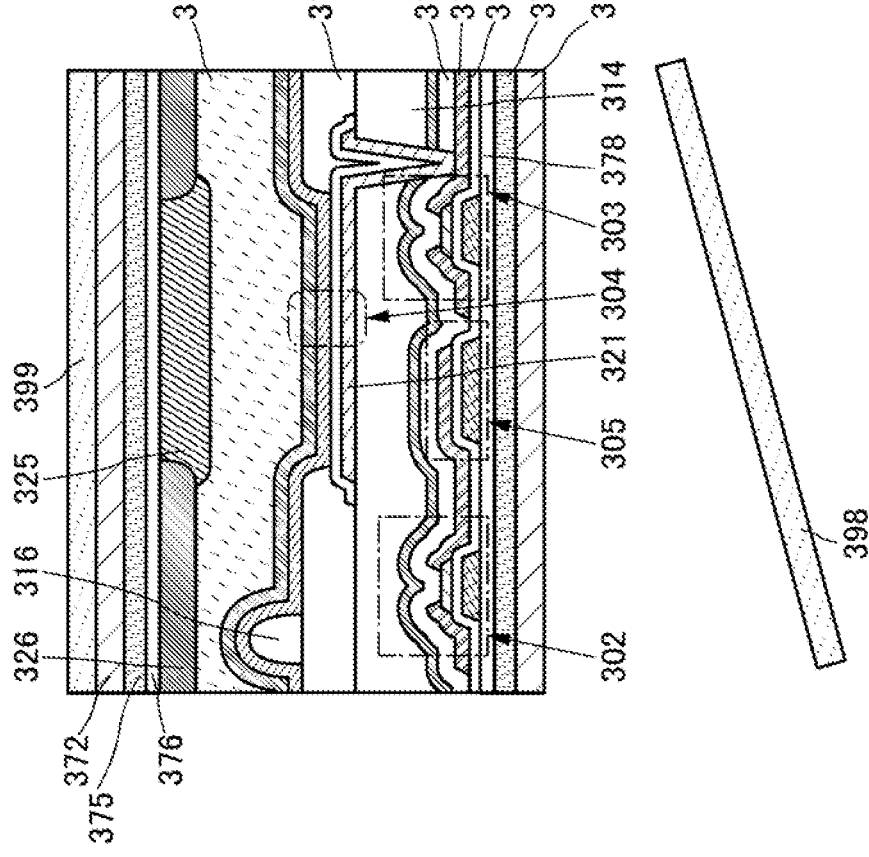

Next, as illustrated in FIG. 22A, the separation film 398 is separated. Then, as illustrated in FIG. 22B, the separation film 399 is separated. There is no limitation on the order of separating the separation films 398 and 399.

As described above, in one embodiment of the present invention, each of the functional elements and the like included in the light-emitting panel is formed over the formation substrate; thus, even in the case where a high-resolution light-emitting panel is manufactured, high alignment accuracy of the flexible substrate is not required. It is thus easy to attach the flexible substrate. In addition, since the functional element and the like can be fabricated with high temperatures, a highly reliable light-emitting panel can be obtained.

Structure Example 2

Figure 24A:
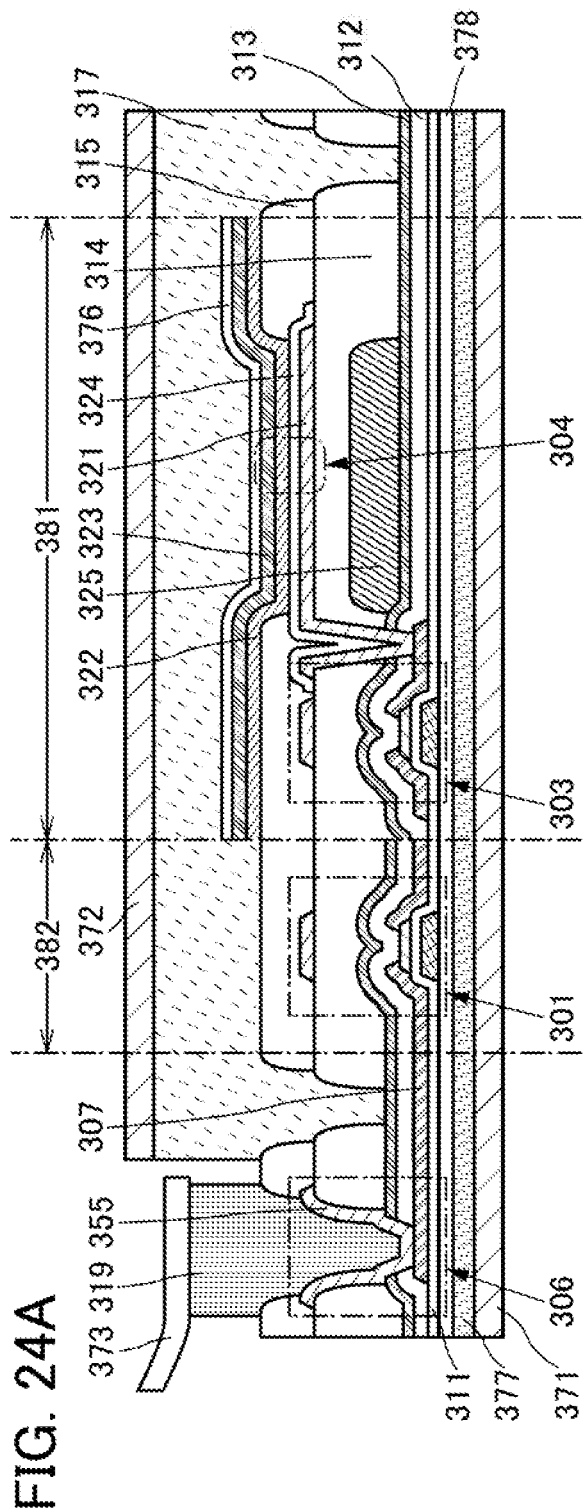
FIGS. 24A and 24B are cross-sectional views illustrating examples of a light-emitting panel.

FIG. 24A shows a cross-sectional view of a light-emitting panel employing a color filter method. Note that in the following structure examples, components similar to those in the above structure example will not be described in detail.

The light-emitting panel in FIG. 24A includes the substrate 371, the bonding layer 377, the insulating layer 378, a plurality of transistors, the conductive layer 307, the insulating layer 312, the insulating layer 313, the insulating layer 314, the insulating layer 315, the light-emitting element 304, the conductive layer 355, the bonding layer 317, the coloring layer 325, the substrate 372, and the insulating layer 376.

The driver circuit unit 382 includes the transistor 301. The light-emitting unit 381 includes the transistor 303.

Each transistor includes two gates, the gate insulating layer 311, a semiconductor layer, a source, and a drain. The two gates each overlap with the semiconductor layer with the insulating layer provided therebetween. FIG. 24A illustrates an example where each transistor has a structure in which the semiconductor layer is sandwiched between the two gates. Such transistors can have higher field-effect mobility and thus have higher on-state current than other transistors. Consequently, a circuit capable of high-speed operation can be obtained. Furthermore, the area occupied by a circuit can be reduced. The use of the transistor having high on-state current can reduce signal delay in wirings and can reduce display luminance variation even in a light-emitting panel in which the number of wirings is increased because of an increase in size or resolution. FIG. 24A illustrates an example in which one of the gates is formed using the same material and the same step as the electrode 321.

The light-emitting element 304 has a bottom-emission structure with which light is emitted to the coloring layer 325 side.

The light-emitting element 304 overlaps with the coloring layer 325 with the insulating layer 314 provided therebetween. The coloring layer 325 is provided between the light-emitting element 304 and the substrate 371. FIG. 24A illustrates an example in which the coloring layer 325 is provided over the insulating layer 313. In the example illustrated in FIG. 24A, a light-blocking layer and a spacer are not provided.

Structure Example 3

Figure 24B:
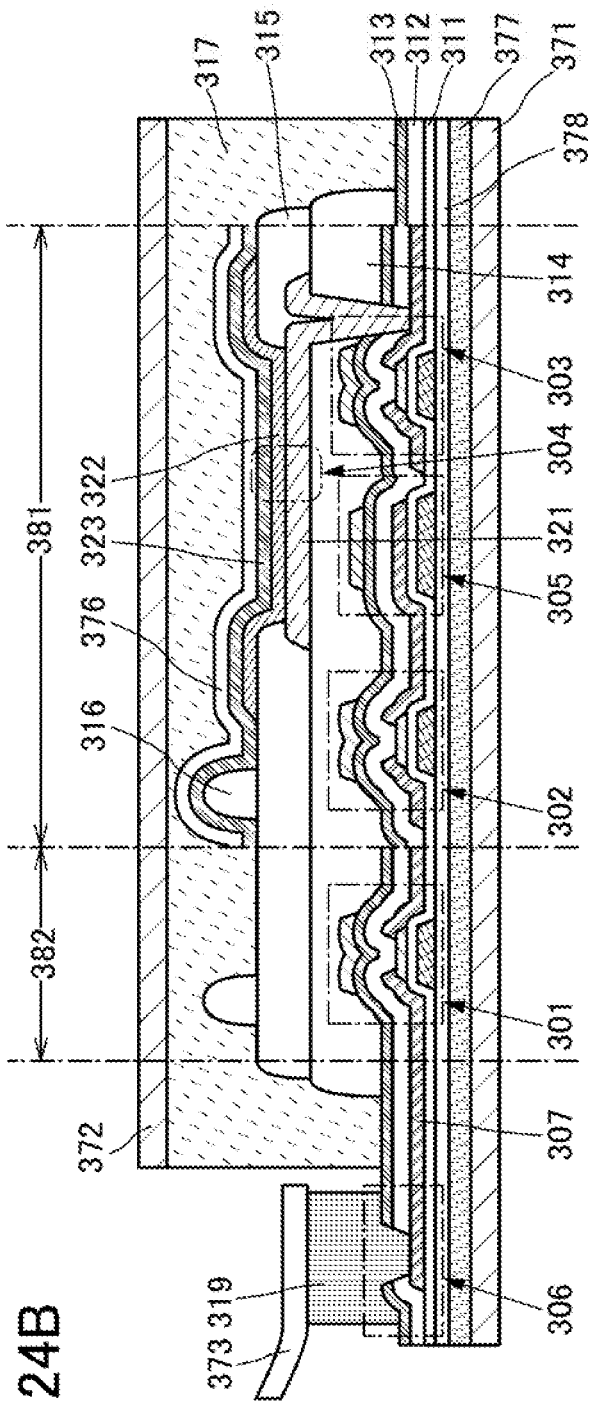

FIG. 24B shows a cross-sectional view of a light-emitting panel employing a separate coloring method.

The light-emitting panel in FIG. 24B includes the substrate 371, the bonding layer 377, the insulating layer 378, a plurality of transistors, the conductive layer 307, the insulating layer 312, the insulating layer 313, the insulating layer 314, the insulating layer 315, the spacer 316, the light-emitting element 304, the bonding layer 317, the substrate 372, and the insulating layer 376.

The driver circuit unit 382 includes a transistor 301. The light-emitting unit 381 includes the transistor 302, the transistor 303, and the capacitor 305.

Each transistor includes two gates, the gate insulating layer 311, a semiconductor layer, a source, and a drain. The two gates each overlap with the semiconductor layer with the insulating layer provided therebetween. FIG. 24B illustrates an example where each transistor has a structure in which the semiconductor layer is sandwiched between the two gates. In the example illustrated in FIG. 24B, one of the gates is formed between the insulating layer 313 and the insulating layer 314.

The light-emitting element 304 has a top-emission structure in which light is emitted to the substrate 372 side. In the example illustrated in FIG. 24B, the light-emitting element 304 does not include an optical adjustment layer. The insulating layer 376 functions as a sealing layer for the light-emitting element 304.

The connection portion 306 includes the conductive layer 307. The conductive layer 307 is electrically connected to the FPC 373 through the connector 319.

Application Example

In one embodiment of the present invention, a light-emitting panel provided with a touch sensor (also referred to as an input/output unit or a touch panel) can be manufactured.

There is no particular limitation on a sensor element included in the touch panel of one embodiment of the present invention. Note that a variety of sensors that can sense proximity or touch of a sensing target such as a finger or a stylus can be used as the sensor element.

For example, a variety of types such as a capacitive type, a resistive type, a surface acoustic wave type, an infrared type, an optical type, and a pressure-sensitive type can be used for the sensor.

In this embodiment, a touch panel including a capacitive sensor element is described as an example.

Examples of the capacitive sensor element include a surface capacitive sensor element and a projected capacitive sensor element. Examples of the projected capacitive sensor element include a self-capacitive sensor element and a mutual capacitive sensor element. The use of a mutual capacitive sensor element is preferable because multiple points can be sensed simultaneously.

The touch panel of one embodiment of the present invention can have any of a variety of structures, including a structure in which a light-emitting panel and a sensor element that are separately formed are attached to each other and a structure in which an electrode and the like included in a sensor element are provided on one or both of a substrate supporting a light-emitting element and a counter substrate.

Structure Example 4

Figure 25A:
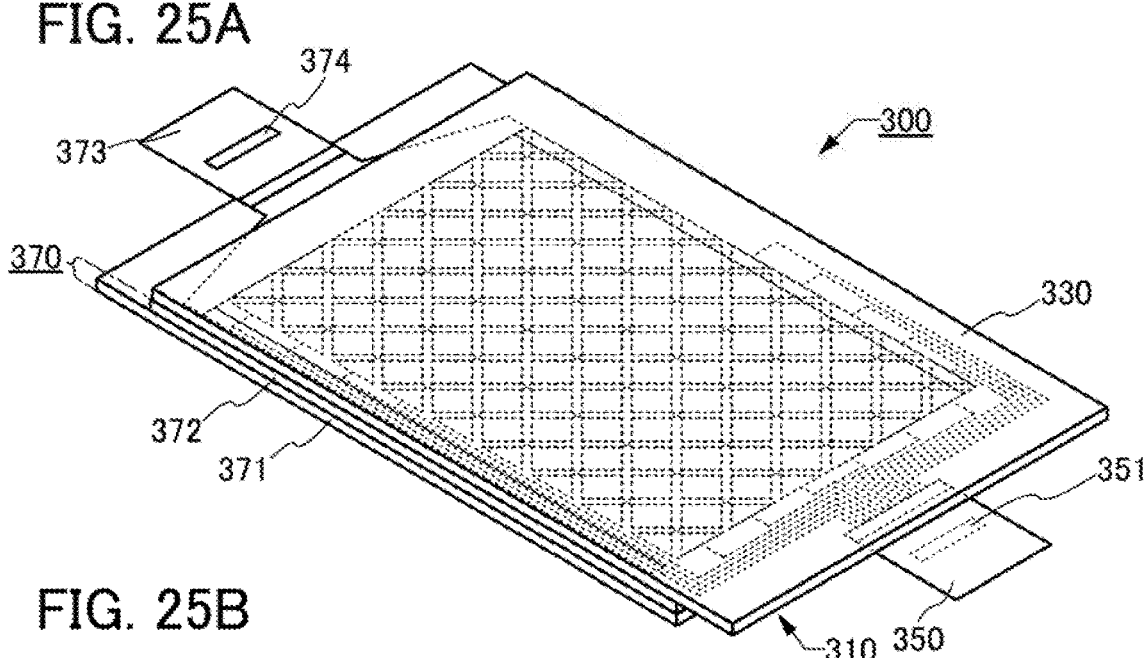
FIGS. 25A and 25B are perspective views illustrating an example of a touch panel.
Figure 25B:
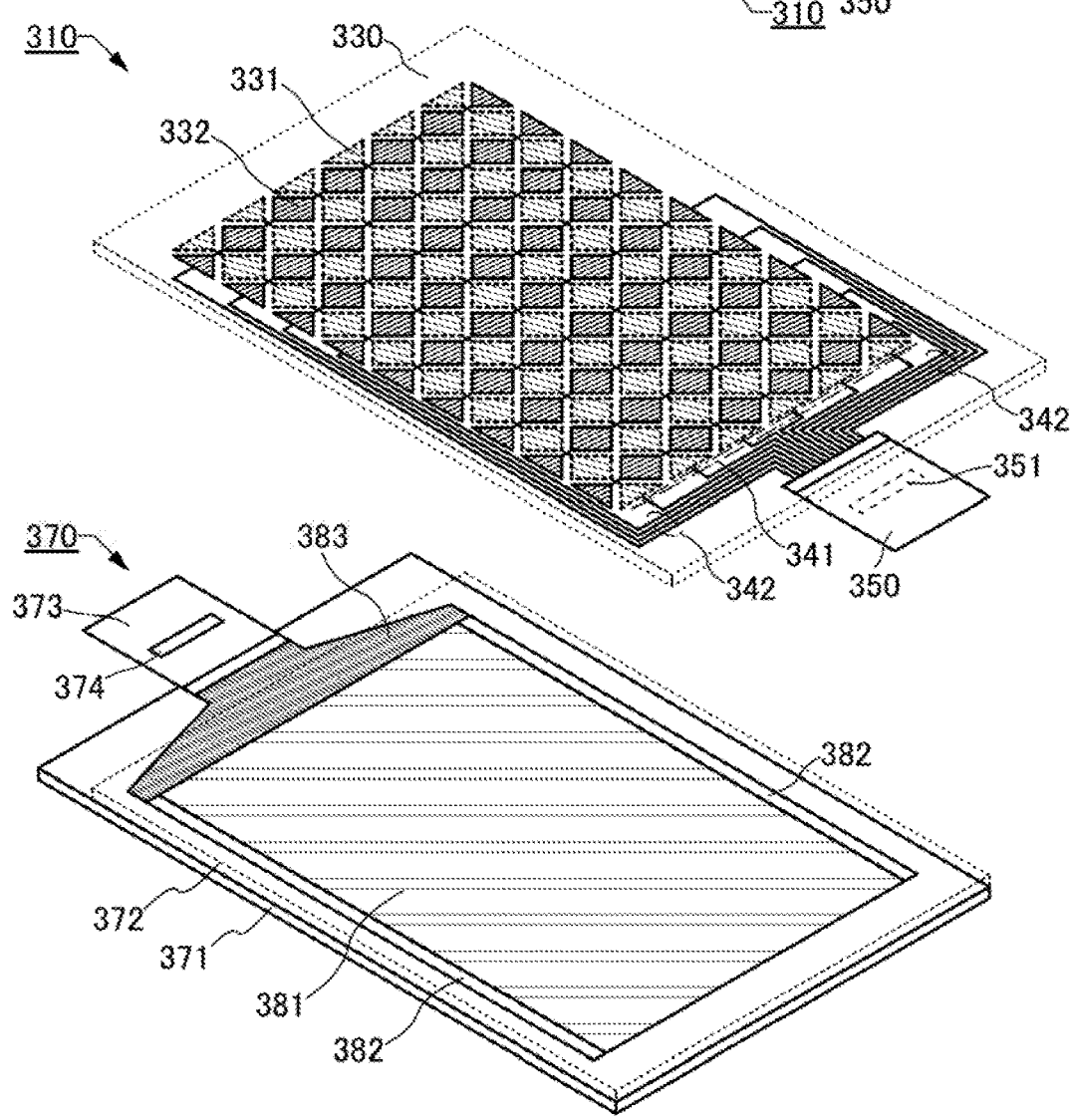

FIG. 25A is a schematic perspective view of a touch panel 300. FIG. 25B is a developed view of the schematic perspective view of FIG. 25A. Note that only typical components are illustrated for simplicity. In FIG. 25B, some components (such as the substrate 330 and the substrate 372) are illustrated only in dashed outline.

The touch panel 300 includes an input panel 310 and the light-emitting 370, which are provided to overlap with each other.

The input panel 310 includes the substrate 330, an electrode 331, an electrode 332, a plurality of wirings 341, and a plurality of wirings 342. An FPC 350 is electrically connected to each of the plurality of wirings 341 and the plurality of wirings 342. The FPC 350 is provided with an IC 351.

The light-emitting panel 370 includes the substrate 371 and the substrate 372 which are provided so as to face each other. The light-emitting panel 370 includes the light-emitting unit 381 and the driver circuit unit 382. A wiring 383 and the like are provided over the substrate 371. The FPC 373 is electrically connected to the wiring 383. The FPC 373 is provided with an IC 374.

The wiring 383 has a function of supplying a signal and power to the light-emitting unit 381 and the driver circuit unit 382. The signal and power are each input to the wiring 383 from the outside or the IC 374 through the FPC 373.

Figure 26:
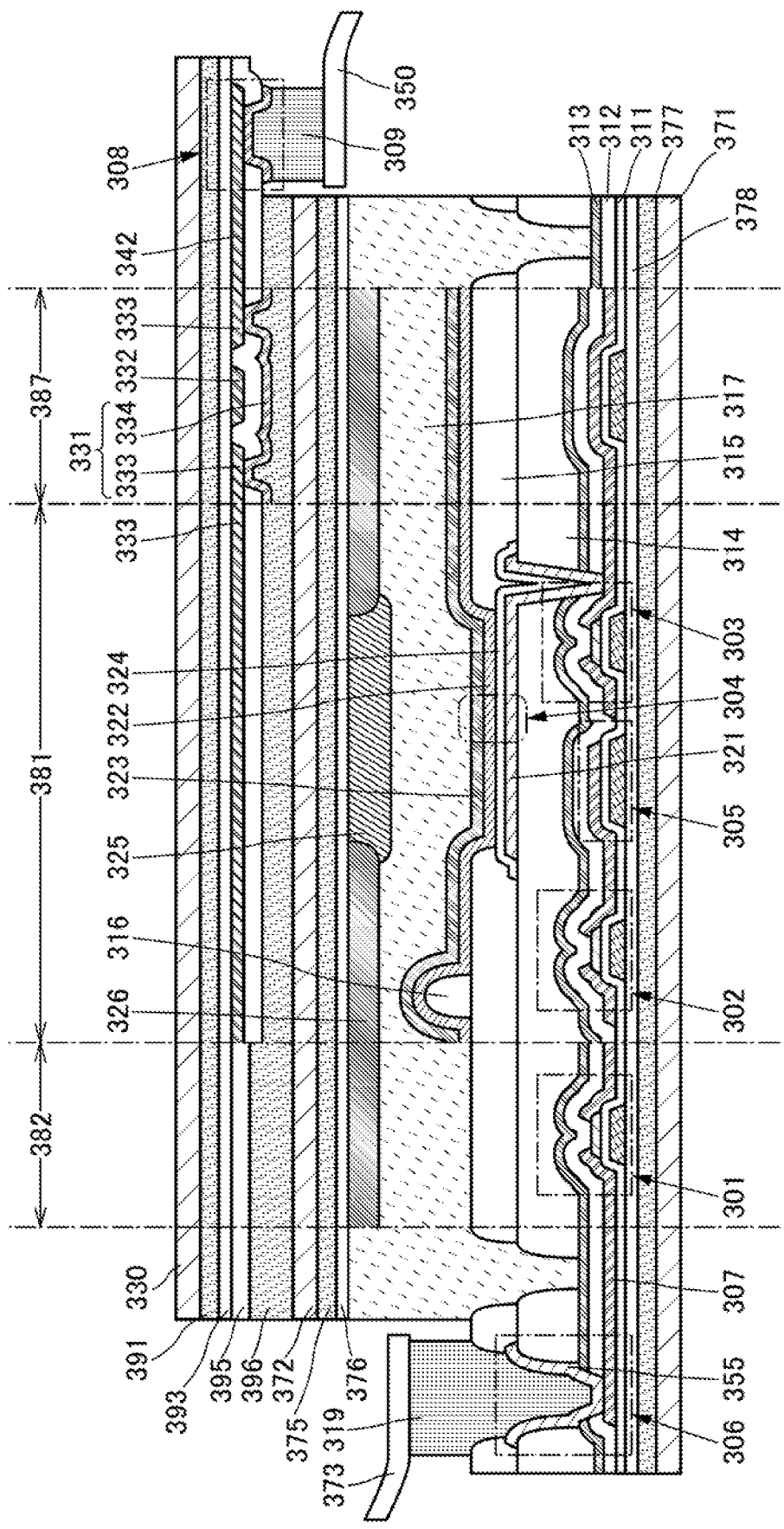
FIG. 26 is a cross-sectional view illustrating an example of a touch panel.

FIG. 26 illustrates an example of a cross-sectional view of the touch panel 300. FIG. 26 shows cross-sectional structures of the light-emitting unit 381, the driver circuit unit 382, the region including the FPC 373, the region including the FPC 350, and the like. Furthermore, FIG. 26 illustrates a cross-sectional structure of a crossing portion 387 where a wiring formed by processing a conductive layer used for forming the gate of the transistor and a wiring formed by processing a conductive layer used for forming the source and the drain of the transistor cross each other.

The substrate 371 and the substrate 372 are attached to each other with the bonding layer 317. The substrate 372 and the substrate 330 are attached to each other with a bonding layer 396. Here, the layers from the substrate 371 to the substrate 372 correspond to the light-emitting panel 370. Furthermore, the layers from the substrate 330 to the electrode 334 correspond to the input panel 310. In other words, the bonding layer 396 attaches the light-emitting panel 370 and the input panel 310 to each other. Alternatively, the layers from the substrate 371 to the insulating layer 376 correspond to the light-emitting panel 370. Furthermore, the layers from the substrate 330 to the substrate 372 correspond to the input panel 310. In other words, the bonding layer 375 attaches the light-emitting panel 370 and the input panel 310 to each other.

The structure of the light-emitting panel 370 shown in FIG. 26 is similar to that of the light-emitting panel shown in FIG. 19 and is thus not described in detail.

<Input Panel 310>

On the substrate 372 side of the substrate 330, the electrode 331 and the electrode 332 are provided. An example where the electrode 331 includes an electrode 333 and the electrode 334 is described here. As illustrated in the crossing portion 387 in FIG. 26, the electrodes 332 and 333 are formed on the same plane. An insulating layer 395 is provided to cover the electrode 332 and the electrode 333. The electrode 334 electrically connects two electrodes 333, between which the electrode 332 is provided, through openings formed in the insulating layer 395.

In a region near the end portion of the substrate 330, a connection portion 308 is provided. The connection portion 308 has a stack of a wiring 342 and a conductive layer formed by processing a conductive layer used for forming the electrode 334. The connection portion 308 is electrically connected to the FPC 350 through a connector 309.

The substrate 330 is attached to the insulating layer 393 with the bonding layer 391. As in the manufacturing method for the structure example 1, the input panel 310 can also be manufactured by forming elements over a formation substrate, separating the formation substrate, and then transferring the elements over the substrate 330. Alternatively, the insulating layer 393, the elements, and the like may be directly formed on the substrate 330 (see FIG. 27A).

Structure Example 5

The touch panel shown in FIG. 27A is different from the touch panel in FIG. 26 in the structures of the transistors 301, 302, and 303 and the capacitor 305 and in not including the bonding layer 391.

FIG. 27A illustrates an example of using top-gate transistors.

Each transistor includes a gate, the gate insulating layer 311, a semiconductor layer, a source, and a drain. The gate and the semiconductor layer overlap with each other with the gate insulating layer 311 provided therebetween. The semiconductor layer may include low-resistance regions 348. The low-resistance regions 348 function as the source and drain of the transistor.

The conductive layer over the insulating layer 313 functions as a lead wiring. The conductive layer is electrically connected to the region 348 via an opening provided in the insulating layer 313, the insulating layer 312, and the gate insulating layer 311.

In FIG. 27A, the capacitor 305 has a stacked-layer structure that includes a layer formed by processing a semiconductor layer used for forming the above-described semiconductor layer, the gate insulating layer 311, and a layer formed by processing a conductive layer used for forming the gate. Here, part of the semiconductor layer of the capacitor 305 preferably has a region 349 having a higher conductivity than a region 347 where the channel of the transistor is formed.

The region 348 and the region 349 each can be a region containing more impurities than the region 347 where the channel of the transistor is formed, a region with a high carrier concentration, a region with low crystallinity, or the like.

A transistor 848 illustrated in FIGS. 27B to 27D can be used in the light-emitting panel of one embodiment of the present invention.

FIG. 27B is a top view of the transistor 848. FIG. 27C is a cross-sectional view in the channel length direction of the transistor 848 in the light-emitting panel of one embodiment of the present invention. The cross section of the transistor 848 illustrated in FIG. 27C is taken along the dashed-dotted line X1-X2 in FIG. 27B. FIG. 27D is a cross-sectional view in the channel width direction of the transistor 848 in the light-emitting panel of one embodiment of the present invention. The cross section of the transistor 848 illustrated in FIG. 27D is taken along the dashed-dotted line Y1-Y2 in FIG. 27B.

The transistor 848 is a type of top-gate transistor including a back gate.

In the transistor 848, a semiconductor layer 742 is formed over a projection of an insulating layer 772. When the semiconductor layer 742 is provided over the projection of the insulating layer 772, the side surface of the semiconductor layer 742 can also be covered with a gate 743. Thus, the transistor 848 has a structure in which the semiconductor layer 742 can be electrically surrounded by an electric field of the gate 743. Such a structure of a transistor in which a semiconductor film in which a channel is formed is electrically surrounded by an electric field of a conductive film is called a surrounded channel (s-channel) structure. A transistor with an s-channel structure is referred to as an s-channel transistor.

In the s-channel structure, a channel can be formed in the whole (bulk) of the semiconductor layer 742. In the s-channel structure, the drain current of the transistor can be increased, so that a larger amount of on-state current can be obtained. Furthermore, the entire channel formation region of the semiconductor layer 742 can be depleted by the electric field of the gate 743. Accordingly, the off-state current of the transistor with the s-channel structure can further be reduced.

A back gate 723 is provided over the insulating layer 378.

A conductive layer 744a provided over an insulating layer 729 is electrically connected to the semiconductor layer 742 through an opening 747c formed in the gate insulating layer 311, an insulating layer 728, and the insulating layer 729. A conductive layer 744b provided over the insulating layer 729 is electrically connected to the semiconductor layer 742 through an opening 747d formed in the gate insulating layer 311 and the insulating layers 728 and 729.

The gate 743 provided over the gate insulating layer 311 is electrically connected to the back gate 723 through an opening 747a and an opening 747b formed in the gate insulating layer 311 and the insulating layer 772. Accordingly, the same potential is supplied to the gate 743 and the back gate 723. Furthermore, either or both of the openings 747a and 747b may be omitted. In the case where both the openings 747a and 747b are omitted, different potentials can be supplied to the back gate 723 and the gate 743.

As a semiconductor in the transistor having the s-channel structure, an oxide semiconductor, silicon such as polycrystalline silicon or single crystal silicon that is transferred from a single crystal silicon substrate, or the like is used.

Structure Example 6

Figure 28:
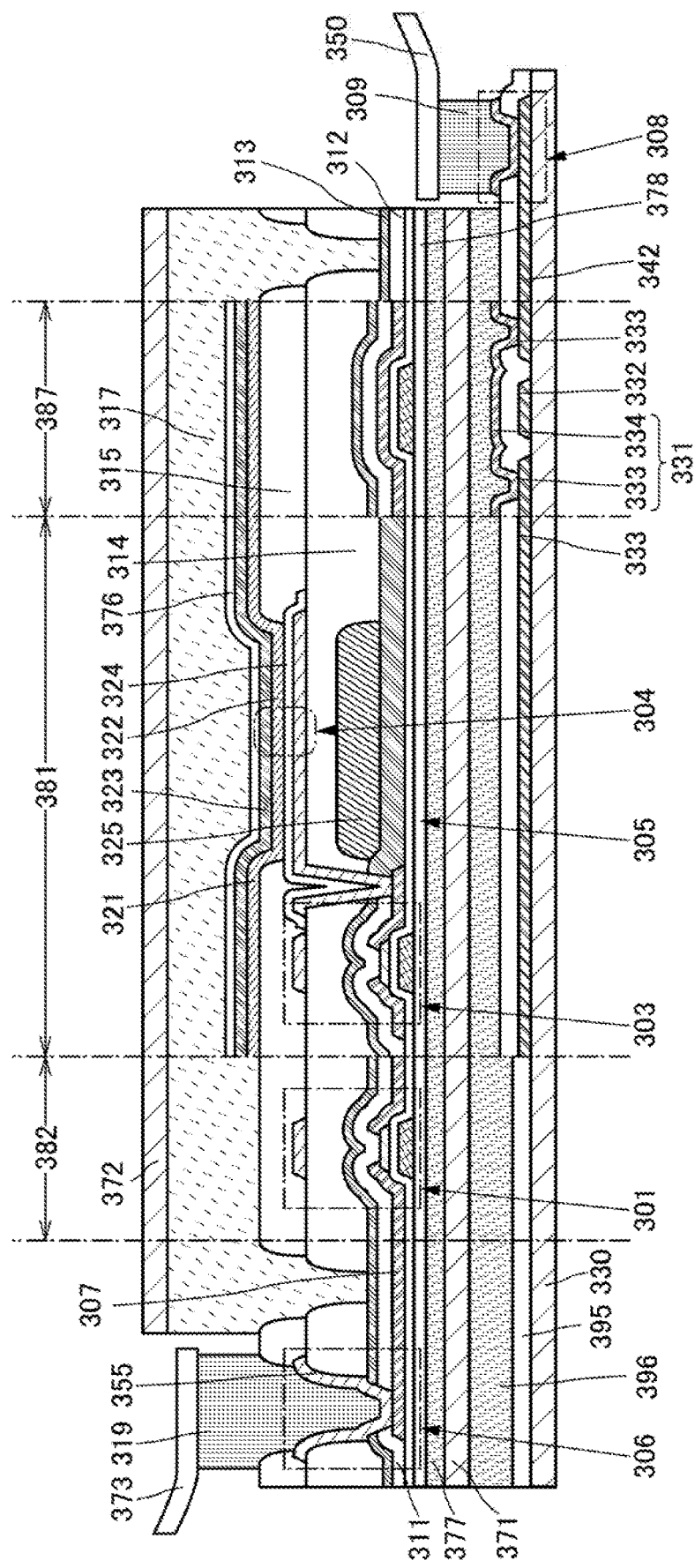
FIG. 28 is a cross-sectional view illustrating an example of a touch panel.

FIG. 28 shows an example of a touch panel in which a bottom-emission light-emitting panel and an input panel are attached to each other with the bonding layer 396.

The input panel in FIG. 28 is different from that in FIGS. 27A to 27D in that the insulating layer 393 is not provided and that the electrode 331, the electrode 332, and the like are provided directly on the substrate 330.

Structure Example 7

Figure 29:
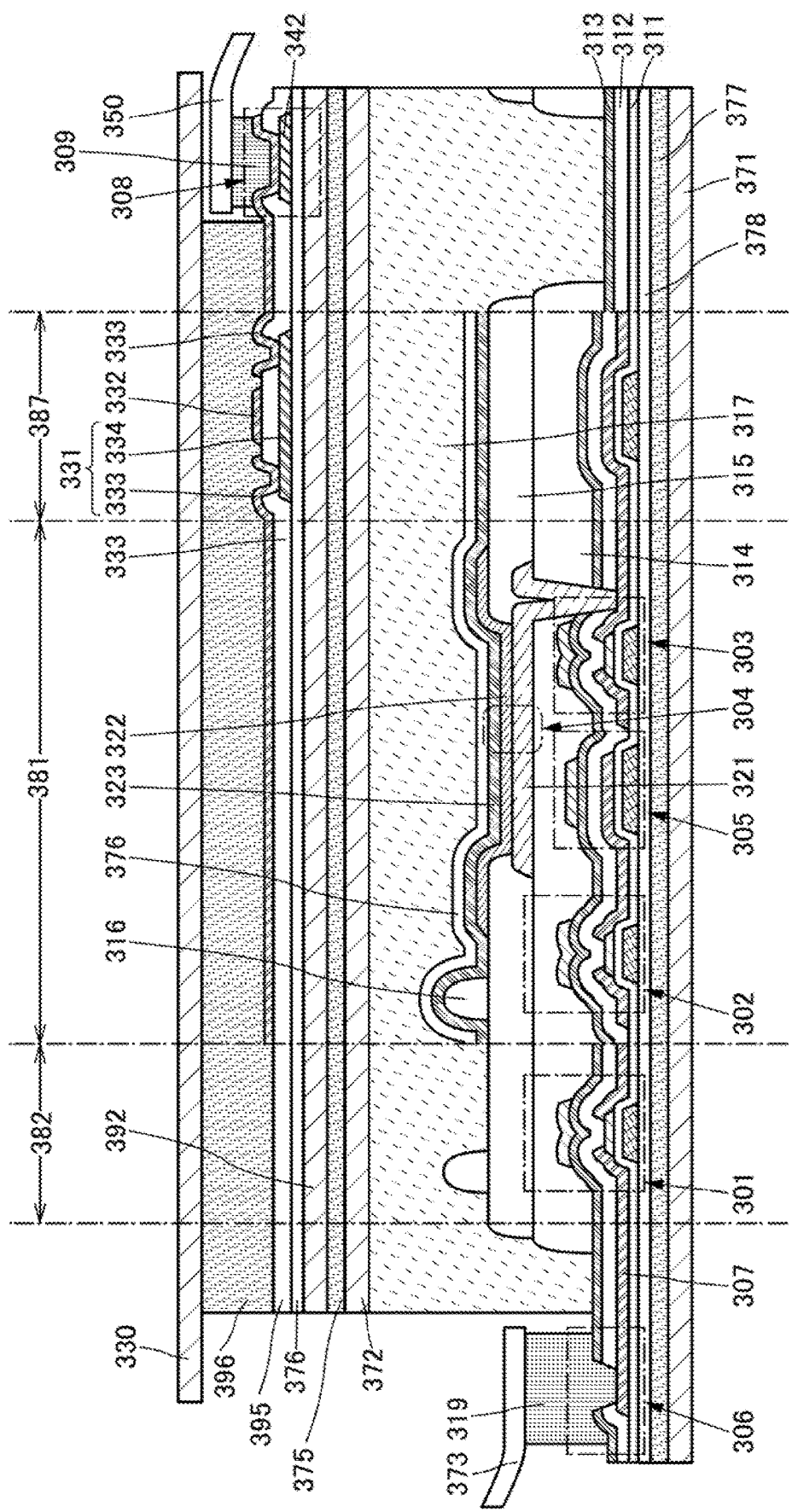
FIG. 29 is a cross-sectional view illustrating an example of a touch panel.

FIG. 29 shows an example of a touch panel in which a light-emitting panel using a separate coloring method and an input panel are attached to each other with the bonding layer 375.

The light-emitting panel in FIG. 29 has a structure similar to that in FIG. 24B.

The input panel in FIG. 29 includes the insulating layer 376 over a substrate 392, and the electrode 334 and the wiring 342 over the insulating layer 376. The electrode 334 and the wiring 342 are covered with the insulating layer 395. The electrode 332 and the electrode 333 are provided over the insulating layer 395. The substrate 330 is attached to the substrate 392 with the bonding layer 396.

Structure Example 8

Figure 30:
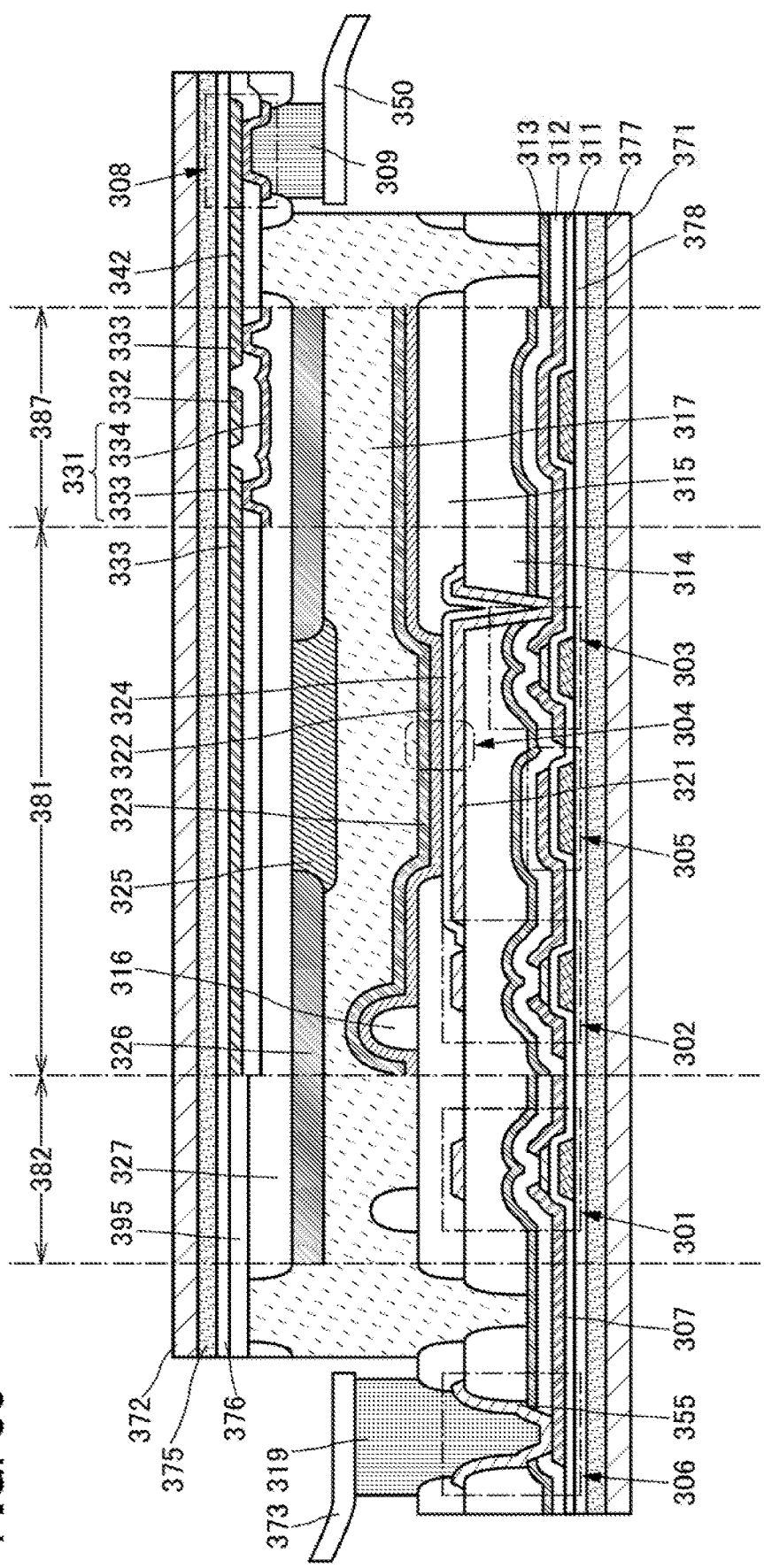
FIG. 30 is a cross-sectional view illustrating an example of a touch panel.

FIG. 30 shows an example in which a touch sensor and the light-emitting element 304 are provided between a pair of flexible substrates (the substrate 371 and the substrate 372). When two flexible substrates are used, the touch panel can be thin, lightweight, and flexible.

The structure in FIG. 30 can be fabricated by changing the structure of the layer to be separated that is formed over the formation substrate 411 in the manufacturing process example for the structure example 1. In the manufacturing process example for the structure example 1, as the layer to be separated that is formed over the formation substrate 411, the insulating layer 376, the coloring layer 325, and the light-blocking layer 326 are formed (FIG. 20B).

In the case where the structure in FIG. 30 is fabricated, after the insulating layer 376 is formed, the electrode 332, the electrode 333, and the wiring 342 are formed over the insulating layer 376. Then, the insulating layer 395 covering these electrodes is formed. Next, the electrode 334 is formed over the insulating layer 395. Then, the insulating layer 327 covering the electrode 334 is formed. After that, the coloring layer 325 and the light-blocking layer 326 are formed over the insulating layer 327. Then, attachment to the formation substrate 401 is performed, the formation substrates are separated, and the flexible substrate is attached; thus, the touch panel having the structure in FIG. 30 can be fabricated.

Structure Example 9

FIGS. 31A and 31B are schematic perspective views of a touch panel 320.

In FIGS. 31A and 31B, the substrate 372 of a light-emitting panel 379 is provided with an input panel 318. The wiring 341, the wiring 342, and the like of the input panel 318 are electrically connected to the FPC 373 provided for the light-emitting panel 379.

With the above structure, the FPC connected to the touch panel 320 can be provided only on one substrate side (on the substrate 371 side in this embodiment). Although two or more FPCs may be attached to the touch panel 320, it is preferable that the touch panel 320 be provided with one FPC 373 which has a function of supplying signals to both the light-emitting panel 379 and the input panel 310 as illustrated in FIGS. 31A and 31B, for the simplicity of the structure.

The IC 374 can have a function of driving the input panel 318. Alternatively, an IC for driving the input panel 318 may further be provided. Further alternatively, an IC for driving the input panel 318 may be mounted on the substrate 371.

Figure 32:
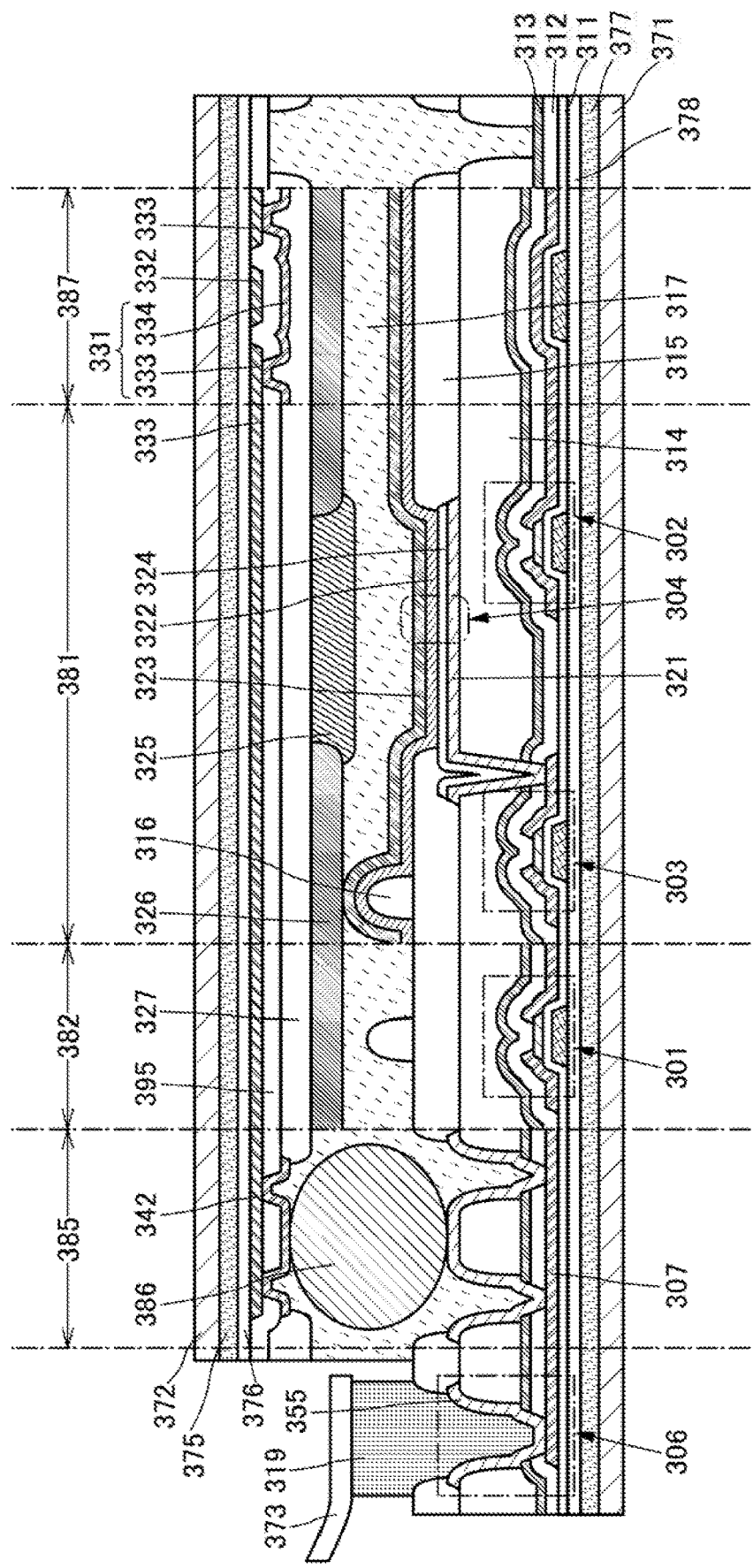
FIG. 32 is a cross-sectional view illustrating an example of a touch panel.

FIG. 32 is a cross-sectional view showing a region including the FPC 373, a connection portion 385, the driver circuit unit 382, and the light-emitting unit 381 in FIGS. 31A and 31B.

In the connection portion 385, one of the wirings 342 (or the wirings 341) and one of the conductive layers 307 are electrically connected to each other via a connector 386.

As the connector 386, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 386, a material capable of elastic deformation or plastic deformation is preferably used. As illustrated in FIG. 32, the conductive particle has a shape that is vertically crushed in some cases. With the crushed shape, the contact area between the connector 386 and a conductive layer electrically connected to the connector 386 can be increased, thereby reducing contact resistance and suppressing the generation of problems such as disconnection.

The connector 386 is preferably provided so as to be covered with the bonding layer 317. For example, the connector 386 is dispersed in the bonding layer 317 before curing of the bonding layer 317. A structure in which the connection portion 385 is provided in a portion where the bonding layer 317 is provided can be similarly applied not only to a structure in which the bonding layer 317 is also provided over the light-emitting element 304 as illustrated in FIG. 32 (also referred to as a solid sealing structure) but also to, for example, a hollow sealing structure in which the bonding layer 317 is provided in the periphery of a light-emitting panel, a liquid crystal display panel, or the like.

FIG. 32 illustrates an example in which the optical adjustment layer 324 does not cover an end portion of the electrode 321. In the example in FIG. 32, the spacer 316 is also provided in the driver circuit unit 382.

Structural Example 10

In a touch panel illustrated in FIG. 33A, the light-blocking layer 326 is provided between the electrodes and the like of the touch sensor and the substrate 372. Specifically, the light-blocking layer 326 is provided between the insulating layer 376 and an insulating layer 328. Conductive layers including the electrodes 332 and 333 and the wirings 342, the insulating layer 395 covering these conductive layers, the electrode 334 over the insulating layer 395, and the like are provided over the insulating layer 328. Furthermore, the insulating layer 327 is provided over the electrode 334 and the insulating layer 395, and the coloring layer 325 is provided over the insulating layer 327.

The insulating layers 327 and 328 have a function as a planarization film. Note that the insulating layers 327 and 328 are not necessarily provided when not needed.

With such a structure, the light-blocking layer 326 provided in a position closer to the substrate 372 side than the electrodes and the like of the touch sensor can prevent the electrodes and the like from being seen by a user. Thus, a touch panel with not only a small thickness but also improved display quality can be achieved.

Figure 33B:
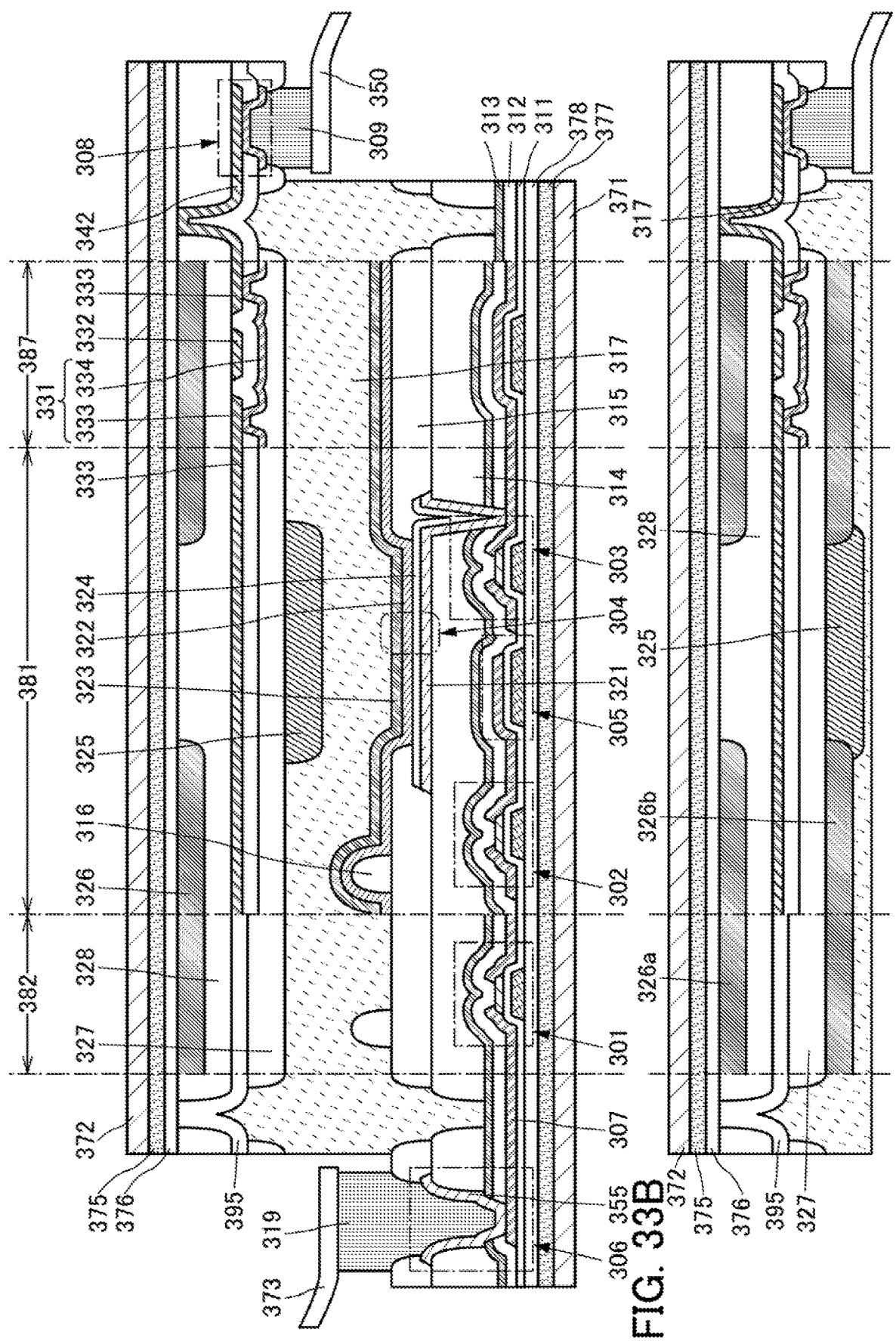

As illustrated in FIG. 33B, the touch panel may include a light-blocking layer 326a between the insulating layer 376 and the insulating layer 328 and may include a light-blocking layer 326b between the insulating layer 327 and the bonding layer 317. Providing the light-blocking layer 326b can inhibit light leakage more surely.

Structural Example 11

FIG. 34A is a top view illustrating a light-emitting panel. FIG. 34B is a cross-sectional view taken along dashed-dotted line X1-Y1 in FIG. 34A. FIG. 34C is a cross-sectional view taken along dashed-dotted line X2-Y2 in FIG. 34A. FIG. 34D is a cross-sectional view taken along dashed-dotted line X3-Y3 in FIG. 34A.

The light-emitting panel illustrated in FIGS. 34A to 34D includes a substrate 901, an insulating layer 903, an auxiliary electrode 921 (also referred to as an auxiliary wiring), a light-emitting element 930, an insulating layer 925, a bonding layer 927, a conductive layer 911, a conductive layer 912, a drying agent 913, and a substrate 991.

It is preferable that each of the substrates 901 and 991 have flexibility.

The light-emitting element 930 is an EL element having a bottom-emission structure; specifically, a lower electrode 931 transmitting visible light is provided over the substrate 901, an EL layer 933 is provided over the lower electrode 931, and an upper electrode 935 reflecting visible light is provided over the EL layer 933.

In the light-emitting panel illustrated in FIGS. 34A to 34D, the light-emitting element 930 is provided over the substrate 901 with the insulating layer 903 provided therebetween. The auxiliary electrode 921 provided over the insulating layer 903 is electrically connected to the lower electrode 931. The conductive layer 911 provided over the insulating layer 903 is electrically connected to the lower electrode 931. As illustrated in FIGS. 34A and 34C, part of the conductive layer 911 is exposed and functions as a terminal. The conductive layer 912 provided over the insulating layer 903 is electrically connected to the upper electrode 935. As illustrated in FIGS. 34A and 34D, part of the conductive layer 912 is exposed and functions as a terminal. The end portion of the lower electrode 931 is covered with the insulating layer 925. The insulating layer 925 is provided to cover the auxiliary electrode 921 with the lower electrode 931 provided therebetween. Note that the auxiliary electrode 921 is not necessarily provided.

The light-emitting element 930 is sealed with the substrate 901, the substrate 991, and the bonding layer 927. A method for sealing the light-emitting panel is not limited, and either solid sealing or hollow sealing can be employed. For example, a glass material such as a glass frit, or a resin material such as a two-component-mixture-type resin which is curable at room temperature, a light curable resin, a thermosetting resin, and the like can be used for the bonding layer 927. The sealed space 929 may be filled with an inert gas such as nitrogen or argon, or a resin such as a polyvinyl chloride (PVC) resin, an acrylic resin, a polyimide resin, an epoxy resin, a silicone resin, a polyvinyl butyral (PVB) resin, or an ethylene vinyl acetate (EVA) resin. Further, a drying agent may be contained in the resin.

The drying agent 913 is provided in contact with the substrate 991. Since the light-emitting panel illustrated in FIGS. 34A to 34D has a bottom-emission structure, the drying agent 913 can be provided in the space 929 without reducing light extraction efficiency. With the drying agent 913, the lifetime of the light-emitting element 930 can be increased, which is preferable.

The use of a flexible substrate allows the light-emitting panel of this embodiment to have flexibility. The flexible light-emitting panel can be mounted on headphones or a portable information terminal at least part of which is flexible and can be bent to conform to change in the shape of the headphones or the portable information terminal.

This embodiment can be combined with any of other embodiments as appropriate.

Embodiment 3

Power storage device that can be used in one embodiment of the present invention is described with reference to FIGS. 35A to 35C, FIGS. 36A and 36B, FIGS. 37A and 37B, and FIG. 38. Note that the power storage device of one embodiment of the present invention is not limited to the structures described in this embodiment, and various shapes and modes can be used.

Although a lithium-ion secondary battery is described as an example in this embodiment, one embodiment of the present invention is not limited to this example. One embodiment of the present invention can be used for any of a battery, a primary battery, a secondary battery, a lithium air battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air cell, a zinc-air battery, a capacitor, a lithium-ion capacitor, an electric double layer capacitor, an ultracapacitor, a supercapacitor, and the like.

In one embodiment of the present invention, power can be fed to the power storage device by a method for feeding power to an object (hereinafter, also referred to as a power receiving device) in a state where contact with a power supply source (hereinafter, also referred to as a power transmitting device) is not made (such a method is also referred to as contactless power feeding, wireless feeding, or the like). Examples of the contactless power feeding include a magnetic resonance method, an electromagnetic induction method, an electrostatic induction method, and the like.

Figure 35A:
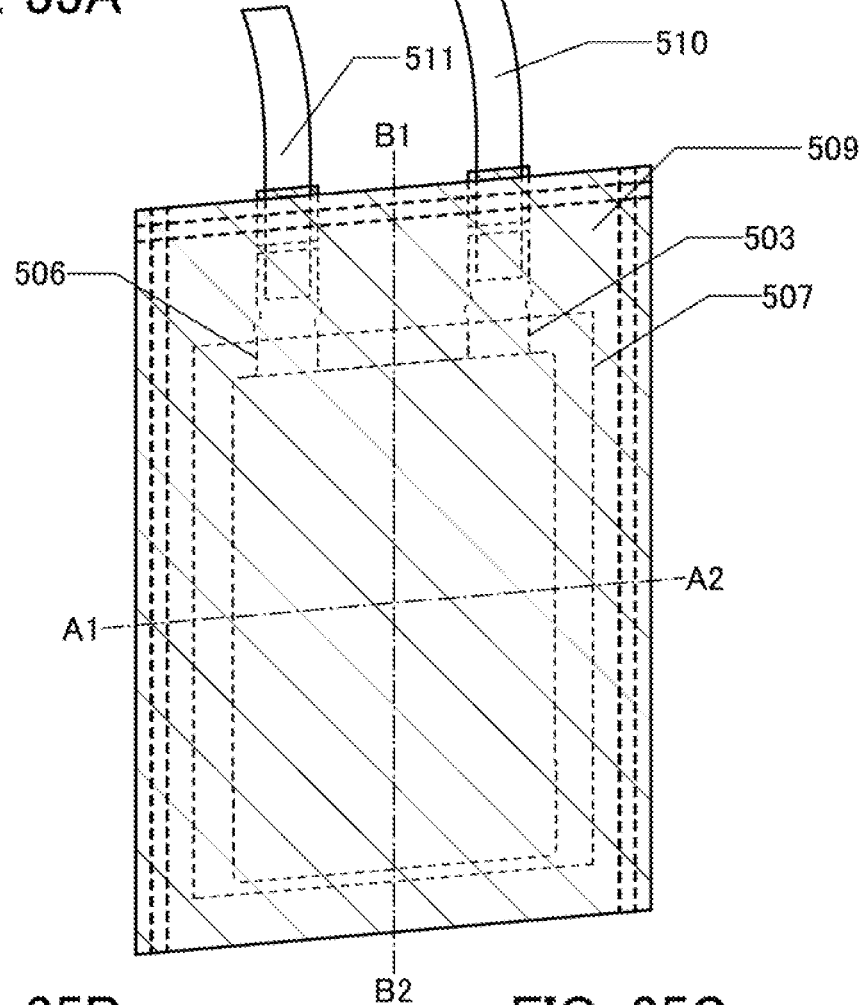
FIGS. 35A to 35C are perspective views illustrating an example of a power storage device and examples of electrodes.

FIG. 35A illustrates a battery unit 500. Although FIG. 35A illustrates a mode of a thin secondary battery as an example of the battery unit 500, one embodiment of the present invention is not limited to this example. For example, a secondary battery using a wound body or a cylindrical or coin-type secondary battery can be used in the headphones of one embodiment of the present invention.

As illustrated in FIG. 35A, the battery unit 500 includes a positive electrode 503, a negative electrode 506, a separator 507, and an exterior body 509. The battery unit 500 may include a positive electrode lead 510 and a negative electrode lead 511.

Figure 36A:
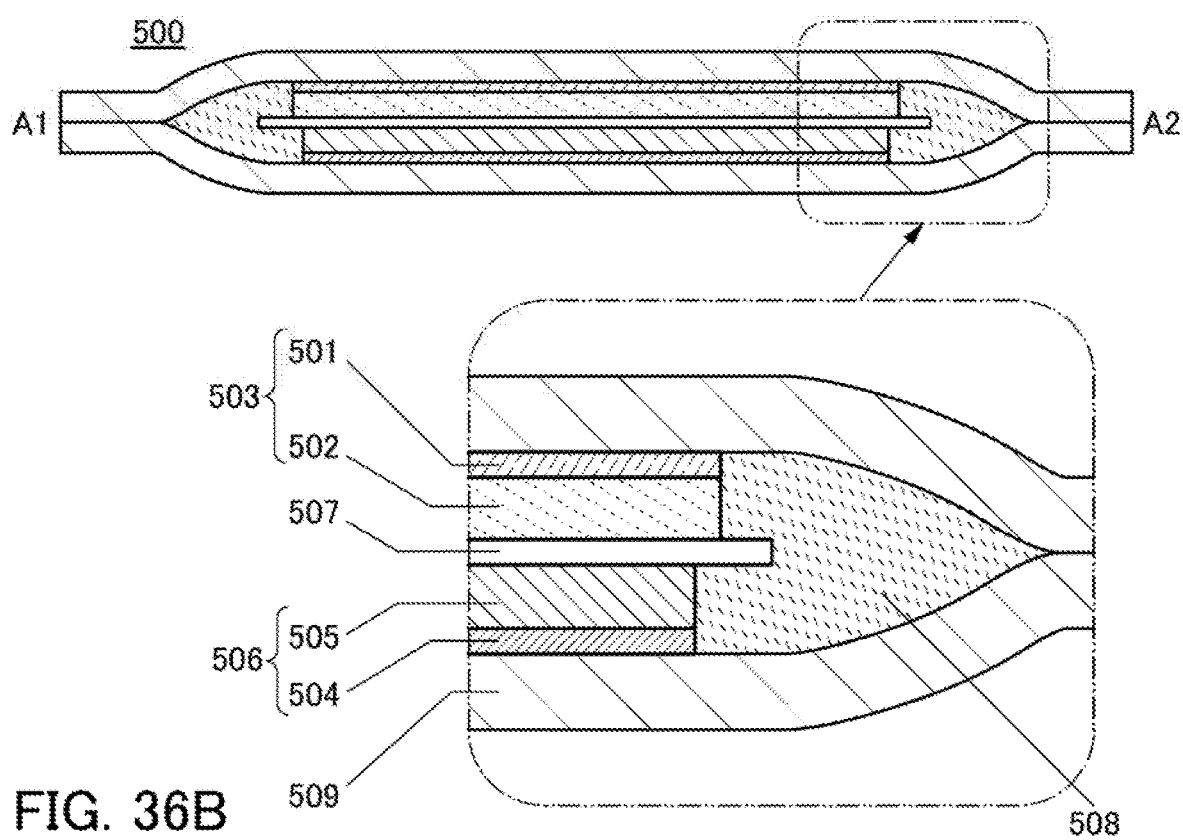
FIGS. 36A and 36B are cross-sectional views illustrating examples of a power storage device.
Figure 36B:
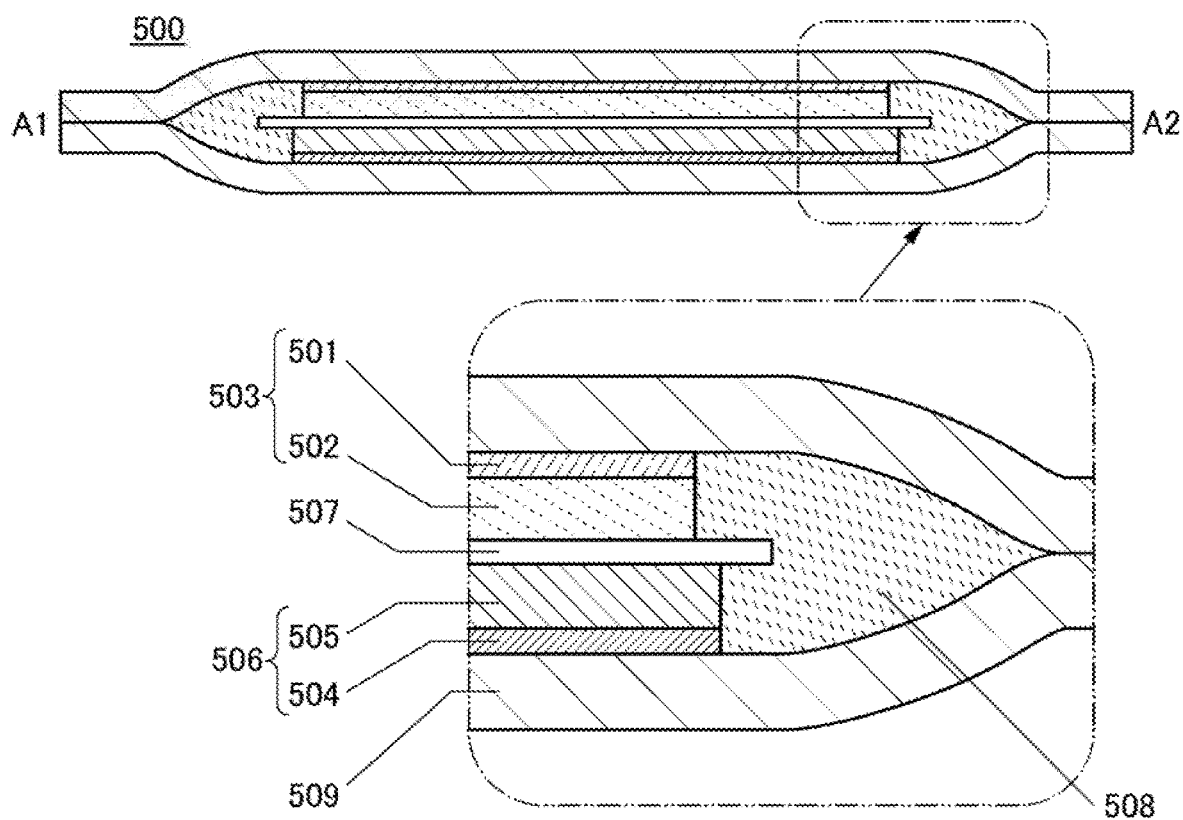

FIGS. 36A and 36B each illustrate an example of a cross-sectional view taken along dashed-dotted line A1-A2 in FIG. 35A. FIGS. 36A and 36B each illustrate a cross-sectional structure of the battery unit 500 that is formed using a pair of the positive electrode 503 and the negative electrode 506.

As illustrated in FIGS. 36A and 36B, the battery unit 500 includes the positive electrode 503, the negative electrode 506, the separator 507, an electrolytic solution 508, and the exterior bodies 509. The separator 507 is interposed between the positive electrode 503 and the negative electrode 506. A space surrounded by the exterior bodies 509 is filled with the electrolytic solution 508.

The positive electrode 503 includes a positive electrode active material layer 502 and a positive electrode current collector 501. The negative electrode 506 includes a negative electrode active material layer 505 and a negative electrode current collector 504. The active material layer can be formed on one or both surfaces of the current collector. The separator 507 is positioned between the positive electrode current collector 501 and the negative electrode current collector 504.

The battery unit includes one or more positive electrodes and one or more negative electrodes. For example, the battery unit can have a layered structure including a plurality of positive electrodes and a plurality of negative electrodes.

Figure 37A:
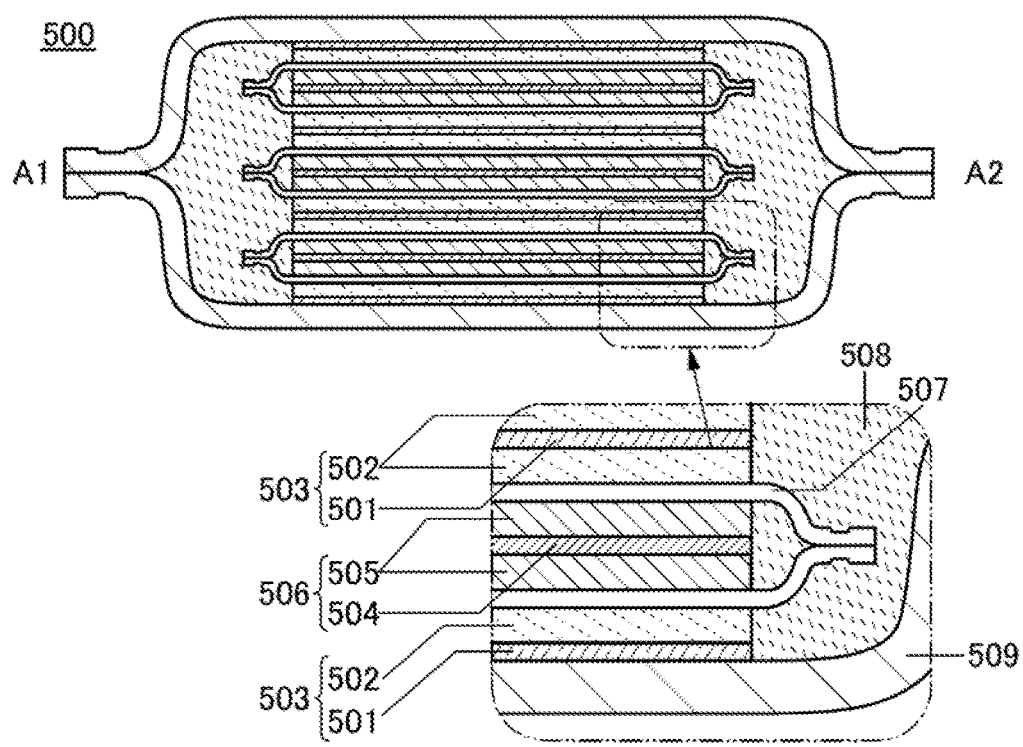
FIGS. 37A and 37B are cross-sectional views illustrating examples of a power storage device.

FIG. 37A illustrates another example of a cross-sectional view taken along dashed-dotted line A1-A2 in FIG. 35A.

Figure 37B:
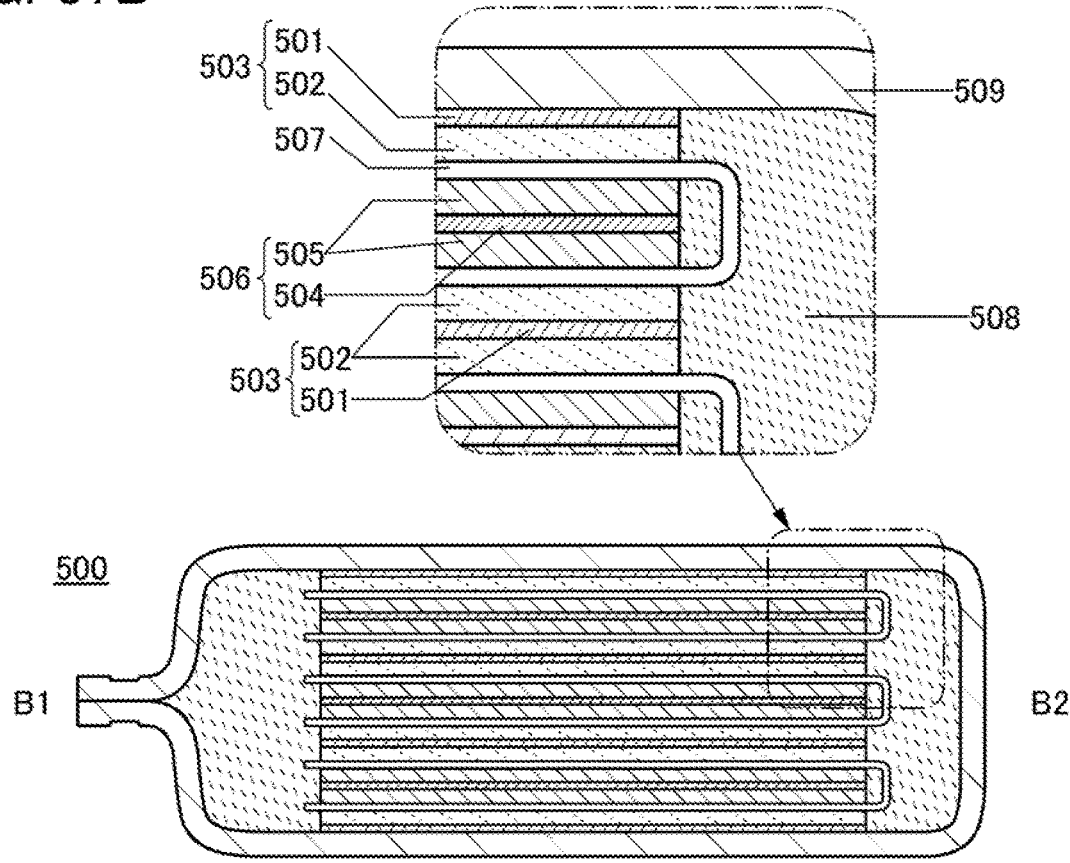

FIG. 37B is a cross-sectional view taken along dashed-dotted line B1-B2 in FIG. 35A.

FIGS. 37A and 37B each illustrate a cross-sectional structure of the battery unit 500 that is formed using a plurality of pairs of the positive and negative electrodes 503 and 506. There is no limitation on the number of electrode layers of the battery unit 500. In the case where a large number of electrode layers are used, the power storage device can have high capacity. In contrast, in the case where a small number of electrode layers are used, the power storage device can have a small thickness and high flexibility.

The examples in FIGS. 37A and 37B each include two positive electrodes 503 in each of which the positive electrode active material layer 502 is provided on one surface of the positive electrode current collector 501; two positive electrodes 503 in each of which the positive electrode active material layers 502 are provided on both surfaces of the positive electrode current collector 501; and three negative electrodes 506 in each of which the negative electrode active material layers 505 are provided on both surfaces of the negative electrode current collector 504. In other words, the battery unit 500 includes six positive electrode active material layers 502 and six negative electrode active material layers 505. Note that although the separator 507 has a bag-like shape in the examples illustrated in FIGS. 37A and 37B, the present invention is not limited to this example and the separator 507 may have a stripe shape or a bellows shape.

Figure 35B:
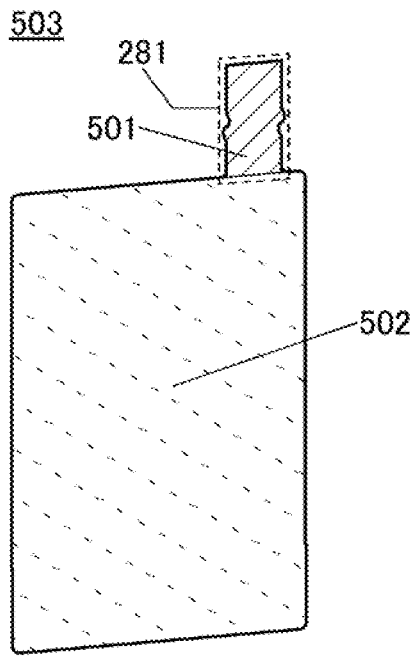

FIG. 35B illustrates the appearance of the positive electrode 503. The positive electrode 503 includes the positive electrode current collector 501 and the positive electrode active material layer 502.

Figure 35C:
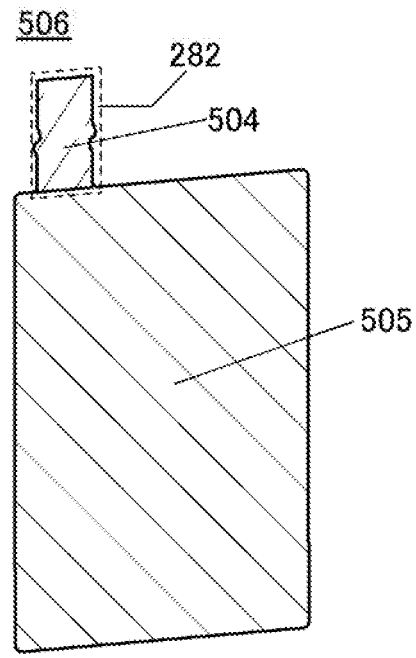

FIG. 35C illustrates the appearance of the negative electrode 506. The negative electrode 506 includes the negative electrode current collector 504 and the negative electrode active material layer 505.

The positive electrode 503 and the negative electrode 506 preferably include tab regions so that a plurality of stacked positive electrodes can be electrically connected to each other and a plurality of stacked negative electrodes can be electrically connected to each other. Furthermore, an electrode lead is preferably electrically connected to the tab region.

As illustrated in FIG. 35B, the positive electrode 503 preferably includes the tab region 281. The positive electrode lead 510 is preferably welded to part of the tab region 281. The tab region 281 preferably includes a region where the positive electrode current collector 501 is exposed. When the positive electrode lead 510 is welded to the region where the positive electrode current collector 501 is exposed, contact resistance can be further reduced. Although FIG. 35B illustrates the example where the positive electrode current collector 501 is exposed in the entire tab region 281, the tab region 281 may partly include the positive electrode active material layer 502.

As illustrated in FIG. 35C, the negative electrode 506 preferably includes the tab region 282. The negative electrode lead 511 is preferably welded to part of the tab region 282. The tab region 282 preferably includes a region where the negative electrode current collector 504 is exposed. When the negative electrode lead 511 is welded to the region where the negative electrode current collector 504 is exposed, contact resistance can be further reduced. Although FIG. 35C illustrates the example where the negative electrode current collector 504 is exposed in the entire tab region 282, the tab region 282 may partly include the negative electrode active material layer 505.

Although FIG. 35A illustrates the example where the ends of the positive electrode 503 and the negative electrode 506 are substantially aligned with each other, part of the positive electrode 503 may extend beyond the end of the negative electrode 506.

In the battery unit 500, the area of a region where the negative electrode 506 does not overlap with the positive electrode 503 is preferably as small as possible.

In the example illustrated in FIG. 36A, the end of the negative electrode 506 is located inward from the end of the positive electrode 503. With this structure, the entire negative electrode 506 can overlap with the positive electrode 503 or the area of the region where the negative electrode 506 does not overlap with the positive electrode 503 can be small.

The areas of the positive electrode 503 and the negative electrode 506 in the battery unit 500 are preferably substantially equal. For example, the areas of the positive electrode 503 and the negative electrode 506 that face each other with the separator 507 therebetween are preferably substantially equal. For example, the areas of the positive electrode active material layer 502 and the negative electrode active material layer 505 that face each other with the separator 507 therebetween are preferably substantially equal.

For example, as illustrated in FIGS. 37A and 37B, the area of the positive electrode 503 on the separator 507 side is preferably substantially equal to the area of the negative electrode 506 on the separator 507 side. When the area of a surface of the positive electrode 503 on the negative electrode 506 side is substantially equal to the area of a surface of the negative electrode 506 on the positive electrode 503 side, the region where the negative electrode 506 does not overlap with the positive electrode 503 can be small (does not exist, ideally), whereby the battery unit 500 can have reduced irreversible capacity. Alternatively, as illustrated in FIGS. 37A and 37B, the area of the surface of the positive electrode active material layer 502 on the separator 507 side is preferably substantially equal to the area of the surface of the negative electrode active material layer 505 on the separator 507 side.

As illustrated in FIGS. 37A and 37B, the end of the positive electrode 503 and the end of the negative electrode 506 are preferably substantially aligned with each other. Ends of the positive electrode active material layer 502 and the negative electrode active material layer 505 are preferably substantially aligned with each other.

In the example illustrated in FIG. 36B, the end of the positive electrode 503 is located inward from the end of the negative electrode 506. With this structure, the entire positive electrode 503 can overlap with the negative electrode 506 or the area of the region where the positive electrode 503 does not overlap with the negative electrode 506 can be small. In the case where the end of the negative electrode 506 is located inward from the end of the positive electrode 503, a current sometimes concentrates at the end portion of the negative electrode 506. For example, concentration of a current in part of the negative electrode 506 results in deposition of lithium on the negative electrode 506 in some cases. By reducing the area of the region where the positive electrode 503 does not overlap with the negative electrode 506, concentration of a current in part of the negative electrode 506 can be inhibited. As a result, for example, deposition of lithium on the negative electrode 506 can be inhibited, which is preferable.

As illustrated in FIG. 35A, the positive electrode lead 510 is preferably electrically connected to the positive electrode 503. Similarly, the negative electrode lead 511 is preferably electrically connected to the negative electrode 506. The positive electrode lead 510 and the negative electrode lead 511 are exposed to the outside of the exterior body 509 so as to serve as terminals for electrical contact with an external portion.

The positive electrode current collector 501 and the negative electrode current collector 504 can double as terminals for electrical contact with an external portion. In that case, the positive electrode current collector 501 and the negative electrode current collector 504 may be arranged such that part of the positive electrode current collector 501 and part of the negative electrode current collector 504 are exposed to the outside of the exterior body 509 without using electrode leads.

Figure 38:
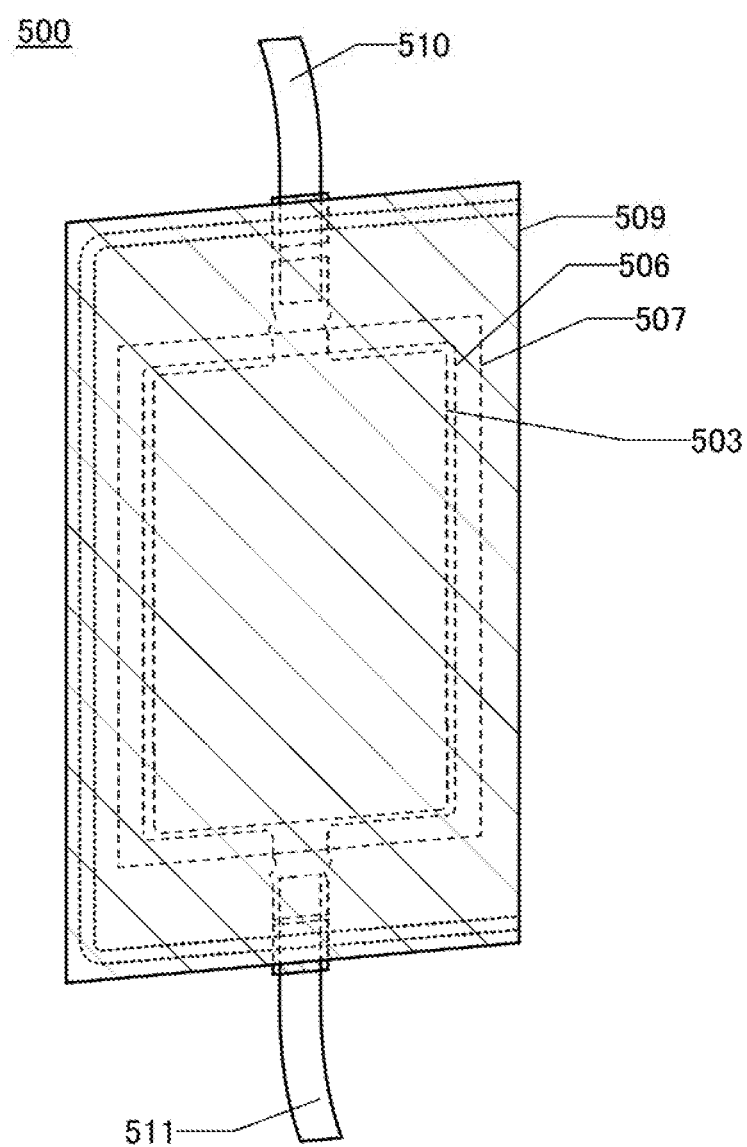
FIG. 38 is a perspective view illustrating an example of a power storage device.

Although the positive electrode lead 510 and the negative electrode lead 511 are provided on the same side of the battery unit 500 in FIG. 35A, the positive electrode lead 510 and the negative electrode lead 511 may be provided on different sides of the battery unit 500 as illustrated in FIG. 38. The electrode leads of the battery unit of one embodiment of the present invention can be freely positioned as described above; therefore, the degree of freedom in design is high. Accordingly, a product including the power storage device can have a high degree of freedom in design. Furthermore, a yield of products each including the power storage device can be increased.

The components of the battery unit will be described in detail below.

<<Current Collector>>

There is no particular limitation on the current collector as long as it has high conductivity without causing a significant chemical change in a power storage device. For example, the positive electrode current collector and the negative electrode current collector can each be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like may be used. Alternatively, the current collectors can each be formed using an aluminum alloy to which an element that improves heat resistance, such as silicon, titanium, neodymium, scandium, or molybdenum, is added. Still alternatively, a metal element that forms silicide by reacting with silicon can be used to form the current collectors. Examples of the metal element that forms silicide by reacting with silicon include zirconium, titanium, hafnium, vanadium, niobium, tantalum, chromium, molybdenum, tungsten, cobalt, and nickel.

An irreversible reaction with an electrolytic solution is sometimes caused on a surface of the positive electrode current collector or a surface of the negative electrode current collector. Thus, the positive electrode current collector and the negative electrode current collector each preferably have low reactivity with an electrolytic solution. Stainless steel or the like is preferably used for the positive electrode current collector or the negative electrode current collector, in which case reactivity with an electrolytic solution can be lowered in some cases, for example.

The positive electrode current collector and the negative electrode current collector can each have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector and the negative electrode current collector may each be formed to have micro irregularities on the surface thereof in order to enhance adhesion to the active material layer. The positive electrode current collector and the negative electrode current collector each preferably have a thickness of greater than or equal to 5 μm and less than or equal to 30 μm.

An undercoat layer may be provided over part of a surface of the current collector. The undercoat layer is a coating layer provided to reduce contact resistance between the current collector and the active material layer or to improve adhesion between the current collector and the active material layer. Note that the undercoat layer is not necessarily formed over the entire surface of the current collector and may be partly formed to have an island-like shape. In addition, the undercoat layer may serve as an active material to have capacity. For the undercoat layer, a carbon material can be used, for example. Examples of the carbon material include carbon black such as acetylene black, a carbon nanotube, and graphite. Examples of the undercoat layer include a metal layer, a layer containing carbon and high molecular compounds, and a layer containing metal and high molecular compounds.

<<Active Material Layer>>

The active material layer includes the active material. An active material refers only to a material that is involved in insertion and extraction of ions that are carriers. In this specification and the like, a layer including the active material is referred to as an active material layer. The active material layer may include a conductive additive and a binder in addition to the active material.

The positive electrode active material layer includes one or more kinds of positive electrode active materials. The negative electrode active material layer includes one or more kinds of negative electrode active materials.

The positive electrode active material and the negative electrode active material have a central role in battery reactions of a power storage device, and receive and release carrier ions. To increase the lifetime of the power storage device, the active materials preferably have a little capacity involved in irreversible battery reactions, and have high charge and discharge efficiency.

For the positive electrode active material, a material into and from which carrier ions such as lithium ions can be inserted and extracted can be used. Examples of a positive electrode active material include materials having an olivine crystal structure, a layered rock-salt crystal structure, a spinel crystal structure, and a NASICON crystal structure.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

As an example of a material having an olivine crystal structure, lithium-containing complex phosphate ($LiMPO_4$ (general formula) (M is one or more of Fe(II), Mn(II), Co(II), and Ni(II))) can be given. Typical examples of $LiMPO_4$ are compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charging).

The use of $LiFePO_4$ for the positive electrode active material allows fabrication of a highly safe power storage device that is stable against an external load such as overcharging. Such a power storage device is particularly suitable for, for example, a mobile device, a wearable device, and the like.

Examples of a material with a layered rock-salt crystal structure include lithium cobalt oxide ($LiCoO_2$), $LiNiO_2$, $LiMnO_2$, $Li_2MnO_3$, a NiCo-containing material (general formula: $LiNi_xCo_{1-x}O_2$ ($0<x<1$)) such as $LiNi_{0.8}Co_{0.2}O_2$, a NiMn-containing material (general formula: $LiNi_xMn_{1-x}O_2$ ($0<x<1$)) such as $LiNi_{0.5}Mn_{0.5}O_2$, a NiMnCo-containing material (also referred to as NMC) (general formula: $LiNi_xMn_yCo_{1-x-y}O_2$ ($x>0$, $y>0$, $x+y<1$)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given as the examples.

In particular, $LiCoO_2$ is preferable because it has advantages such as high capacity, higher stability in the air than that of $LiNiO_2$, and higher thermal stability than that of $LiNiO_2$.

Examples of a material with a spinel crystal structure include $LiMn_2O_4$, $Li_{1+x}Mn_{2-x}O_4$ ($0<x<2$), $LiMn_{2-x}Al_xO_4$ ($0<x<2$), and $LiMn_{1.5}Ni_{0.5}O_4$.

It is preferred that a small amount of lithium nickel oxide ($LiNiO_2$ or $LiNi_{1-x}M_xO_2$ ($0<x<1$, M=Co, Al, or the like)) be added to a material with a spinel crystal structure that contains manganese, such as $LiMn_2O_4$, in which case advantages such as inhibition of the dissolution of manganese and the decomposition of an electrolytic solution can be obtained.

Alternatively, a lithium-containing complex silicate expressed by $Li_{(2-j)}MSiO_4$ (general formula) (M is one or more of Fe(II), Mn(II), Co(II), or Ni(II); $0 \leq j \leq 2$) may be used as the positive electrode active material. Typical examples of the general formula $Li_{(2-j)}MSiO_4$ are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$.

Further alternatively, for example, a compound expressed by $Li_2MPO_4F$, $Li_2MP_2O_7$, or $Li_5MO_4$ (general formula) (M=Fe or Mn), a perovskite fluoride such as $FeF_3$, a metal chalcogenide (a sulfide, a selenide, or a telluride) such as $TiS_2$ and $MoS_2$, a lithium-containing material with an inverse spinel structure such as $LiMVO_4$ (M=Mn, Co, or Ni), a vanadium oxide ($V_2O_5$, $V_6O_{13}$, $LiV_3O_8$, or the like), a manganese oxide, or an organic sulfur compound can be used as the positive electrode active material.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average diameter of primary particles of the positive electrode active material is preferably, for example, greater than or equal to 5 nm and less than or equal to 100 μm.

For example, lithium-containing complex phosphate having an olivine crystal structure used for the positive electrode active material has a one-dimensional lithium diffusion path, so that lithium diffusion is slow. Thus, in the case where lithium-containing complex phosphate having an olivine crystal structure is used, the average diameter of particles of the positive electrode active material is, for example, preferably greater than or equal to 5 nm and less than or equal to 1 μm so that the charge and discharge rate is increased. The specific surface area of the positive electrode active material is, for example, preferably greater than or equal to 10 $m^2$/g and less than or equal to 50 $m^2$/g.

An active material having an olivine crystal structure is much less likely to be changed in the crystal structure by charging and discharging and has a more stable crystal structure than, for example, an active material having a layered rock-salt crystal structure. Thus, a positive electrode active material having an olivine crystal structure is stable against operation such as overcharging. The use of such a positive electrode active material allows fabrication of a highly safe power storage device.

As the negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, carbon black, and the like. Examples of the graphite include artificial graphite such as mesocarbon microbeads (MCMB), coke-based artificial graphite, or pitch-based artificial graphite and natural graphite such as spherical natural graphite. In addition, examples of the shape of the graphite include a flaky shape and a spherical shape.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and safety greater than that of a lithium metal.

For example, in the case where carrier ions are lithium ions, a material including at least one of Mg, Ca, Ga, Si, Al, Ge, Sn, Pb, As, Sb, Bi, Ag, Au, Zn, Cd, Hg, In, and the like can be used as the alloy-based material. Such elements have a higher capacity than carbon. In particular, silicon has a high theoretical capacity of 4200 mAh/g, and therefore, the capacity of the power storage device can be increased. Examples of an alloy-based material (compound-based material) using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Here, SiO is a compound containing silicon and oxygen. When the atomic ratio of silicon to oxygen is represented by $\alpha:\beta$, $\alpha$ preferably has an approximate value of $\beta$. Here, when $\alpha$ has an approximate value of $\beta$, an absolute value of the difference between $\alpha$ and $\rho$ is preferably less than or equal to 20% of a value of $\beta$, further preferably less than or equal to 10% of a value of $\beta$.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case where a material containing lithium ions is used as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The average diameter of primary particles of the negative electrode active material is preferably, for example, greater than or equal to 5 nm and less than or equal to 100 μm.

The positive electrode active material layer and the negative electrode active material layer may each include a conductive additive.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, further preferably greater than or equal to 1 wt % and less than or equal to 5 wt %.

A network for electric conduction can be formed in the electrode by the conductive additive. The conductive additive also allows maintaining of a path for electric conduction between the negative electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase electrical conductivity between the active materials or between the active material and the current collector.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount is used.

The positive electrode active material layer and the negative electrode active material layer may each include a binder.

In this specification, the binder has at least one of a function of binding or bonding the active materials and a function of binding or bonding the active material layer and the current collector. The binder is sometimes changed in state during fabrication of an electrode or a battery. For example, the binder can be at least one of a liquid, a solid, and a gel. The binder is sometimes changed from a monomer to a polymer during fabrication of an electrode or a battery.

As the binder, for example, a water-soluble high molecular compound can be used. As the water-soluble high molecular compound, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluororubber, or ethylene-propylene-diene copolymer can be used. Any of these rubber materials may be used in combination with the aforementioned water-soluble high molecular compound. Since these rubber materials have rubber elasticity and easily expand and contract, it is possible to obtain a highly reliable electrode that is resistant to stress due to expansion and contraction of an active material by charging and discharging, bending of the electrode, or the like. On the other hand, the rubber materials have a hydrophobic group and thus are unlikely to be soluble in water in some cases. In such a case, particles are dispersed in an aqueous solution without being dissolved in water, so that increasing the viscosity of a composition containing a solvent used for the formation of the active material layer (also referred to as an electrode binder composition) up to the viscosity suitable for application might be difficult. A water-soluble high molecular compound having excellent viscosity modifying properties, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

Alternatively, as the binder, a material such as PVdF, polystyrene, poly(methyl acrylate), poly(methyl methacrylate) (polymethyl methacrylate (PMMA)), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyacrylonitrile (PAN), ethylene-propylene-diene polymer, polyvinyl acetate, or nitrocellulose can be used.

Two or more of the above materials may be used in combination for the binder.

The content of the binder in the active material layer is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %.

<<Electrolytic Solution>>

As a solvent of the electrolytic solution 508, an aprotic organic solvent is preferably used. For example, one of ethylene carbonate (EC), propylene carbonate (PC), butylene carbonate, chloroethylene carbonate, vinylene carbonate (VC), γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case where lithium ions are used as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(FSO_2)_2$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and further preferably less than or equal to 0.01%.

Furthermore, an additive agent such as vinylene carbonate (VC), propane sultone (PS), tert-butylbenzene (TBB), fluoroethylene carbonate (FEC), or LiBOB may be added to the electrolytic solution. The concentration of such an additive agent in the whole solvent can be, for example, higher than or equal to 0.1 wt % and lower than or equal to 5 wt %.

Alternatively, a polymer gelled electrolyte obtained in such a manner that a polymer is swelled with an electrolytic solution may be used.

Examples of a host polymer include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The polymer may be porous.

An electrolytic solution may be gelated by adding a polymerization initiator and a cross-linking agent to the electrolytic solution. For example, the ionic liquid itself may be polymerized in such a manner that a polymerizable functional group is introduced into a cation or an anion of the ionic liquid and polymerization thereof is caused with the polymerization initiator. Then, the polymerized ionic liquid may be gelated with a cross-linking agent.

In combination with the electrolytic solution, a solid electrolyte including an inorganic material such as a sulfide-based inorganic material and an oxide-based inorganic material, or a solid electrolyte including a macromolecular material such as a polyethylene oxide (PEO)-based macromolecular material may alternatively be used. For example, the solid electrolyte may be formed over a surface of the active material layer. In the case where the solid electrolyte and the electrolytic solution are used in combination, a separator or a spacer does not need to be provided in some cases.

When a macromolecular material that undergoes gelation is used as the solvent for the electrolytic solution, safety against liquid leakage and the like is improved. Furthermore, the power storage device can be thinner and more lightweight. For example, a polyethylene oxide-based polymer, a polyacrylonitrile-based polymer, a polyvinylidene fluoride-based polymer, a polyacrylate based polymer, and a polymethacrylate-based polymer can be used. A polymer which can gelate the electrolytic solution at normal temperature (e.g., 25° C.) is preferably used. Alternatively, a silicone gel may be used. In this specification and the like, the term polyvinylidene fluoride-based polymer, for example, refers to a polymer including polyvinylidene fluoride (PVdF), and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained with the FT-IR spectrometer.

<<Separator>>

As the separator 507, paper, nonwoven fabric, a glass fiber, ceramics, a synthetic fiber such as nylon (polyamide), vinylon (a polyvinyl alcohol based fiber), polyester, acrylic, polyolefin, or polyurethane, or the like can be used. The separator 507 may have a single-layer structure or a stacked-layer structure.

More specifically, as a material for the separator 507, any of a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, a polyurethane-based polymer, and polyphenylene sulfide, derivatives thereof, cellulose, paper, nonwoven fabric, and fiberglass can be used either alone or in combination.

<<Exterior Body>>

It is preferred that the surface of the exterior body 509 that is in contact with the electrolytic solution 508, i.e., the inner surface of the exterior body 509, does not react with the electrolytic solution 508 significantly. When moisture enters the battery unit 500 from the outside, a reaction between a component of the electrolytic solution 508 or the like and water might occur. Thus, the exterior body 509 preferably has low moisture permeability.

As the exterior body 509, a film having a three-layer structure can be used, for example. In the three-layer structure, a highly flexible metal thin film of aluminum, stainless steel, copper, nickel, or the like is provided over a film formed using polyethylene, polypropylene, polycarbonate, ionomer, polyamide, or the like, and an insulating synthetic resin film of a polyamide-based resin, a polyester-based resin, or the like is provided as the outer surface of the exterior body over the metal thin film can be used. With such a three-layer structure, the passage of an electrolytic solution or a gas can be blocked and an insulating property and resistance to the electrolytic solution can be provided. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

The battery unit 500 can be flexible by using the exterior body 509 with flexibility. When the battery unit has flexibility, it can be used in headphones or a portable information terminal at least part of which is flexible, and the battery unit 500 can be bent as the headphones or portable information terminal is bent.

This embodiment can be combined with any of other embodiments as appropriate.

This application is based on Japanese Patent Application serial no. 2016-015180 filed with Japan Patent Office on Jan. 29, 2016, the entire contents of which are hereby incorporated by reference.

What is claimed is:

1. Headphones comprising:
   a housing;
   a sound output unit;
   a processing unit;
   a memory unit;
   a lighting unit; and
   a detection unit comprising an attitude detection unit, the attitude detection unit comprising a camera module,
   wherein the sound output unit is configured to output sound,
   wherein the memory unit is configured to store a program,
   wherein the attitude detection unit is configured to detect change in attitude from a difference between images taken by the camera module,
   wherein the attitude detection unit is configured to supply a first detection signal corresponding to the change in attitude to the processing unit,
   wherein the processing unit is configured to read out the program, carry out an operation using the first detection signal and the program, and supply a signal corresponding to an operation result to the lighting unit, and
   wherein the lighting unit is configured to emit light in response to the signal supplied from the processing unit.

2. The headphones according to claim 1,
   wherein the detection unit further comprises a photodetector unit, and
   wherein the photodetector unit is configured to supply a second detection signal corresponding to a quantity of detected light to the processing unit.

3. The headphones according to claim 2, wherein the processing unit is configured to make the lighting unit emit light when the quantity is smaller than a reference quantity.

4. The headphones according to claim 2, wherein the processing unit is configured to make the lighting unit emit light at a first luminance when the quantity is smaller than a reference quantity and make the lighting unit emit light at a second luminance different from the first luminance when the quantity is larger than the reference quantity.

5. The headphones according to claim 1, wherein the processing unit is configured to make the lighting unit blink when the change in attitude is larger than a reference quantity.

6. The headphones according to claim 1, further comprising a biological sensor,
   wherein the biological sensor is configured to obtain biological information and supply a third detection signal corresponding to the biological information to the processing unit.

7. The headphones according to claim 6, wherein the processing unit is configured to stop the sound output unit from outputting sound when the biological sensor obtains no biological information.

8. The headphones according to claim 1, further comprising a power supply unit,
   wherein the power supply unit comprises a power storage device and an antenna, and
   wherein the power supply unit is configured to charge the power storage device wirelessly with the antenna.

9. The headphones according to claim 1, further comprising an external connection terminal,
   wherein the processing unit is supplied with a sound signal from an external device that is connected to the external connection terminal with a wire.

10. The headphones according to claim 1,
    wherein the sound output unit and the lighting unit are located inside the housing,
    wherein the sound output unit outputs sound to an outside of the housing through a first surface of the housing, and
    wherein the lighting unit emits light to the outside of the housing through a second surface of the housing.

11. The headphones according to claim 1, further comprising a band that can be worn on a human body,
    wherein the band comprises the lighting unit.

12. The headphones according to claim 1, further comprising a display unit,
wherein the display unit is configured to display an image.

13. The headphones according to claim 1, further comprising a first communication unit,
wherein the first communication unit is supplied with a sound signal from a computer network or an electronic device with wireless communication.

14. A headphone system comprising:
the headphones according to claim 13; and
an arm-worn information terminal,
wherein the arm-worn information terminal comprises an input unit and a second communication unit,
wherein the input unit is configured to supply a signal corresponding to an input content to the second communication unit, and
wherein the second communication unit is configured to supply a signal corresponding to the supplied signal to the first communication unit.

15. The headphones according to claim 1, wherein the lighting unit is configured to display an image.

* * * * *